US009243127B2

(12) United States Patent
Kawamoto et al.

(10) Patent No.: US 9,243,127 B2
(45) Date of Patent: Jan. 26, 2016

(54) METHOD FOR PRODUCING NUCLEATOR MASTERBATCH

(71) Applicant: ADEKA CORPORATION, Tokyo (JP)

(72) Inventors: Naoshi Kawamoto, Saitama (JP); Takashi Ayabe, Saitama (JP); Atsushi Sakai, Saitama (JP); Tetsuya Seguchi, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/407,494

(22) PCT Filed: May 30, 2013

(86) PCT No.: PCT/JP2013/065006
§ 371 (c)(1),
(2) Date: Dec. 12, 2014

(87) PCT Pub. No.: WO2013/187240
PCT Pub. Date: Dec. 19, 2013

(65) Prior Publication Data
US 2015/0152248 A1    Jun. 4, 2015

(30) Foreign Application Priority Data

Jun. 14, 2012 (JP) ................. 2012-134890
Nov. 9, 2012 (JP) ................. 2012-247822
Nov. 9, 2012 (JP) ................. 2012-247823
Nov. 9, 2012 (JP) ................. 2012-247824
Nov. 9, 2012 (JP) ................. 2012-247825
Nov. 9, 2012 (JP) ................. 2012-247826

(51) Int. Cl.
*C08F 2/44*        (2006.01)
*C08J 3/22*        (2006.01)
*C08K 5/098*       (2006.01)
*C08K 5/527*       (2006.01)
*C08L 23/00*       (2006.01)
*C08K 5/56*        (2006.01)
*C08K 5/00*        (2006.01)
*C08J 5/18*        (2006.01)
*C08K 5/20*        (2006.01)
*C08F 110/06*      (2006.01)

(52) U.S. Cl.
CPC ... *C08K 5/56* (2013.01); *C08F 2/44* (2013.01); *C08J 3/22* (2013.01); *C08J 5/18* (2013.01); *C08K 5/0083* (2013.01); *C08K 5/20* (2013.01); *C08F 110/06* (2013.01); *C08J 2323/12* (2013.01); *C08J 2423/12* (2013.01); *C08K 5/527* (2013.01)

(58) Field of Classification Search
CPC ........... C08F 110/06; C08F 2/44; C08K 5/56; C08K 5/527; C08K 5/0083; C08K 5/20; C08J 3/22; C08J 5/18
USPC ............... 524/711, 728; 526/89, 90, 185, 348
See application file for complete search history.

(56) References Cited

U.S. PATENT DOCUMENTS

| 5,049,605 A | 9/1991 | Rekers |
| 2004/0044106 A1 | 3/2004 | Portnoy et al. |
| 2010/0204374 A1 | 8/2010 | Tanji et al. |
| 2011/0015316 A1 | 1/2011 | Zummallen |
| 2012/0149838 A1 | 6/2012 | Kawamoto et al. |
| 2013/0144020 A1 | 6/2013 | Kawamoto et al. |

FOREIGN PATENT DOCUMENTS

| JP | 58-1736 A | 1/1983 |
| JP | 59-184252 A | 10/1984 |
| JP | 3-220208 A | 9/1991 |
| JP | 03220208 A * | 9/1991 |
| JP | 6-340786 A | 12/1994 |
| JP | 7-11075 A | 1/1995 |
| JP | 7-48473 A | 2/1995 |
| JP | 07228631 A * | 8/1995 |
| JP | 8-3364 A | 1/1996 |
| JP | 9-118776 A | 5/1997 |
| JP | 9-157437 A | 6/1997 |
| JP | 10-25295 A | 1/1998 |
| JP | 2000-3658 A | 1/2000 |
| JP | 3044259 B2 | 5/2000 |
| JP | 2004-115624 A | 4/2004 |
| JP | 2004-514775 A | 5/2004 |
| JP | 2009-62417 A | 3/2009 |
| JP | 2012/57101 A | 3/2012 |
| WO | WO 02/44260 A2 | 6/2002 |
| WO | WO 2009/031407 A1 | 3/2009 |
| WO | WO 2011/008589 A1 | 1/2011 |
| WO | WO 2011/027793 A1 | 3/2011 |

* cited by examiner

*Primary Examiner* — Kelechi Egwim
(74) *Attorney, Agent, or Firm* — Birch, Stewart, Kolasch & Birch, LLP

(57) ABSTRACT

Provided is a method of producing a nucleator masterbatch, by which a nucleator masterbatch capable of improving the transparency and the physical properties of an olefin resin can be produced. This method is a method of producing a masterbatch in which a nucleator is blended in an olefin polymer, the method being characterized by comprising the step of polymerizing an olefin monomer with incorporation of a nucleator component, which is dissolved in an organoaluminum compound or in an organoaluminum compound and an organic solvent, before or during polymerization of the olefin monomer such that the nucleator component is blended in an amount of 0.05 to 20 parts by mass with respect to 100 parts by mass of the olefin polymer obtained by the polymerization of the olefin monomer.

33 Claims, No Drawings

METHOD FOR PRODUCING NUCLEATOR MASTERBATCH

TECHNICAL FIELD

The present invention relates to a method of producing a nucleator masterbatch. More particularly, the present invention relates to a method of producing a nucleator masterbatch, by which a nucleator masterbatch that shows excellent dispersion in an olefin resin and is capable of improving the physical properties of the olefin resin, such as transparency and mechanical strength, can be provided.

The present invention also relates to a method of producing an olefin-based resin composition. More particularly, the present invention relates to a method of producing an olefin-based resin composition, by which an olefin-based resin composition having excellent crystallization temperature and good transparency can be obtained.

Further, the present invention relates to a method of producing an olefin resin composition. More particularly, the present invention relates to a method of producing an olefin resin composition having excellent transparency and processability by, in an olefin polymer obtained by polymerizing an olefin monomer with a supply of a nucleator dissolved in an organoaluminum compound or in an organoaluminum compound and an organic solvent, regenerating the nucleator contained in the olefin polymer in an industrially simple and effective manner.

Still further, the present invention relates to methods of producing an olefin resin composition for film and fiber materials. More particularly, the present invention relates to a method of producing an olefin resin composition for a film material having good moldability and excellent transparency by dispersing a nucleator therein at a high level; and a method of producing an olefin resin composition for a fiber material showing limited breakage.

Yet still further, the present invention relates to a method of producing an olefin resin composition for a sanitary material. More particularly, the present invention relates to a method of producing an olefin resin composition for a sanitary material, which is capable of producing an olefin resin composition that is suitable for a sanitary material because it can yield a molded article in which migration of a nucleator component to the surface is inhibited and the physical properties are improved.

Yet still further, the present invention relates to a method of producing an olefin resin composition. More particularly, the present invention relates to a method of producing an olefin resin composition that can yield a molded article having excellent rigidity in which occurrence of a defect in the outer appearance is inhibited.

BACKGROUND ART

First of all, olefin resins such as polyethylene, polypropylene and polybutene-1 have advantages in their excellent moldability, heat resistance, mechanical properties, low specific gravity and the like and are, therefore, widely utilized in films, sheets and various molded articles (such as structural components). However, since olefin resins have a slow crystallization rate after being heat-molded, not only there are such problems that the molding cycle in processing is long, but also there are cases where the resulting molded article is deformed due to crystallization that progresses even after molding. Moreover, since olefin resins generate large crystals when heat-molded, there are such drawbacks that the resulting molded article has insufficient strength and poor transparency.

It is known, however, that these drawbacks are attributed to the crystallinity of the olefin resins and can be solved by allowing fine crystals to be rapidly generated. In order to allow fine crystals to be rapidly generated, for example, a method of adding a nucleator, a crystallization promoter or the like is employed.

Examples of the nucleator that are conventionally used include metal carboxylates such as sodium benzoate, aluminum 4-tert-butylbenzoate, sodium adipate and 2-sodium-bicyclo[2.2.1]heptane-2,3-dicarboxylate; metal phosphates such as sodium-bis(4-tert-butylphenyl)phosphate, sodium-2, 2'-methylene-bis(4,6-di-tert-butylphenyl)phosphate and lithium-2,2'-methylene-bis(4,6-di-tert-butylphenyl)phosphate; and compounds having an acetal skeleton, such as dibenzylidene sorbitol, bis(methylbenzylidene)sorbitol and bis(dimethylbenzylidene)sorbitol. These nucleators are disclosed in, for example, Patent Documents 1 to 8.

In cases where the above-described nucleators are directly added to an olefin resin, there are problems in terms of the working environment associated with an addition of powder as well as the ease of handling such as blocking caused by secondary aggregation of the nucleators. Therefore, attempts have been made to prepare a masterbatch of such nucleator and, for example, in Patent Documents 9 and 10, masterbatches for olefin resins are reported. In addition, in Patent Document 11, a masterbatch obtained by melt-kneading a petroleum resin and a nucleator is reported.

Further, Patent Document 12 proposes a method in which propylene is pre-polymerized and then two-step polymerization is performed with an addition of aluminum hydroxy-bis (p-t-butylbenzoate) or sodium benzoate as a nucleator.

As described above, a variety of studies have been conducted on the nucleator to be used in an olefin resin; however, there is still a room for improvement. For example, those nucleators disclosed in Patent Documents 1 to 8 have neither sufficient compatibility with an olefin resin nor sufficient dispersibility in an olefin resin and there is thus a problem that, even when a masterbatch is produced with an addition of the respective nucleators at a high concentration, the expected effects of addition are not exhibited.

Further, in the masterbatches for olefin resins that are disclosed in Patent Documents 9 and 10, the effect of improving the transparency, mechanical strength and the like of an olefin resin is not satisfactory.

The petroleum resin disclosed in Patent Document 11 shows good compatibility with an olefin resin; however, it may impair the intrinsic physical properties of the olefin resin.

Moreover, in a method in which an olefin monomer is polymerized with incorporation of a nucleator thereto at the time of the polymerization, there have been indicated problems that the nucleator reduces the catalytic activity of a polymerization catalyst and causes coloration of the olefin due to interaction with the metal of the polymerization catalyst, and there is also a problem that the selection and management of polymerization conditions are complicated.

The above-described method according to Patent Document 12 aims at uniformly dispersing the nucleator and thereby improving the rigidity of the resulting polymer, and it is a two-step polymerization method in which the nucleator is added after single-step polymerization of propylene. In Patent Document 12, it is disclosed neither that the nucleator may affect the polymerization activity, nor that the nucleator is masked and an adverse effect on the catalytic activity is thereby prevented. In addition, the method according to Patent Document 12 does not show any effect in single-step polymerization where a nucleator is directly brought into contact with a polymerization catalyst. Furthermore, the nucleator described in Patent Document 12 does not dissolve in an organoaluminum compound or an organic solvent and impairs the polymerization activity.

Secondly, olefin-based resins have advantages in their excellent moldability, heat resistance, mechanical properties, low specific gravity and the like and are, therefore, widely utilized in films, sheets and various molded articles (such as structural components). However, since olefin-based resins have a slow crystallization rate when molded, there are drawbacks that the molding cycle properties are poor and that large crystals are generated depending on the progress of crystallization after heat-molding, which leads to insufficient transparency and strength.

It is known, however, that these drawbacks are all attributed to the crystallinity of the olefin-based resins and can be solved by increasing their crystallization temperatures to allow fine crystals to be rapidly generated.

For this purpose, it is known to add a nucleator or a crystallization promoter, and examples thereof that are conventionally used include metal carboxylates such as sodium benzoate, aluminum 4-tert-butylbenzoate, sodium adipate and 2-sodium-bicyclo[2.2.1]heptane-2,3-dicarboxylate; metal phosphates such as sodium-bis(4-tert-butylphenyl)phosphate, sodium-2,2'-methylene-bis(4,6-di-tert-butylphenyl) phosphate and lithium-2,2'-methylene-bis(4,6-di-tert-butylphenyl)phosphate; and compounds having an acetal skeleton, such as dibenzylidene sorbitol, bis(methylbenzylidene)sorbitol and bis(dimethylbenzylidene)sorbitol.

A method for adding these nucleators are widely known and, using a Henschel mixer, a mill roll, a V-blender, a ribbon blender, a kneader blender, a Banbury mixer, a super mixer or the like, an olefin resin and an additive(s) containing a nucleator are mixed, and the resulting mixture is loaded to an extruder and granulated.

Further, Patent Document 12 proposes a method in which aluminum hydroxy-bis(p-t-butylbenzoate) or sodium benzoate is added as a nucleator at the time of polymerizing propylene.

However, in a method in which a nucleator is blended at the time of granulating a polymer, variations may occur in the product physical properties due to defective dispersion of the nucleator. In addition, since the nucleator is powder, there is a problem that the working environment is adversely affected and contaminated due to scattering of the powder and the like during operation. Meanwhile, blending of a nucleator at the time of polymerizing an olefin has a problem that the nucleator inhibits the polymerization activity.

The above-described method according to Patent Document 12 aims at uniformly dispersing the nucleator and thereby improving the rigidity of the resulting polymer, and it is a two-step polymerization method in which the nucleator is added after single-step polymerization of propylene. In Patent Document 12, none of the followings is disclosed: that the nucleator may affect the polymerization activity; that the nucleator is masked and an adverse effect on the catalytic activity is thereby prevented; and that the effect of the nucleator is improved by using an aliphatic metal carboxylate or an alkali metal-containing hydrotalcite in combination. In addition, the method according to Patent Document 12 does not show any effect in a single-step polymerization method in which a nucleator is directly brought into contact with a polymerization catalyst. Furthermore, the nucleator described in Patent Document 12 does not dissolve in an organoaluminum compound or an organic solvent and impairs the polymerization activity.

Thirdly, olefin resins are inexpensive and favorable in various properties such as transparency, heat resistance, surface gloss, oil resistance and mechanical properties; therefore, they are used in a wide range of fields such as industrial materials, automobile materials, home electric appliance materials and packaging materials. Since olefin resins are inexpensive products, they are being studied as an alternative to other resin materials.

Since olefin resins have a slow crystallization rate after being molded, there are drawbacks that the molding cycle is slow and that large crystals are generated depending on the progress of crystallization after heat-molding, which leads to insufficient transparency and strength of the resulting molded article. It is known, however, that these drawbacks are all attributed to the crystallinity of the olefin resins and can be solved by increasing their crystallization temperatures to allow fine crystals to be rapidly generated.

As a method of adding a nucleator before or during polymerization of an olefin monomer, for example, Patent Document 12 proposes a method in which propylene is pre-polymerized and then two-step polymerization is performed with an addition of aluminum hydroxy-bis(p-t-butylbenzoate) or sodium benzoate as a nucleator. Such a method in which a nucleator is added before or during polymerization is advantageous in that a step of blending the nucleator by a melt-kneading process such as extrusion after the polymerization can be omitted; however, there have been indicated problems that the nucleator reduces the catalytic activity of a polymerization catalyst and causes coloration of the resulting polymer due to interaction with the metal of the polymerization catalyst, and there is also a problem that the selection and management of polymerization conditions are complicated.

The above-described method according to Patent Document 12 aims at uniformly dispersing the nucleator and thereby improving the rigidity of the resulting polymer, and it is a two-step polymerization method in which the nucleator is added after single-step polymerization of propylene. In Patent Document 12, it is disclosed neither that the nucleator may affect the polymerization activity, nor that the nucleator is masked and an adverse effect on the catalytic activity is thereby prevented. In addition, the method according to Patent Document 12 does not show any effect in single-step polymerization where a nucleator is directly brought into contact with a polymerization catalyst. Furthermore, the nucleator described in Patent Document 12 does not dissolve in an organoaluminum compound or an organic solvent and impairs the polymerization activity.

Generally, a nucleator itself has poor fluidity and is thus required to be made into a slurry with a solvent; however, since such a nucleator has poor diffusibility in a solution and precipitates over time to cause uneven concentration, there is a problem that olefin polymers polymerized by a batch-type polymerization method have variable nucleating actions and effects.

Fourthly, olefin resins have advantages in their excellent moldability, heat resistance, mechanical properties, low specific gravity and the like and are, therefore, widely utilized in films, sheets and various molded articles (such as structural components). However, since olefin resins have a slow crystallization rate after being molded, there are drawbacks that the molding cycle properties are poor and that large crystals are generated depending on the progress of crystallization after heat-molding, which leads to insufficient transparency and strength.

These drawbacks are all attributed to the crystallinity of the olefin resins and can be solved by increasing their crystallization temperatures to allow fine crystals to be rapidly generated.

For this purpose, it is known to add a nucleator, and examples thereof that are conventionally used include metal carboxylates such as sodium benzoate, aluminum 4-tert-butylbenzoate, sodium adipate and 2-sodium-bicyclo[2.2.1]heptane-2,3-dicarboxylate; metal phosphates such as sodium-bis(4-tert-butylphenyl)phosphate, sodium-2,2'-methylene-bis(4,6-di-tert-butylphenyl)phosphate and lithium-2,2'-methylene-bis(4,6-di-tert-butylphenyl)phosphate; and compounds having an acetal skeleton, such as dibenzylidene sorbitol, bis(methylbenzylidene)sorbitol and bis(dimethylbenzylidene)sorbitol. These nucleators are disclosed in, for example, Patent Documents 1 to 8.

A method for adding these nucleators are widely known and, using a Henschel mixer, a mill roll, a V-blender, a ribbon blender, a kneader blender, a Banbury mixer, a super mixer or the like, an olefin resin and an additive(s) containing a nucleator are mixed, and the resulting mixture is loaded to an extruder and granulated.

Further, Patent Document 12 proposes a method in which propylene is pre-polymerized and then two-step polymerization is performed with an addition of aluminum hydroxy-bis(p-t-butylbenzoate) or sodium benzoate as a nucleator.

However, in a method where a nucleator is blended with an olefin resin, not only variations may occur in the product physical properties due to defective dispersion of the nucleator, but also contamination with a particle product having a large size may occur. In a film material, this causes a defect in the outer appearance of the resulting molded article such as rough surface and, in a fiber material, it causes breakage during molding; therefore, nucleators that can be used in the film and fiber material applications are limited. Further, in cases where a powder nucleator is used, there is a problem that the working environment is adversely affected and contaminated due to scattering of the powder and the like during operation.

Moreover, in a method in which an olefin monomer is polymerized with incorporation of a nucleator thereto at the time of the polymerization, there have been indicated problems that the nucleator reduces the catalytic activity of a polymerization catalyst and causes coloration of the olefin due to interaction with the metal of the polymerization catalyst, and there is also a problem that the selection and management of polymerization conditions are complicated.

The above-described method according to Patent Document 12 aims at uniformly dispersing the nucleator and thereby improving the rigidity of the resulting polymer, and it is a two-step polymerization method in which the nucleator is added after single-step polymerization of propylene. In Patent Document 12, it is disclosed neither that the nucleator may affect the polymerization activity, nor that the nucleator is masked and an adverse effect on the catalytic activity is thereby prevented. In addition, the method according to Patent Document 12 does not show any effect in single-step polymerization where a nucleator is directly brought into contact with a polymerization catalyst. Furthermore, the nucleator described in Patent Document 12 does not dissolve in an organoaluminum compound or an organic solvent and impairs the polymerization activity.

Fifthly, olefin resins are inexpensive and favorable in various properties such as transparency, heat resistance, surface gloss, oil resistance and mechanical properties; therefore, they are used in a wide range of fields such as industrial materials, automobile materials, home electric appliance materials and packaging materials. Since olefin resins are inexpensive products, they are being studied as an alternative to other resin materials and as materials for hygienic applications.

There are various properties required for the use of an olefin resin in a hygienic application. Particularly, the olefin resin, as a container or a packaging material, may come into direct contact with the content; therefore, it is important that the additives to be blended with the olefin resin be non-migratory and that the hygienic property of the molded article be ensured.

Meanwhile, since olefin resins have a slow crystallization rate after being molded, there are drawbacks that the molding cycle is slow and that large crystals are generated depending on the progress of crystallization after heat-molding, which leads to insufficient transparency and strength of the resulting molded article. It is known, however, that these drawbacks are all attributed to the crystallinity of the olefin resins and can be solved by increasing their crystallization temperatures to allow fine crystals to be rapidly generated.

For this purpose, it is known to add a nucleator, and examples thereof that are conventionally used include metal carboxylates such as sodium benzoate, aluminum 4-tert-butylbenzoate, sodium adipate and 2-sodium-bicyclo[2.2.1]heptane-2,3-dicarboxylate; metal phosphates such as sodium-bis(4-tert-butylphenyl)phosphate, sodium-2,2'-methylene-bis(4,6-di-tert-butylphenyl)phosphate and lithium-2,2'-methylene-bis(4,6-di-tert-butylphenyl)phosphate; and compounds having an acetal skeleton, such as dibenzylidene sorbitol, bis(methylbenzylidene)sorbitol and bis(dimethylbenzylidene)sorbitol. These nucleators are disclosed in, for example, Patent Documents 1 to 8.

Among the above-described nucleators, sorbitol derivatives show excellent nucleation effect; however, depending on the application, the use of a sorbitol derivative is limited because it may bleed out of a resin to contaminate a roll during film formation and generates a strong odor during processing. Further, metal salts of aromatic carboxylic acids that are commonly used function as nucleators; however, there are such problems that these metal salts markedly reduce the transparency of an olefin resin and cause generation of a large number of voids when the olefin resin is molded into a film.

As a method of adding a nucleator to an olefin resin, an olefin resin and an additive(s) containing a nucleator or transparentizing agent are mixed using a Henschel mixer, a mill roll, a V-blender, a ribbon blender, a kneader blender, a Banbury mixer, a super mixer or the like and the resulting mixture is loaded to an extruder and granulated.

Further, Patent Document 12 proposes a method in which propylene is pre-polymerized and then two-step polymerization is performed with an addition of aluminum hydroxy-bis(p-t-butylbenzoate) or sodium benzoate as a nucleator.

However, in a method where an olefin polymer and a nucleator are mixed and melt-kneaded, there are problems that the nucleator must be added in an amount more than necessary in order to compensate its poor dispersion in the olefin resin and that the nucleator migrates to the surface of the resulting molded article. Further, in cases where a powder nucleator is used, there is a problem that the working environment is adversely affected and contaminated due to scattering of the powder and the like during operation.

Moreover, although such a method in which a nucleator is blended at the time of polymerizing an olefin monomer is advantageous in that a step of blending the nucleator by a melt-kneading process such as extrusion after the polymerization can be omitted, there have been indicated problems that the nucleator reduces the catalytic activity of a polymerization catalyst and causes coloration of the resulting olefin resin due to interaction with the metal of the polymerization catalyst, and there is also a problem that the selection and management of polymerization conditions are complicated.

The above-described method according to Patent Document 12 aims at uniformly dispersing the nucleator and thereby improving the rigidity of the resulting polymer, and it is a two-step polymerization method in which the nucleator is added after single-step polymerization of propylene. In Patent Document 12, it is disclosed neither that the nucleator may affect the polymerization activity, nor that the nucleator is masked and an adverse effect on the catalytic activity is thereby prevented. In addition, the method according to Patent Document 12 does not show any effect in single-step polymerization where a nucleator is directly brought into contact with a polymerization catalyst. Furthermore, the nucleator described in Patent Document 12 does not dissolve in an organoaluminum compound or an organic solvent and impairs the polymerization activity.

Sixthly, olefin resins are conventionally known as resins that are light-weighted and have excellent mechanical and physical properties, chemical stability and processability and are, therefore, utilized in a wide range of applications in the field of industrial materials, including transportation materials such as containers and pallets; automobile interior and exterior components; large-size containers such as tanks and drums for industrial chemicals and fuels; various bottles for liquid detergents, shampoos, rinses and cooking oils; and home electric appliance materials.

In recent years, production rationalization and cost reduction have been advanced and, in the field of industrial materials, there is an increasing demand for reduction in thickness and weight of the materials and an extremely high-level performance improvement is demanded for olefin resins. In order to respond to these demands, high-performance catalysts having high stereoregularity have been adopted and resin designs have been optimized; however, simple application of these measures has yet to attain sufficient performance and there is a demand for an industrial material having even higher rigidity. Still, for olefin manufacturers, a large-scale facility modification and catalyst changeover cannot be considered advantageous from the standpoints of the cost and profitability.

Conventionally, in the composite material development, attempts have been made to increase the rigidity by adding a filler, for example, an inorganic filler such as talc, to an olefin resin. For instance, this has been done in the large-size blow-molding applications such as structural members including automobile parts where heat resistance and rigidity are required. However, when the amount of an inorganic filler to be added is increased for an improvement of the rigidity, the specific gravity is also increased, so that weight reduction, which is the original purpose, cannot be achieved. Therefore, a material having an improved rigidity whose specific gravity is hardly increased has been strongly desired.

Since olefin resins have a slow crystallization rate after being molded, there are drawbacks that the molding cycle is slow and that large crystals are generated depending on the progress of crystallization after heat-molding, which leads to insufficient transparency and strength of the resulting molded article. It is known, however, that these drawbacks are all attributed to the crystallinity of the olefin resins and can be solved by allowing fine crystals to be rapidly generated at the time of molding the olefin resins.

For this purpose, it is known to add a nucleator, and examples thereof that are conventionally used include metal carboxylates such as sodium benzoate, aluminum 4-tert-butylbenzoate, sodium adipate and 2-sodium-bicyclo[2.2.1]heptane-2,3-dicarboxylate; metal phosphates such as sodium-bis(4-tert-butylphenyl)phosphate, sodium-2,2'-methylene-bis(4,6-di-tert-butylphenyl)phosphate and lithium-2,2'-methylene-bis(4,6-di-tert-butylphenyl)phosphate; and compounds having an acetal skeleton, such as dibenzylidene sorbitol, bis(methylbenzylidene)sorbitol and bis(dimethylbenzylidene)sorbitol. These nucleators are disclosed in, for example, Patent Documents 1 to 8.

As a method of adding the above-described nucleators to an olefin resin, an olefin resin and an additive(s) containing a nucleator are mixed using a Henschel mixer, a mill roll, a V-blender, a ribbon blender, a kneader blender, a Banbury mixer, a super mixer or the like and the resulting mixture is loaded to an extruder and granulated.

Further, Patent Document 12 proposes a method in which propylene is pre-polymerized and then two-step polymerization is performed with an addition of aluminum hydroxy-bis(p-t-butylbenzoate) or sodium benzoate as a nucleator.

However, in a method where an olefin resin and a nucleator are blended by melt-kneading, not only the nucleator must be added in an amount more than necessary in order to compensate its poor dispersion, which is economically disadvantageous, but also there are such problems that the coloration of the nucleator itself causes the resulting molded article to be colored. On the other hand, in cases where a nucleator is added before or during polymerization of an olefin monomer, there is a problem that the nucleator inhibits the polymerization of the olefin monomer.

Moreover, although such a method in which a nucleator is blended at the time of polymerizing an olefin monomer is advantageous in that a step of blending the nucleator by a melt-kneading process such as extrusion after the polymerization can be omitted, there have been indicated problems that the nucleator reduces the catalytic activity of a polymerization catalyst and causes coloration of the resulting olefin resin due to interaction with the metal of the polymerization catalyst, and there is also a problem that the selection and management of polymerization conditions are complicated.

The above-described method according to Patent Document 12 aims at uniformly dispersing the nucleator and thereby improving the rigidity of the resulting polymer, and it is a two-step polymerization method in which the nucleator is added after single-step polymerization of propylene. In Patent Document 12, it is disclosed neither that the nucleator may affect the polymerization activity, nor that the nucleator is masked and an adverse effect on the catalytic activity is thereby prevented. In addition, the method according to Patent Document 12 does not show any effect in single-step polymerization where a nucleator is directly brought into contact with a polymerization catalyst. Furthermore, the nucleator described in Patent Document 12 does not dissolve in an organoaluminum compound or an organic solvent and impairs the polymerization activity.

RELATED ART DOCUMENTS

Patent Documents

Patent Document 1: Japanese Unexamined Patent Application Publication No. S58-1736

Patent Document 2: Japanese Unexamined Patent Application Publication No. S59-184252

Patent Document 3: Japanese Unexamined Patent Application Publication No. H6-340786

Patent Document 4: Japanese Unexamined Patent Application Publication No. H7-11075
Patent Document 5: Japanese Unexamined Patent Application Publication No. H7-48473
Patent Document 6: Japanese Unexamined Patent Application Publication No. H8-3364
Patent Document 7: Japanese Unexamined Patent Application Publication No. H9-118776
Patent Document 8: Japanese Unexamined Patent Application Publication No. H10-25295
Patent Document 9: Japanese Unexamined Patent Application Publication No. H9-157437
Patent Document 10: Japanese Unexamined Patent Application Publication No. 2000-3658
Patent Document 11: Japanese Unexamined Patent Application Publication No. 2009-62417
Patent Document 12: Japanese Patent No. 3044259

DISCLOSURE OF THE INVENTION

Problems to be Solved by the Invention

A first object of the present invention is to provide a method of producing a nucleator masterbatch by which a nucleator masterbatch capable of improving the transparency and physical properties of an olefin resin can be produced.

A second object of the present invention is to provide a method of producing an olefin-based resin composition by which an olefin-based resin composition having excellent crystallization temperature and excellent transparency can be produced without impairing the olefin polymerization activity.

A third object of the present invention is to provide a method of producing an olefin resin composition by which an olefin resin composition having excellent transparency and processability can be produced.

A fourth object of the present invention is to provide a method of producing an olefin resin composition for film and fiber materials in which, by highly dispersing a nucleator component in an olefin resin, the moldability and transparency can be improved and stable production of film and fiber materials can be achieved.

A fifth object of the present invention is to provide a method of producing an olefin resin composition for a sanitary material, which is capable of producing an olefin resin composition that is suitable for a sanitary material because it can yield a molded article in which migration of a nucleator component to the surface is inhibited and the physical properties are improved.

A sixth object of the present invention is to provide a method of producing an olefin resin composition that can yield a molded article having excellent rigidity in which occurrence of a defect in the outer appearance is inhibited.

Means for Solving the Problems

In order to solve the above-described first problem, the present inventors intensively studied and discovered that this problem can be solved by polymerizing an olefin monomer with the use of a nucleator dissolved in an organoaluminum compound or in an organoaluminum compound and an organic solvent, thereby completing the present invention.

That is, the method of producing a nucleator masterbatch according to the first embodiment of the present invention is characterized by comprising the step of polymerizing an olefin monomer with incorporation of a nucleator component, which is dissolved in an organoaluminum compound or in an organoaluminum compound and an organic solvent, before or during the polymerization of the olefin monomer such that the nucleator component is blended in an amount of 0.05 to 20 parts by mass with respect to 100 parts by mass of an olefin polymer obtained by the polymerization of the olefin monomer.

In the method of producing a nucleator masterbatch according to the first embodiment of the present invention, it is preferred that the above-described nucleator be a compound represented by the following Formula (1):

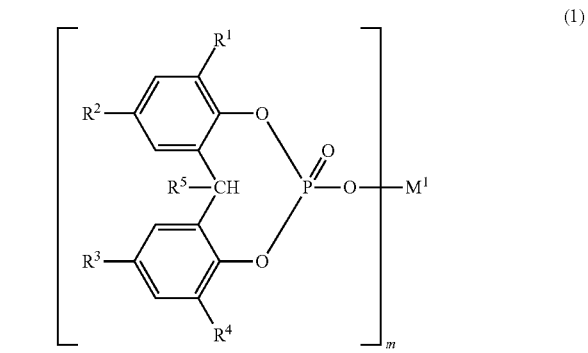

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn).

In the method of producing a nucleator masterbatch according to the first embodiment of the present invention, it is preferred that the above-described nucleator be an amide compound.

In the method of producing a nucleator masterbatch according to the first embodiment of the present invention, it is also preferred that the above-described organoaluminum compound be a trialkylaluminum.

Further, in the method of producing a nucleator masterbatch according to the first embodiment of the present invention, it is preferred that the above-described organic solvent be selected from aliphatic hydrocarbon compounds and aromatic hydrocarbon compounds.

The molded article according to the first embodiment of the present invention is characterized in that it is obtained by blending an olefin resin with a nucleator masterbatch obtained by any one of the above-described methods of producing a nucleator masterbatch and subsequently molding the resultant.

Further, in order to solve the above-described second problem, the present inventors intensively studied and discovered that this problem can be solved by a production method which comprises: a first step of polymerizing an olefin monomer with an addition of a nucleator component dissolved using an organoaluminum compound; and a second step of adding a metal aliphatic carboxylate or an alkali metal-containing hydrotalcite to a polymer obtained by the polymerization in the first step and melt-kneading the resulting mixture, thereby completing the present invention.

That is, the method of producing an olefin-based resin according to the second embodiment of the present invention is characterized by comprising: the first step of blending a nucleator component, which comprises one or more compounds represented by the following Formula (1) and is dissolved in an organoaluminum compound or in an organoaluminum compound and an organic solvent, before or during polymerization of an olefin monomer such that the nucleator component is incorporated in an amount of 0.001 to 10 parts by mass with respect to 100 parts by mass of an olefin polymer obtained by the polymerization; and the second step of adding at least one metal aliphatic carboxylate represented by the following Formula (15) or an alkali metal-containing hydrotalcite in an amount of 0.001 to 10 parts by mass with respect to 100 parts by mass of the polymer obtained by the polymerization of the olefin monomer and subsequently melt-kneading the resulting mixture:

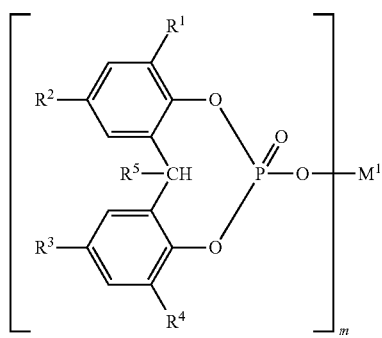

(1)

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group 11 element, Al(OH) or Zn)

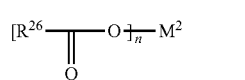

(15)

(wherein, $R^{26}$ represents an aliphatic group having 1 to 30 carbon atoms which is optionally branched and optionally has one or more substituents selected from a hydroxyl group and cycloalkyl groups; $M^2$ represents a metal atom; and n is an integer of 1 to 4, representing the valence of $M^2$).

In the method of producing an olefin-based resin composition according to the second embodiment of the present invention, it is preferred that, in the above-described nucleator component which comprises one or more compounds represented by the Formula (1) and is dissolved in an organoaluminum compound or in an organoaluminum compound and an organic solvent, the ratio of the nucleator component and the organoaluminum compound be in the range of 1/1,000 to 1/0.3 in terms of the molar ratio of the nucleator component and the aluminum content of the organoaluminum compound.

In the method of producing an olefin-based resin composition according to the second embodiment of the present invention, it is preferred that the above-described metal aliphatic carboxylate represented by Formula (15) be selected from the group consisting of lithium stearate, lithium myristate, sodium stearate, sodium myristate and hydroxy-substituted compounds thereof.

In the method of producing an olefin-based resin composition according to the second embodiment of the present invention, it is preferred that the alkali metal contained in the above-described alkali metal-containing hydrotalcite be sodium or lithium.

In the method of producing an olefin-based resin composition according to the second embodiment of the present invention, it is preferred that the above-described organoaluminum compound be a trialkylaluminum The molded article according to the second embodiment of the present invention is characterized in that it is obtained by molding an olefin-based resin composition produced by any one of the above-described methods of producing an olefin-based resin composition.

Still further, in order to solve the above-described third problem, the present inventors intensively studied and conceived a method of polymerizing an olefin monomer with a supply of a nucleator dissolved in an organoaluminum compound or in an organoaluminum compound and an organic solvent.

Moreover, the present inventors discovered that, with a masked nucleator being blended in an olefin polymer, the actions and effects of the nucleator cannot be adequately exerted and the transparency of a molded article obtained by molding the olefin polymer may be consequently impaired. As a result of intensively studying this point, the present inventors discovered that the above-described problem can be solved by applying a nitrogen gas containing water or a proton-donating substance or steam, thereby completing the present invention.

According to the studies conducted by the present inventors, a nucleator dissolved in an organoaluminum compound or in an organoaluminum compound and an organic solvent can be regenerated by bringing it into contact with water or a proton-donating substance. In cases where a method in which a polymerization catalyst is decomposed by a water treatment process is employed, a nucleator is also expected to be regenerated by the water treatment; however, an increase in the amount of treatment water leads to an increase in the water content of the resulting polymer. When an olefin polymer having a high water content is molded, there are such problems that the transparency of the resulting molded article is reduced and that air bubbles are formed in the molded article. Moreover, an extensive water treatment process is industrially disadvantageous because it leads to an increase in the energy required for the step of separating water and olefin polymer or drying. Therefore, by applying a nitrogen gas containing water or a proton-donating substance or steam, an olefin resin composition having excellent transparency and processability can be produced by an industrially advantageous method.

That is, the method of producing an olefin resin composition according to the third embodiment of the present invention is characterized by comprising the step of bringing a nitrogen gas containing water or a proton-donating substance, or steam, into contact with an olefin polymer obtained by polymerizing an olefin monomer with incorporation of a nucleator dissolved in an organoaluminum compound or in an organoaluminum compound and an organic solvent before or during the polymerization.

Further, the method of producing an olefin resin composition according to the third embodiment of the present invention is also characterized by comprising the step of melt-kneading an olefin polymer, which is obtained by polymerizing an olefin monomer with incorporation of a nucleator dissolved in an organoaluminum compound or in an organoaluminum compound and an organic solvent before or during the polymerization, while injecting a nitrogen gas containing water or a proton-donating substance, or steam, into an extruder.

In the third embodiment of the present invention, it is preferred that the above-described nucleator be a compound represented by the following Formula (1):

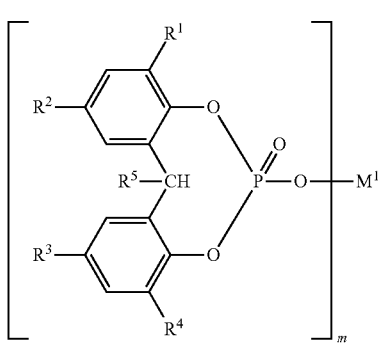

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn).

In the third embodiment of the present invention, it is preferred that the above-described nucleator be an amide compound.

In the third embodiment of the present invention, it is also preferred that the above-described organoaluminum compound be a trialkylaluminum.

Further, in the third embodiment of the present invention, it is preferred that the above-described organic solvent be selected from aliphatic hydrocarbon compounds and aromatic hydrocarbon compounds.

In the third embodiment of the present invention, it is preferred that the above-described proton-donating substance be selected from methanol and ethanol.

In the third embodiment of the present invention, it is also preferred that the above-described olefin polymer be polypropylene.

The olefin resin composition according to the third embodiment of the present invention is produced by the above-described method of producing an olefin resin composition according to the present invention and characterized by having a water content in the range of 0.1 to 5 parts by mass with respect to 100 parts by mass of an olefin polymer.

The molded article according to the third embodiment of the present invention is characterized in that it is obtained by molding the above-described olefin resin composition.

Yet still further, in order to solve the above-described fourth, fifth and sixth problems, the present inventors intensively studied and discovered that these problems can be solved by polymerizing an olefin monomer with the use of a nucleator dissolved in an organoaluminum compound or in an organoaluminum compound and an organic solvent, thereby completing the present invention.

That is, the method of producing an olefin resin composition according to the fourth embodiment of the present invention is characterized by comprising the step of polymerizing an olefin monomer with incorporation of a nucleator component, which is dissolved in an organoaluminum compound or in an organoaluminum compound and an organic solvent, before or during the polymerization of the olefin monomer such that the nucleator component is blended in an amount of 0.001 to 0.5 parts by mass with respect to 100 parts by mass of an olefin polymer obtained by the polymerization of the olefin monomer.

The method of producing an olefin resin composition according to the fourth embodiment of the present invention can preferably produce an olefin resin composition that does not show fogging in a fogging test prescribed in ISO-6452 under conditions where the heating temperature is 100° C., the heating time is 5 hours and the cooling temperature is 50° C.

The method of producing an olefin resin composition according to the fourth embodiment of the present invention can preferably produce an olefin resin composition capable of yielding a molded article having a flexural modulus, which is measured in accordance with ISO178, of not less than 1,600 MPa, and comprises the step of polymerizing an olefin monomer with incorporation of a nucleator component, which is dissolved in an organoaluminum compound or in an organoaluminum compound and an organic solvent, before or during the polymerization of the olefin monomer such that the nucleator component is blended in an amount of 0.001 to 0.5 parts by mass with respect to 100 parts by mass of an olefin polymer obtained by the polymerization of the olefin monomer.

In the method of producing an olefin resin composition according to the fourth embodiment of the present invention, it is preferred that the above-described nucleator be a compound represented by the following Formula (1):

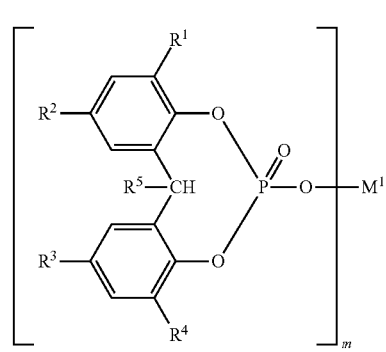

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn).

In the method of producing an olefin resin composition according to the fourth embodiment of the present invention, it is preferred that the above-described nucleator be an amide compound.

In the method of producing an olefin resin composition according to the fourth embodiment of the present invention, it is preferred that the above-described organoaluminum compound be a trialkylaluminum.

Further, in the method of producing an olefin resin composition according to the fourth embodiment of the present invention, it is preferred that the above-described organic solvent be selected from aliphatic hydrocarbon compounds and aromatic hydrocarbon compounds.

The molded article according to the fourth embodiment of the present invention is characterized in that it is obtained by molding an olefin resin composition produced by any one of the above-described methods of producing an olefin resin composition.

The sanitary material of the present invention is characterized in that it is obtained by molding an olefin resin composition produced by the method of producing an olefin resin composition according to the fourth embodiment of the present invention.

The film of the present invention is characterized in that it is obtained by molding an olefin resin composition produced by the method of producing an olefin resin composition according to the fourth embodiment of the present invention.

The fiber material of the present invention is characterized in that it is obtained by molding an olefin resin composition produced by the method of producing an olefin resin composition according to the fourth embodiment of the present invention.

Effects of the Invention

According to the first embodiment of the present invention, a nucleator masterbatch which has excellent transparency and is capable of imparting an olefin polymer with a high crystallization temperature can be produced. This is believed to be because the nucleator is uniformly dispersed and the olefin polymer is evenly crystallized as a result.

According to the second embodiment of the present invention, an olefin-based resin composition having excellent transparency and a high crystallization temperature can be produced.

According to the third embodiment of the present invention, a method of producing an olefin resin composition by which an olefin resin composition having excellent transparency and processability can be produced, an olefin resin composition produced by the method, and a molded article thereof can be provided.

According to the fourth embodiment of the present invention, a molded article having improved transparency and moldability can be obtained and, particularly, a film material and a fiber material can be stably produced.

In addition, according to the fourth embodiment of the present invention, a method of producing an olefin resin composition for a sanitary material, which is capable of producing an olefin resin composition that is suitable for a sanitary material because it can yield a molded article in which migration of a nucleator component to the surface is inhibited and the physical properties are improved, can be provided.

Moreover, according to the fourth embodiment of the present invention, a method of producing an olefin resin composition, by which an olefin resin composition that can yield a molded article having excellent rigidity in which occurrence of a defect in the outer appearance is inhibited can be produced without a reduction in the polymerization activity, can be provided, and weight reduction and thinning of a molded article can thus be achieved.

MODE FOR CARRYING OUT THE INVENTION

Mode for Carrying Out the First Embodiment of the Present Invention

The method of producing a nucleator masterbatch according to the first embodiment of the present invention will now be described in detail.

Examples of the nucleator (nucleating agent) component used in the present invention include nucleators that dissolve in an organoaluminum compound or in an organoaluminum compound and an organic solvent. Those non-dissolving nucleators show poor dispersion in a resin, so that the effects of the present invention may not be attained. It is thus necessary to check the solubility of the nucleator component before carrying out the production method of the present invention. Whether a nucleator dissolves or not can be judged by dissolving the nucleator in the organoaluminum compound or in the organoaluminum compound and the organic solvent and visually examining if a residual material is generated.

Specific examples of such a compound include compounds represented by the below-described Formula (1), metal phosphates such as lithium-2,2'-methylene-bis(4,6-di-tert-butylphenyl)phosphate, and amide compounds; however, since a nucleator decomposed by an organoaluminum compound may color the resulting polymer or inhibit the polymerization activity, such a nucleator cannot be used in the production method of the present invention.

In the present invention, as the above-described nucleator, a compound represented by the following Formula (1) is preferably used:

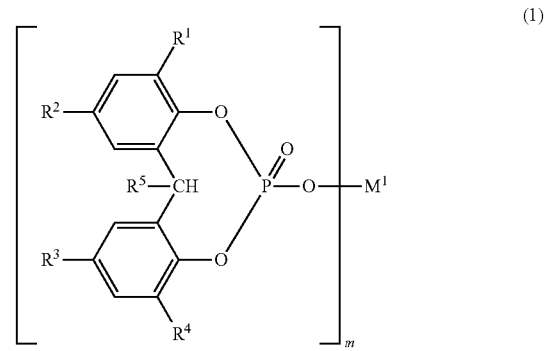

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn).

Examples of the alkyl group having 1 to 9 carbon atoms which is represented by $R^1$, $R^2$, $R^3$ and $R^4$ in the Formula (1) include a methyl group, an ethyl group, a propyl group, an isopropyl group, a butyl group, a sec-butyl group, a tert-butyl group, an isobutyl group, an amyl group, an isoamyl group, a tert-amyl group, a hexyl group, a cyclohexyl group, a heptyl group, an isoheptyl group, and a tert-heptyl group. Thereamong, the alkyl group having 1 to 9 carbon atoms is particularly preferably a methyl group, a tert-butyl group or a tert-heptyl group.

Examples of the Group II element represented by $M^1$ in the Formula (1) include beryllium, magnesium, calcium, strontium, barium and radium. Thereamong, the Group II element is preferably magnesium or calcium since such a nucleator component shows prominent nucleation effect.

Examples of the nucleator component used in the present invention also include the following compounds. However, the present invention is not restricted thereto.

P-1
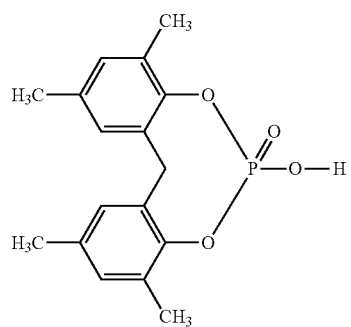
P-2
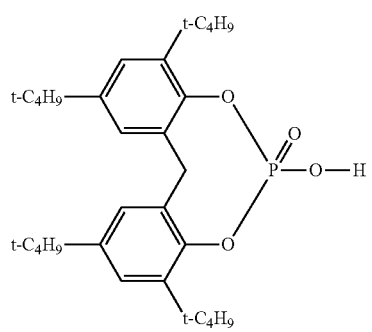
P-3
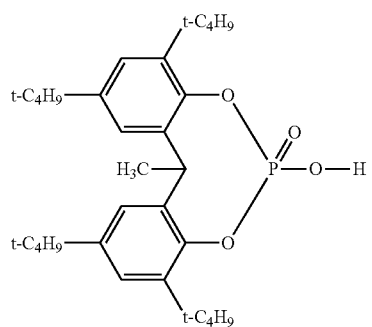
P-4
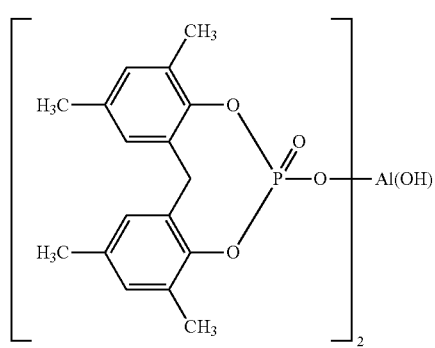
P-5
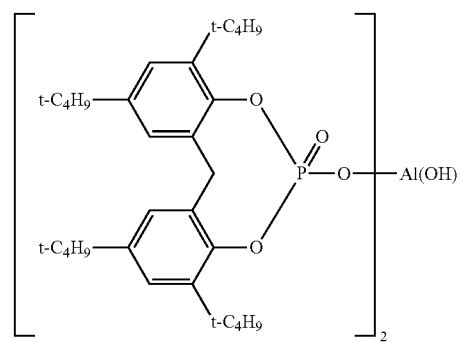
P-6
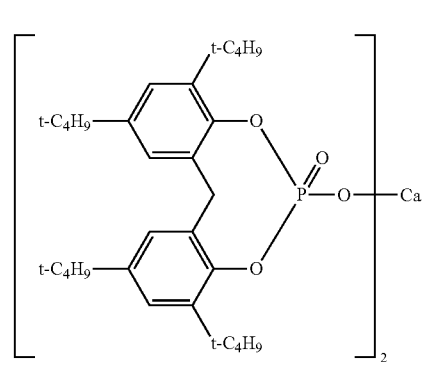
P-7
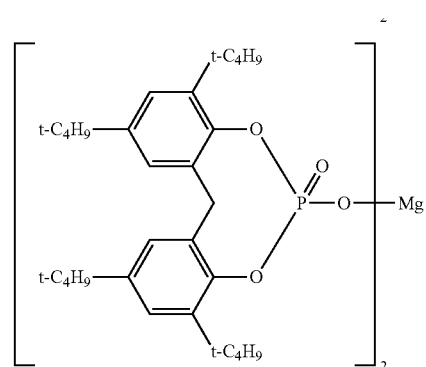
P-8
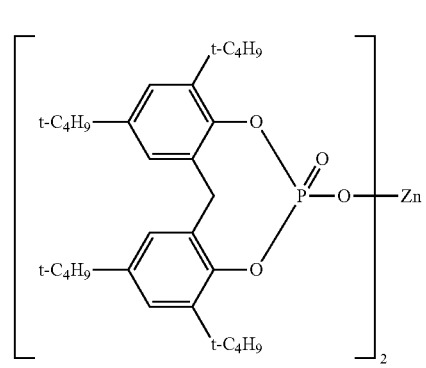

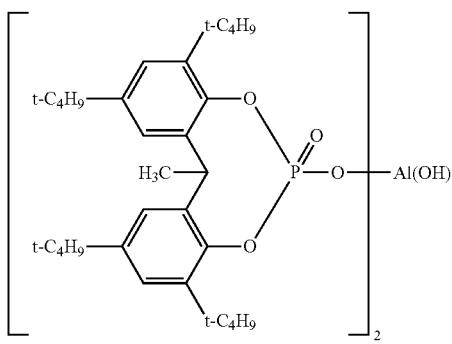

Examples of the above-described amide compounds in the present invention include compounds having a structure in which four or more carbamate structures represented by the following Formula (2) are connected via a hydrocarbon group having 1 to 10 carbon atoms;

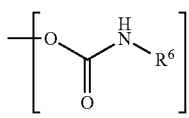

(wherein, $R^6$ represents a hydrogen atom, an alkyl group having 1 to 12 carbon atoms which is optionally branched and/or substituted, a cycloalkyl group having 3 to 12 carbon atoms which is optionally substituted, or an aryl group having 6 to 20 carbon atoms which is optionally substituted; and the plural $R^6$ may be different from each other);

compounds represented by the following Formula (3):

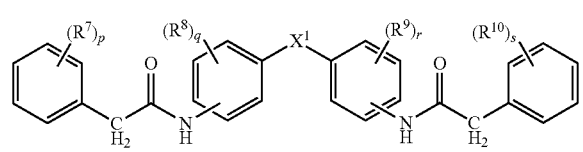

(wherein, $X^1$ represents an alkylene group having 1 to 5 carbon atoms which is optionally branched; $R^7$ to $R^{10}$ each independently represent one selected from the group consisting of a halogen atom, an alkyl group having 1 to 4 carbon atoms which is optionally substituted and/or branched and an alkoxy group having 1 to 4 carbon atoms which is optionally substituted and/or branched; and p, q, r and s each independently represent an integer of 0 to 3 (with a proviso that p and s are not 0));

compounds represented by the following Formula (4):

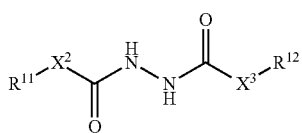

(wherein, $R^{11}$ and $R^{12}$ each independently represent an alkyl group having 1 to 10 carbon atoms which is optionally branched and/or substituted, a cycloalkyl group having 3 to 12 carbon atoms which is optionally substituted, or an aryl group having 6 to 20 carbon atoms which is optionally substituted; and $X^2$ and $X^3$ each independently represent a single bond or an alkylene group having 1 to 5 carbon atoms which is optionally branched, with a proviso that the above-described substitutions are not by a hydroxyl group);

compounds represented by the following Formula (5):

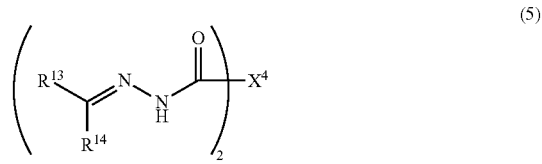

(wherein, $R^{13}$ and $R^{14}$ each independently represent a hydrogen atom, an alkyl group having 1 to 12 carbon atoms which is optionally branched and/or substituted, a cycloalkyl group having 3 to 12 carbon atoms which is optionally substituted, or an aryl group having 6 to 20 carbon atoms which is optionally substituted; and $X^4$ represents an alkylene group having 1 to 10 carbon atoms which is optionally branched and/or substituted, a cycloalkylene group having 3 to 12 carbon atoms which is optionally substituted, or an arylene group having 6 to 20 carbon atoms which is optionally substituted, wherein $R^{13}$ and $R^{14}$ are optionally bound with each other to form a condensed ring structure);

compounds represented by the following Formula (6):

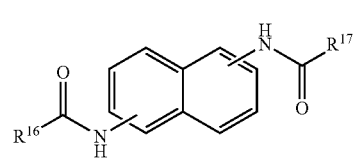

(wherein, $R^{15}$ represents a hydrogen atom, an alkyl group having 1 to 12 carbon atoms which is optionally branched and/or substituted, a cycloalkyl group having 3 to 12 carbon atoms which is optionally substituted, or an aryl group having 6 to 20 carbon atoms which is optionally substituted; and $X^5$ represents an alkylene group having 1 to 10 carbon atoms which is optionally branched and/or substituted, a cycloalkylene group having 3 to 12 carbon atoms which is optionally substituted, or an arylene group having 6 to 20 carbon atoms which is optionally substituted);

compounds represented by the following Formula (7):

(wherein, $R^{16}$ and $R^{17}$ each independently represent an alkyl group having 1 to 6 carbon atoms which is optionally branched); and fatty acid amide compounds.

The hydrocarbon group having 1 to 10 carbon atoms via which the carbamate structures represented by the above-described Formula (2) are connected refers to a functional group constituted by a carbon atom(s) and hydrogen atoms. The molecular structure thereof may be of, for example, an alkane, an alkene, a cycloalkane or an aromatic hydrocarbon, and at least four hydrogen atoms of the hydrocarbon group are substituted with the carbamate structures. The above-described hydrocarbon group is optionally interrupted by an oxygen atom, a sulfur atom, a carbonyl group, an ester group, an amide group, an imino group or an aryl group, and the hydrogen atoms of the hydrocarbon group are also optionally substituted with any of the below-described substituents. These interruptions or substitutions may exist in combination as well.

Examples of the alkyl group having 1 to 12 carbon atoms which is optionally branched and represented by $R^6$ in the above-described Formula (2) include a methyl group, an ethyl group, a propyl group, an isopropyl group, a butyl group, a sec-butyl group, a tert-butyl group, an isobutyl group, a pentyl group, an isopentyl group, a tert-pentyl group, a hexyl group, a 2-hexyl group, a 3-hexyl group, a heptyl group, a 2-heptyl group, a 3-heptyl group, an isoheptyl group, a tert-heptyl group, an n-octyl group, an isooctyl group, a tert-octyl group, a nonyl group, an isononyl group, a decyl group, an undecyl group, and a dodecyl group. Thereamong, a hexyl group and an octyl group are preferred.

These alkyl groups are optionally interrupted by an oxygen atom, a sulfur atom, a carbonyl group, an ester group, an amide group, an imino group or any of the below-described aryl groups, and the hydrogen atoms of the alkyl groups are also optionally substituted with any of the below-described substituents. These interruptions or substitutions may exist in combination as well.

Examples of a substituent that may be contained in the alkyl group in the above-described Formula (2) include a hydroxyl group, a halogen atom, an amino group, a nitro group, a cyano group, a chain aliphatic group such as an alkenyl group, an alkenyloxy group, an alkanoyloxy group or an alkoxycarbonyl group, pyrrole, furan, thiophene, imidazole, pyridine, pyridazine, pyrimidine, pyrazine, piperidine, morpholine, 2H-pyran, 4H-pyran, phenyl, biphenyl, triphenyl, naphthalene, anthracene, pyrrolidine, pyrindine, indoline, indole, isoindole, indazole, purine, quinolizine, quinoline, isoquinoline, and a cyclic aliphatic group such as a cycloalkyl group.

Examples of the cycloalkyl group having 3 to 12 carbon atoms which is optionally substituted and represented by $R^6$ in the above-described Formula (2) include a cyclopropyl group, a cyclopentyl group, a cyclohexyl group, a cycloheptyl group, a cyclooctyl group, a cyclononyl group and a cyclodecyl group, among which cyclohexyl group is preferred. The hydrogen atoms of the cycloalkyl group are optionally substituted with a hydroxy group, a halogen atom, an alkyl group, an alkoxy group, an alkenyl group, an alkenyloxy group, an alkoxyalkyl group, an alkanoyloxy group, an alkoxycarbonyl group, a nitrile group or a cyano group.

In the aryl group having 6 to 20 carbon atoms which is optionally substituted and represented by $R^6$ in the above-described Formula (2), the hydrogen atoms are optionally substituted with a halogen atom, a nitro group, a cyano group, an alkyl group, an alkoxy group, an alkenyl group, an alkenyloxy group, an alkoxyalkyl group, an alkanoyloxy group or an alkoxycarbonyl group. Examples of such aryl group include a phenyl group, a 3,4,5-trimethoxyphenyl group, a 4-tert-butylphenyl group, a biphenyl group, a naphthyl group, a methylnaphthyl group, an anthracenyl group and a phenanthryl group, among which phenyl group is preferred.

Among the compounds represented by the above-described Formula (2), a compound represented by the following Formula (8):

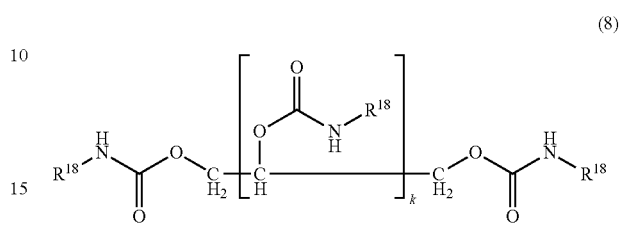

(wherein, $R^{18}$ is the same as $R^6$ in the Formula (2); k represents an integer of 2 to 10; and the plural $R^{18}$ may be different from each other), or a compound represented by the following Formula (9):

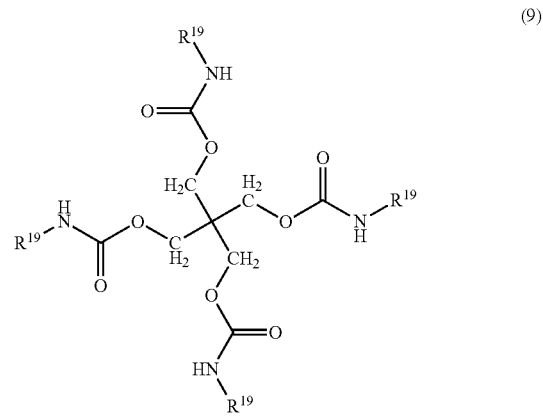

(wherein, $R^{19}$ is the same as $R^6$ in the Formula (2); and the plural $R^{19}$ may be different from each other)

can be preferably used.

Specific examples of the structure of the compound represented by the above-described Formula (2) in the present invention include those of the following compounds. However, the present invention is not restricted thereto by any means.

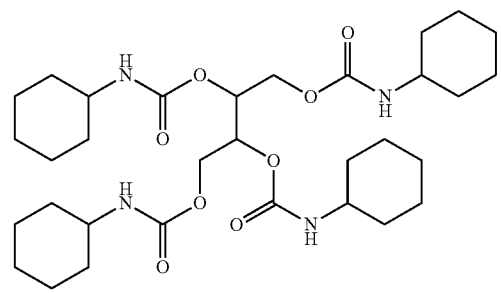

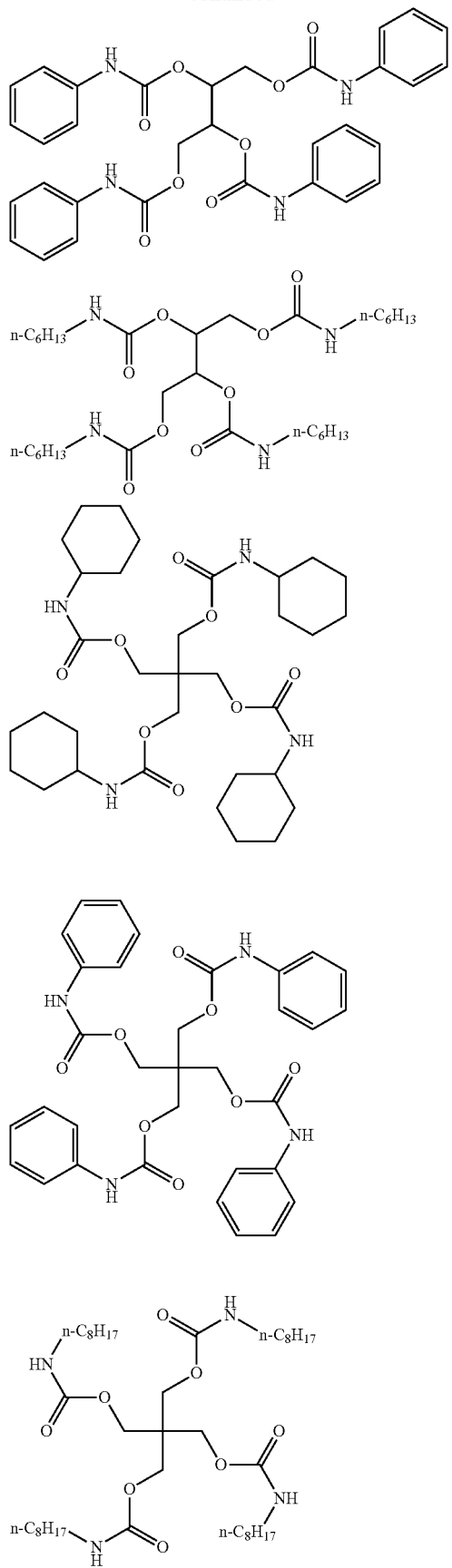
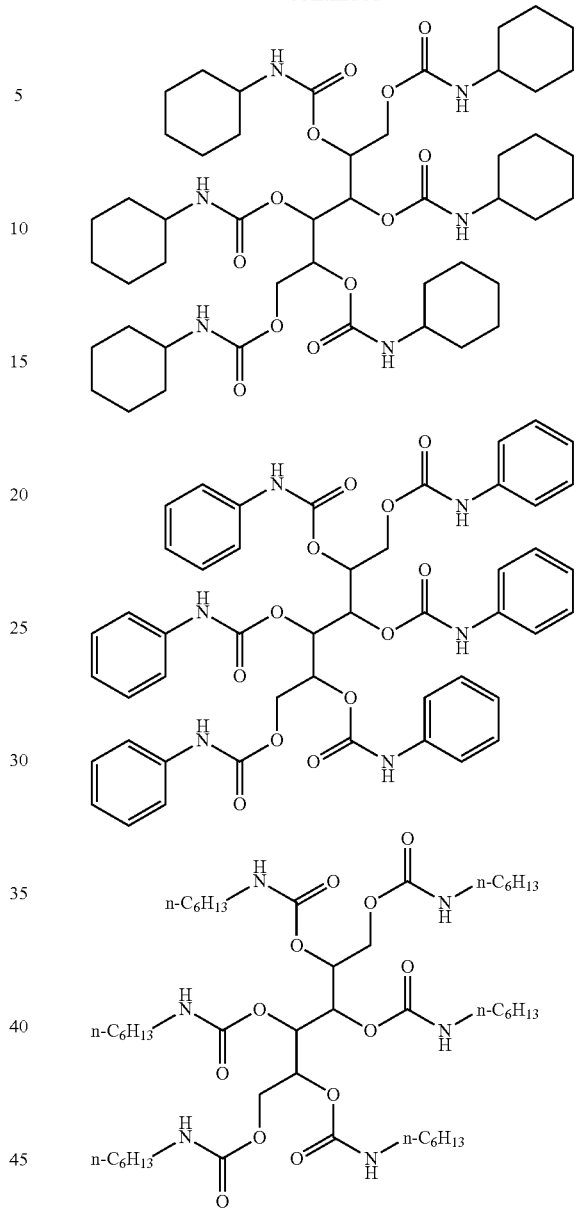

Examples of the alkylene group having 1 to 5 carbon atoms which is optionally branched and represented by $X^1$ in the above-described Formula (3) include a methylene group, an ethylene group, a propylene group, a butylene group, an isobutylene group and a pentylene group. In these alkylene groups, —$CH_2$— is optionally substituted with —O—, —CO—, —COO— or —OCO—, and the hydrogen atoms are optionally substituted with a halogen atom, an alkenyl group, an alkenyloxy group, an alkanoyloxy group, an alkoxycarbonyl group, a nitro group, a cyano group, an aryl group or a saturated aliphatic ring.

Examples of the alkyl group having 1 to 4 carbon atoms which is optionally substituted and/or branched and represented by $R^7$ to $R^{10}$ in the above-described Formula (3) include a methyl group, an ethyl group, a propyl group, an isopropyl group, a butyl group and a tert-butyl group. These alkyl groups are optionally interrupted by an oxygen atom, a sulfur atom, a carbonyl group, an ester group, an amide group, an imino group or any of the above-described aryl groups, and the hydrogen atoms of the alkyl groups are also optionally substituted with any of the above-described substituents. These interruptions or substitutions may exist in combination as well.

Examples of the alkoxy group having 1 to 4 carbon atoms which is optionally substituted and/or branched and represented by $R^7$ to $R^{10}$ in the above-described Formula (3) include a methoxy group, an ethoxy group, a propoxy group, an isopropoxy group and a butoxy group. These alkoxy groups are optionally interrupted by an oxygen atom, a sulfur atom, a carbonyl group, an ester group, an amide group, an imino group or any of the above-described aryl groups, and the hydrogen atoms of the alkoxy groups are also optionally substituted with any of the above-described substituents. These interruptions or substitutions may exist in combination as well.

Specific examples of the structure of the compound represented by the above-described Formula (3) in the present invention include those of the following compounds. However, the present invention is not restricted thereto by any means.

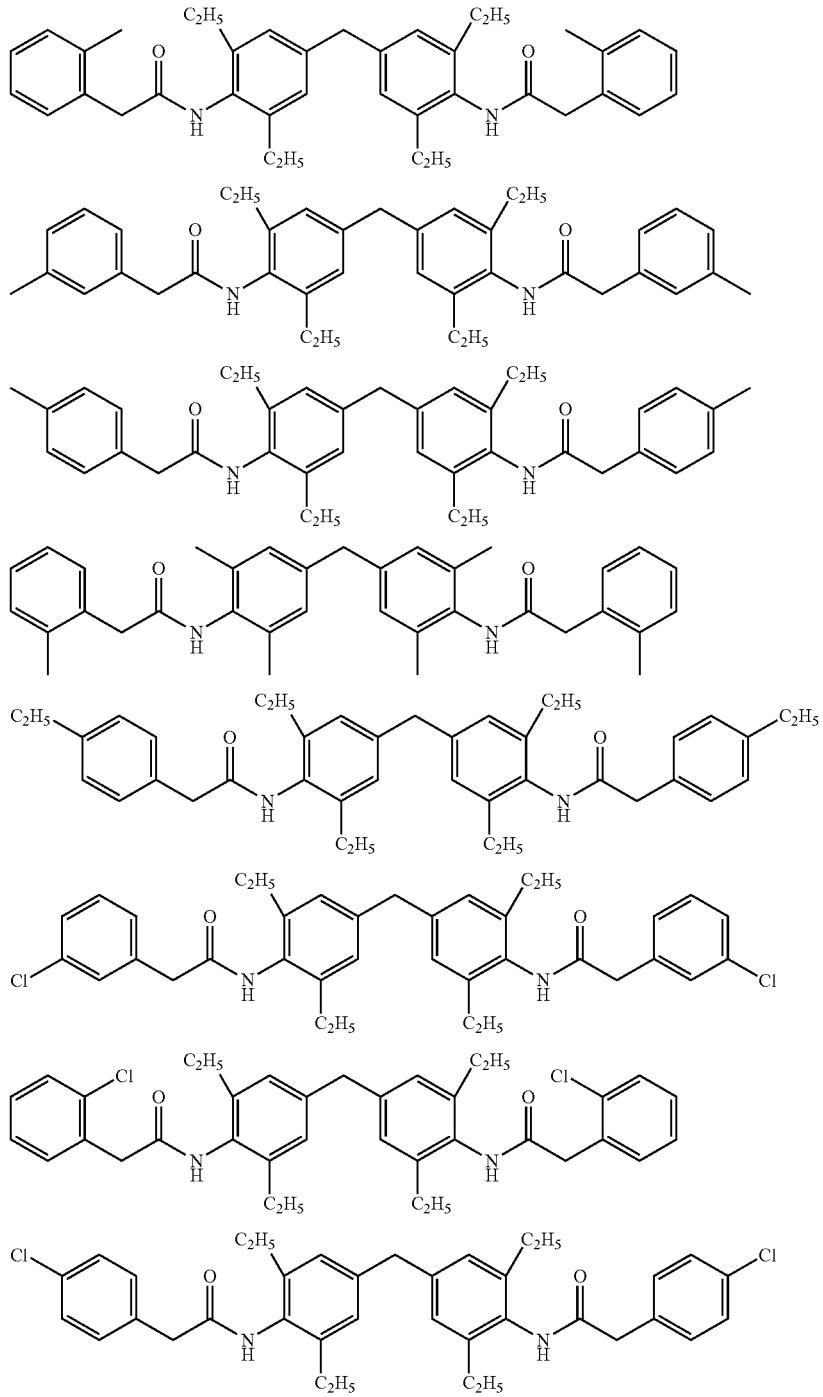

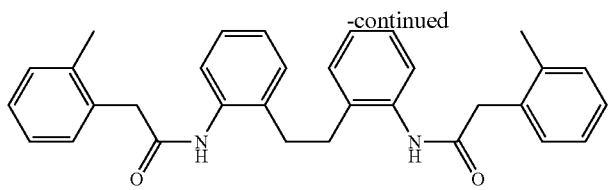

Among the compounds represented by the above-described Formula (3), one in which $R^7$ and $R^{10}$ are at an ortho position of each benzene ring is preferably used.

Further, a compound in which p and s are 1 and q and r are 2 in the Formula (3) is preferably used.

Examples of the alkyl group having 1 to 10 carbon atoms which is optionally branched and/or substituted and represented by $R^{11}$ or $R^{12}$ in the above-described Formula (4) include a methyl group, an ethyl group, a propyl group, an isopropyl group, a butyl group, a sec-butyl group, a tert-butyl group, an isobutyl group, a pentyl group, an isopentyl group, a tert-pentyl group, a hexyl group, a 2-hexyl group, a 3-hexyl group, a heptyl group, a 2-heptyl group, a 3-heptyl group, an isoheptyl group, a tert-heptyl group, an n-octyl group, an isooctyl group, a tert-octyl group, a nonyl group, an isononyl group, and a decyl group. These alkyl groups are optionally interrupted by an oxygen atom, a sulfur atom, a carbonyl group, an ester group, an amide group, an imino group or any of the above-described aryl groups, and the hydrogen atoms of the alkyl groups are also optionally substituted with any of the above-described substituents. These interruptions or substitutions may exist in combination as well.

Examples of the cycloalkyl group having 3 to 12 carbon atoms which is optionally substituted and represented by $R^{11}$ or $R^{12}$ in the above-described Formula (4) include the same ones as those exemplified above for $R^6$ of the Formula (2).

Examples of the aryl group having 6 to 20 carbon atoms which is optionally substituted and represented by $R^{11}$ or $R^{12}$ in the above-described Formula (4) include the same ones as those exemplified above for $R^6$ of the Formula (2).

Examples of the alkylene group having 1 to 5 carbon atoms which is optionally branched and represented by $X^2$ or $X^3$ in the above-described Formula (4) include the same ones as those exemplified above for $X^1$ of the Formula (3).

Among the compounds represented by the above-described Formula (4), a compound represented by any one of the following Formulae (10) to (12) can be preferably used:

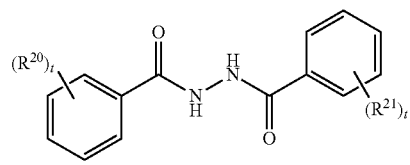

(wherein, $R^{20}$ represents the same group as $R^{11}$ in the Formula (4); $R^{21}$ represents the same group as $R^{12}$ in the Formula (4); and t represents 0 or 1).

Specific examples of the structure of the compound represented by the above-described Formula (4) in the present invention include those of the following compounds. However, the present invention is not restricted thereto by any means.

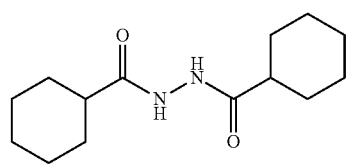

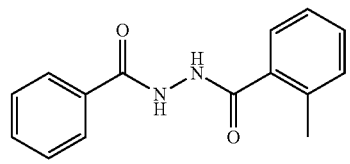

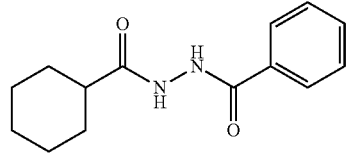

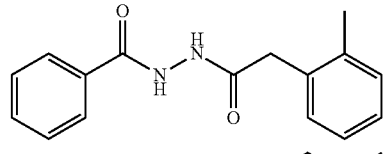

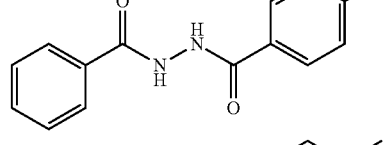

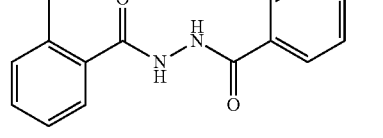

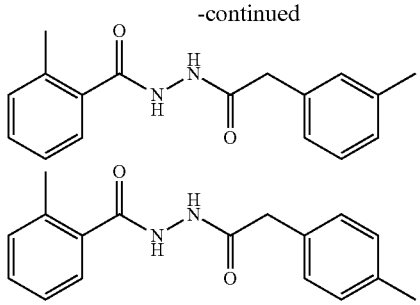

Examples of the alkyl group having 1 to 12 carbon atoms which is optionally branched and represented by $R^{13}$ and $R^{14}$ in the Formula (5) or by $R^{15}$ in the Formula (6) include the same ones as those exemplified above for $R^6$ of the Formula (2).

Examples of the cycloalkyl group having 3 to 12 carbon atoms which is optionally substituted and represented by $R^{13}$ and $R^{14}$ in the Formula (5) or by $R^{15}$ in the Formula (6) include the same ones as those exemplified above for $R^6$ of the Formula (2).

Examples of the aryl group having 6 to 20 carbon atoms which is optionally substituted and represented by $R^{13}$ and $R^{14}$ in the Formula (5) or by $R^{15}$ in the Formula (6) include the same ones as those exemplified above for $R^6$ of the Formula (2).

Examples of the alkylene group having 1 to 10 carbon atoms which is optionally branched and/or substituted and represented by $X^4$ and $X^5$ in the above-described Formula (5) or (6) include a methylene group, an ethylene group, a propylene group, a methyl ethylene group, a butylene group, a 1-methylpropylene group, a 2-methylpropylene group, a 1,2-dimethylpropylene group, a 1,3-dimethylpropylene group, a 1-methylbutylene group, a 2-methylbutylene group, a 3-methylbutylene group, a 1,3-dimethylbutylene group, a pentylene group, a hexylene group, a heptylene group, and an octylene group. These alkylene groups are optionally interrupted by an oxygen atom, a sulfur atom, a carbonyl group, an ester group, an amide group, an imino group or any of the above-described aryl groups, and the hydrogen atoms of the alkylene groups are also optionally substituted with any of the above-described substituents. These interruptions or substitutions may exist in combination as well.

Examples of the cycloalkylene group having 3 to 12 carbon atoms which is optionally substituted and represented by $X^4$ and $X^5$ in the above-described Formula (5) or (6) include a 1,2-cyclopropylene group, a 1,3-cycloheptylene group, and a trans-1,4-cyclohexylene group. The hydrogen atoms of these cycloalkylene groups are also optionally substituted with any of the above-described substituents.

Examples of the arylene group having 6 to 20 carbon atoms which is optionally substituted and represented by $X^4$ and $X^5$ in the above-described Formula (5) or (6) include a 1,4-phenylene group, a 1,3-phenylene group, a 1,5-naphthylene group, a 2,6-naphthylene group, a 2,6-phenalene group, a 1,6-phenanthrene group, a 2,7-phenanthrene group, and a 2,6-anthracene group. The hydrogen atoms of these arylene groups are also optionally substituted with any of the above-described substituents.

When $R^{13}$ and $R^{14}$ in the Formula (5) or $R^{15}$ in the Formula (6) is an alkyl group and the alkyl group has a large number of carbon atoms, although such a compound exhibits actions and effects as a nucleator of an olefin polymer, since the heat resistance of the compound itself is reduced, the compound may be decomposed during molding of the olefin polymer to adversely affect the resulting molded article. Accordingly, in the present invention, the number of the carbon atoms of the alkyl group represented by $R^{13}$, $R^{14}$ or $R^{15}$ is preferably in the range of 1 to 8, particularly preferably 1 to 5.

Specific examples of the structure of the compound represented by the above-described Formula (5) in the present invention include those of the following compounds. However, the present invention is not restricted thereto by any means.

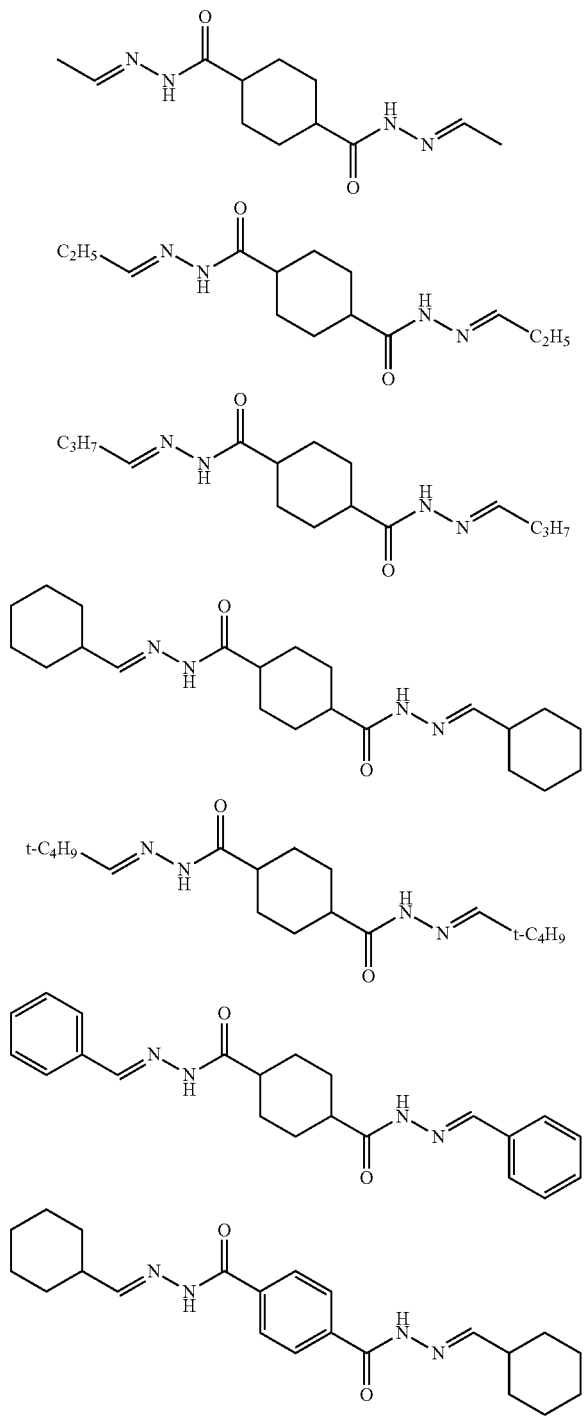

Specific examples of the structure of the compound represented by the above-described Formula (6) in the present invention include those of the following compounds. However, the present invention is not restricted thereto by any means.

Examples of the alkyl group having 1 to 6 carbon atoms which is optionally branched and represented by $R^{16}$ and $R^{17}$ in the above-described Formula (7) include a methyl group, an ethyl group, a propyl group, an isopropyl group, a butyl group, an isobutyl group, a tert-butyl group, a pentyl group, an isopentyl group, a tert-pentyl group, a neopentyl group, a hexyl group, and an isohexyl group.

Among the compounds represented by the above-described Formula (7), a compound represented by the following Formula (13):

(13)

(wherein, $R^{22}$ represents the same group as $R^{16}$ in the Formula (7); and $R^{23}$ represents the same group as $R^{17}$ in the Formula (7)), or a compound represented by the following Formula (14):

(14)

(wherein, $R^{24}$ represents the same group as $R^{16}$ in the Formula (7); and $R^{25}$ represents the same group as $R^{17}$ in the Formula (7))

can be preferably used.

Specific examples of the structure of the compound represented by the above-described Formula (7) in the present invention include those of the following compounds. However, the present invention is not restricted thereto by any means.

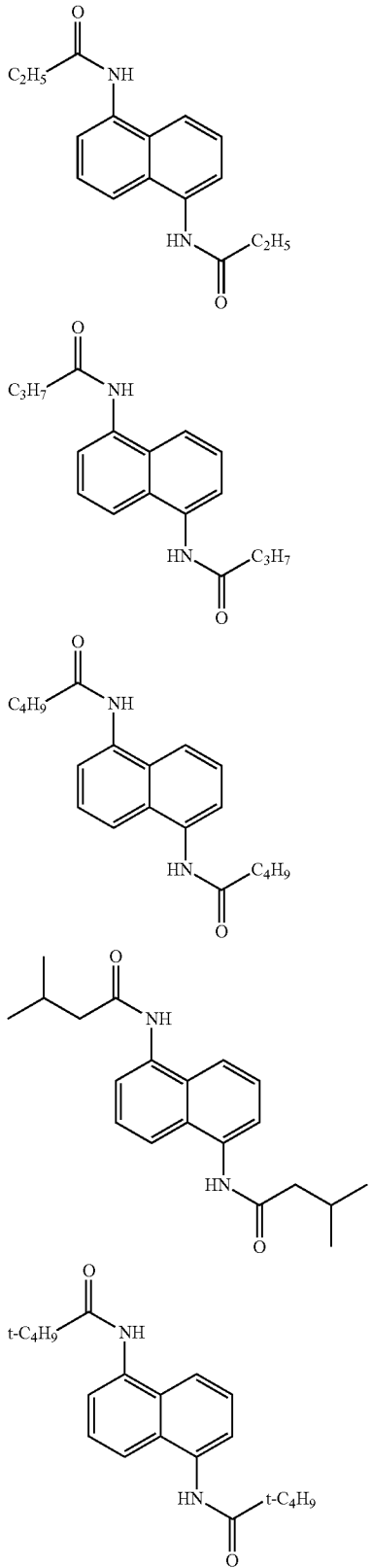

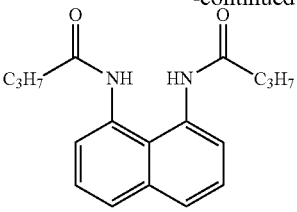

Examples of the above-described fatty acid amide compounds include ethylene-bis-stearamide, ethylenebis(12-hydroxystearamide) and stearic acid amide.

Further, examples of amide compounds other than the above-described ones include 1,2,3-propanetricarboxylic acid tricyclohexylamide, 1,2,3-propanetricarboxylic acid tri (2-methylcyclohexylamide), 1,2,3-propanetricarboxylic acid tri(3-methylcyclohexylamide), 1,2,3-propanetricarboxylic acid tri(4-methylcyclohexylamide), 1,2,3-propanetricarboxylic acid tri(2,3-dimethylcyclohexylamide), 1,2,3-propanetricarboxylic acid tri(2-ethylcyclohexylamide), 1,2,3-propanetricarboxylic acid tri(3-ethylcyclohexylamide), 1,2,3-propanetricarboxylic acid tri(4-ethylcyclohexylamide), 1,2,3-propanetricarboxylic acid tri(2-n-propylcyclohexylamide), 1,2,3-propanetricarboxylic acid tri(3-n-propylcyclohexylamide), 1,2,3-propanetricarboxylic acid tri(4-n-propylcyclohexylamide), 1,2,3-propanetricarboxylic acid tri(2-isopropylcyclohexylamine), 1,2,3-propanetricarboxylic acid tri(3-isopropylcyclohexylamine), 1,2,3-propanetricarboxylic acid tri(4-isopropylcyclohexylamine), 1,2,3-propanetricarboxylic acid tri(2-n-butylcyclohexylamide), 1,2,3-propanetricarboxylic acid tri(3-n-butylcyclohexylamide), 1,2,3-propanetricarboxylic acid tri(4-n-butylcyclohexylamide), 1,2,3-propanetricarboxylic acid tri(2-isobutylcyclohexylamide), 1,2,3-propanetricarboxylic acid tri(3-isobutylcyclohexylamide), 1,2,3-propanetricarboxylic acid tri(4-isobutylcyclohexylamide), 1,2,3-propanetricarboxylic acid tri(2-sec-butylcyclohexylamide), 1,2,3-propanetricarboxylic acid tri (3-sec-butylcyclohexylamide), 1,2,3-propanetricarboxylic acid tri(4-sec-butylcyclohexylamide), 1,2,3-propanetricarboxylic acid tri(2-tert-butylcyclohexylamide), 1,2,3-propanetricarboxylic acid tri(3-tert-butylcyclohexylamide), 1,2,3-propanetricarboxylic acid tri(4-tert-butylcyclohexylamide), 1,2,3,4-butanetetracarboxylic acid tetracyclohexylamide, 1,2,3,4-butanetetracarboxylic acid tetra(2-methylcyclohexylamide), 1,2,3,4-butanetetracarboxylic acid tetra(3-methylcyclohexylamide), 1,2,3,4-butanetetracarboxylic acid tetra(4-methylcyclohexylamide), 1,2,3,4-butanetetracarboxylic acid tetra(2-ethylcyclohexylamide), 1,2,3,4-butanetetracarboxylic acid tetra(3-ethylcyclohexylamide), 1,2,3,4-butanetetracarboxylic acid tetra(4-ethylcyclohexylamide), 1,2,3,4-butanetetracarboxylic acid tetra(2-n-propylcyclohexylamide), 1,2,3,4-butanetetracarboxylic acid tetra(3-n-propylcyclohexylamide), 1,2,3,4-butanetetracarboxylic acid tetra(4-n-propylcyclohexylamide), 1,2,3,4-butanetetracarboxylic acid tetra(2-isopropylcyclohexylamine), 1,2,3,4-butanetetracarboxylic acid tetra(3-isopropylcyclohexylamine), 1,2,3,4-butanetetracarboxylic acid tetra(4-isopropylcyclohexylamide), 1,2,3,4-butanetetracarboxylic acid tetra(2-n-butylcyclohexylamide), 1,2,3,4-butanetetracarboxylic acid tetra(3-n-butylcyclohexylamide), 1,2,3,4-butanetetracarboxylic acid tetra(4-n-butylcyclohexylamide), 1,2,3,4-butanetetracarboxylic acid tetra(2-isobutylcyclohexylamide), 1,2,3,4-butanetetracarboxylic acid tetra(3-isobutylcyclohexylamide), 1,2,3,4-butanetetracarboxylic acid tetra(4-isobutylcyclohexylamide), 1,2,3,4-butanetetracarboxylic acid tetra(2-sec-butylcyclohexylamide), 1,2,3,4-butanetetracarboxylic acid tetra(3-sec-butylcyclohexylamide), 1,2,3,4-butanetetracarboxylic acid tetra(4-sec-butylcyclohexylamide), 1,2,3,4-butanetetracarboxylic acid tetra(2-tert-butylcyclohexylamide), 1,2,3,4-butanetetracarboxylic acid tetra(3-tert-butylcyclohexylamide), 1,2,3,4-butanetetracarboxylic acid tetra(4-tert-butylcyclohexylamide), 1,3,5-benzenetricarboxylic acid tris(benzylamide), 1,3,5-benzenetricarboxylic acid tris(cycloheptylamide), 1,3,5-benzenetricarboxylic acid tris(3-methylcyclohexylamide), 1,3,5-benzenetricarboxylic acid tris(3,4-dimethylphenylamide), 1,3,5-benzenetricarboxylic acid tris(cyclododecylamine), 1,3,5-benzenetricarboxylic acid tris(tert-octylamide), 1,3,5-benzenetricarboxylic acid tris(S(+)-1-cyclohexylethylamide), 1,3,5-benzenetricarboxylic acid tris(R(−)-1-cyclohexylethylamide), 1,3,5-benzenetricarboxylic acid tris(cyclooctylamide), 1,3,5-benzenetricarboxylic acid tris(2,3-dimethylcyclohexylamide), 1,3,5-benzenetricarboxylic acid tris(cyclooctylamide), 1,3,5-benzenetricarboxylic acid tris(n-butylamide), 1,3,5-benzenetricarboxylic acid tris(1,1,3,3-tetramethylbutylamine), and 1,3,5-tris(2,2-dimethylpropionamide)benzene.

The amount of the above-described nucleator component to be used is in the range of preferably 0.05 to 20 parts by mass, more preferably 0.1 to 5 parts by mass, with respect to 100 parts by mass of an olefin polymer obtained by the production method of the present invention. When the amount of the nucleator component is less than 0.05 parts by mass, the ratio of the nucleator in the resulting masterbatch is low; therefore, in order to impart the olefin resin with a desired performance, it is required to add a large amount of a nucleator masterbatch obtained in the present invention, which is uneconomical. Meanwhile, it is possible to add 20 parts by mass or more of the nucleator component; however, when the amount is greater than 20 parts by mass, a large amount of an organoaluminum compound must be added in order to dissolve the nucleator component, which is uneconomical, and the organoaluminum compound may remain in the resulting olefin polymer.

In the production method of the present invention, the above-described nucleator component dissolved in an organoaluminum compound or in an organoaluminum and an organic solvent is added before or during the polymerization of an olefin monomer. The site of the addition is not particularly restricted and the nucleator component can be added to any of, for example, a polymerization system, a catalyst system and a piping.

In cases where the above-described nucleator component is added before or during the polymerization of an olefin monomer, the nucleator component may be mixed with an organoaluminum compound, or the nucleator component may be dispersed in an organic solvent and an organoaluminum compound is then added thereto to dissolve the nucleator component. It is believed that the nucleator component is thereby masked with the organoaluminum compound.

As the above-described organoaluminum compound, for example, an alkylaluminum or alkylaluminum hydride can be used, and an alkylaluminum is preferred. The organoaluminum compound is particularly preferably a trialkylaluminum, and specific examples thereof include trimethylaluminum, triethylaluminum, tri-n-propylaluminum, triisobutylaluminum, tri-n-hexylaluminum and tri-n-octylaluminum. All of these organoaluminum compounds may be used in the form of a mixture. In addition, aluminoxane obtained by a reaction between an alkylaluminum or alkylaluminum hydride and water can also be used in the same manner.

In the method of producing a nucleator masterbatch according to the present invention, such an organoaluminum compound that allows the nucleator component masked with the organoaluminum compound to be regenerated by a treatment with a hydrogen-donating compound such as water, an alcohol or an acid is preferably used.

The mixing ratio of the above-described nucleator component and organoaluminum compound is preferably 1/1,000 to 1/0.3 in terms of the molar ratio between the nucleator component and the aluminum content of the organoaluminum compound. When the ratio of the nucleator component is higher than 1/0.3, excessive nucleator component may adversely affect the olefin polymerization activity, while when the ratio of the nucleator component is less than 1/1,000, the organoaluminum compound may remain in the resulting olefin polymer after the polymerization to cause a reduction in the physical properties of the olefin polymer and adversely affect a catalyst metal component, so that the polymerization may not be performed desirably.

Examples of the above-described organic solvent include aliphatic and aromatic hydrocarbon compounds. Examples of the aliphatic hydrocarbon compounds include saturated hydrocarbon compounds such as n-pentane, n-hexane, n-heptane, n-octane, isooctane and refined kerosene; and cyclic saturated hydrocarbon compounds such as cyclopentane, cyclohexane and cycloheptane. Examples of the aromatic hydrocarbon compounds include benzene, toluene, ethylbenzene and xylene. These organic solvents may be used individually, or two or more thereof may be used in combination.

Among these organic solvents, n-hexane or n-heptane is preferably used. The concentration of the organoaluminum compound in the organic solvent is in the range of preferably 0.001 to 0.5 mol/l, particularly preferably 0.01 to 0.1 mol/l.

Examples of the olefin monomer used in the present invention include ethylene, propylene, 1-butene, 1-hexene, 3-methyl-1-butene, 3-methyl-1-pentene, 4-methyl-1-pentene, vinylcycloalkane, styrene, and derivatives of these monomers.

The method of producing a nucleator masterbatch according to the present invention is characterized by comprising the step of polymerizing the above-described olefin monomer with a supply of a nucleator dissolved in an organoaluminum compound or in an organoaluminum compound and an organic solvent before or during the polymerization of the olefin monomer. The ratio of the olefin monomer and the nucleator component is adjusted such that the amount of the nucleator component becomes 0.05 to 20 parts by mass with respect to 100 parts by mass of an olefin polymer obtained by the polymerization of the olefin monomer.

As a method of adjusting the amount of the nucleator component with respect to the olefin polymer to be in the above-described range, a method in which the polymerization activity of a case where the polymerization is performed without adding the nucleator component is determined and the polymerization is performed under the same conditions as in the case where the nucleator component is not added, but with an addition of a nucleator dissolved in an organoaluminum compound or in an organoaluminum compound and an organic solvent such that the desired amount of the nucleator component is blended in the resulting polymer, can be employed. Alternatively, an instrument for adjusting the amount of each component to be added may be introduced to a polymerization equipment and the polymerization may be performed while adjusting the blended amount of the nucleator component to be in the above-described range.

In the present invention, an olefin polymer is obtained by homopolymerization of the above-described olefin monomer or by copolymerization including the olefin monomer, and examples of the olefin polymer include polypropylenes, such as propylene homopolymers, copolymers of propylene and an α-olefin(s) other than propylene (e.g., ethylene-propylene copolymers and ethylene-propylene-butene copolymers); polyethylenes such as high-density polyethylenes; and cycloolefins.

The polymerization of the olefin monomer can be performed in the presence of a polymerization catalyst in an inert gas atmosphere such as nitrogen; however, it may also be performed in the above-described organic solvent. Further, an active hydrogen compound, a particulate carrier, an organoaluminum compound, an ion-exchangeable layered compound and/or an inorganic silicate may be added in such an amount that does not inhibit the polymerization.

In the present invention, the above-described polymerization catalyst is not particularly restricted, and any known polymerization catalyst can be used. Examples thereof include compounds of transition metals belonging to any of the groups 3 to 11 of the periodic table (such as titanium, zirconium, hafnium, vanadium, iron, nickel, lead, platinum, yttrium and samarium), and representative examples of polymerization catalyst that can be used include Ziegler catalysts; Ziegler-Natta catalysts composed of a titanium-containing solid transition metal component and an organic metal component; metallocene catalysts composed of a transition metal compound belonging to any one of the groups 4 to 6 of the periodic table, which has at least one cyclopentadienyl skeleton, and a co-catalyst component; and chrome-based catalysts.

In the present invention, the method of polymerizing the olefin monomer is not particularly restricted, and any known method can be employed. Examples thereof include a slurry polymerization method in which polymerization is performed in an inert solvent such as an aliphatic hydrocarbon (e.g., butane, pentane, hexane, heptane or isooctane), an alicyclic hydrocarbon (e.g., cyclopentane, cyclohexane or methylcyclohexane), an aromatic hydrocarbon (e.g. toluene, xylene or ethylbenzene), a gasoline fraction or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; a method of producing an olefin homopolymer by polymerizing the olefin monomer in a single step or multiple steps; and a polymerization method in which a copolymer is produced by copolymerizing propylene with at least one olefin (excluding propylene) unit selected from the group consisting of olefin units having 2 to 12 carbon atoms. Further, these production methods can be used regardless of being a batch type or a continuous type.

As a polymerization vessel to be used in the above-described polymerization method, a continuous reaction vessel provided in an existing polymerization equipment can be used as is, and the present invention is not particularly restricted by the size, shape, material and the like of the conventional polymerization equipment.

In the present invention, at the time of polymerizing the olefin monomer, as required, other additive(s) normally used in an olefin resin can be further added in such a range that does not adversely affect the polymerization. In cases where such other additive(s) is/are added at the time of polymerizing the olefin monomer, the additive(s) may be mixed and stirred with the nucleator and organoaluminum compound. In the reaction by this method, in cases where a compound produced as a by-product does not affect the resulting polymerization product, the additive(s) may be used as is; however, in cases where the by-product compound adversely affects the polymerization product, it is preferred to remove the compound by vacuum distillation or the like before using the additive(s). Alternatively, other additive(s) may be blended after the olefin polymerization.

Further, even if a direct addition of other additive(s) adversely affects the polymerization, as long as the effect on the polymerization can be suppressed by masking with an organoaluminum compound, such additive(s) can be used in the method of producing a nucleator masterbatch according to the present invention.

Examples of the above-described other additives include a phenolic antioxidant, a phosphorus-based antioxidant, a thioether-based antioxidant, an ultraviolet absorber, a hindered amine compound, a heavy metal inactivator, a nucleating agent, a flame retardant, a metallic soap (metal aliphatic carboxylate), a hydrotalcite, a filler, a lubricant, an antistatic agent, a pigment, a dye, and a plasticizer.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl) propionate], 2-methyl-4,6-bis(octylsulfanylmethyl)phenol, 2,2'-isobutylidene-bis(4,6-dimethylphenol), iso-octyl-3-(3, 5-di-tert-butyl-4-hydroxyphenyl)propionate, N,N'-hexane-1, 6-diylbis[3-(3,5-di-tert-butyl-4-hydroxyphenyl)propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-bis(1,1-dimethylethyl)-4-hydroxy-benzenepropanoic acid and a C13-15 alkyl, 2,5-di-tert-amylhydroquinone, hindered phenol polymer (AO.OH998, manufactured by ADEKA Palmarole SAS), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 6-[3-(3-tert-butyl-4-hydroxy-5-methyl)propoxy]-2,4,8,10-tetra-tert-butylbenzo [d,f][1,3,2]-dioxaphosphepin, hexamethylene-bis[3-(3,5-di-tert-butyl-4-hydroxyphenyl)propionate, calcium bis [monoethyl(3,5-di-tert-butyl-4-hydroxybenzyl) phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis (α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl (3,5-di-tert-butyl-4-hydroxyphenyl)propionate, distearyl(3, 5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2, 6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris [(3,5-di-tert-butyl-4-hydroxyphenyl)propionyloxyethyl]

isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane and triethylene glycol-bis[β-(3-tert-butyl-4-hydroxy-5-methylphenyl)propionate], as well as 3-(3,5-dialkyl-4-hydroxyphenyl)propionic acid derivatives such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl)propionic acid amide and lauryl-3-(3,5-di-tert-butyl-4-hydroxyphenyl)propionic acid amide.

Examples of the above-described phosphorus-based antioxidant include triphenyl phosphite, diisooctyl phosphite, heptakis triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol)phosphite, diisodecyl pentaerythritol diphosphite, dioleyl hydrogen phosphite, trilauryl trithiophosphite, bis(tridecyl)phosphite, tris(isodecyl) phosphite, tris(tridecyl)phosphite, diphenyldecyl phosphite, dinonylphenyl-bis(nonylphenyl)phosphite, poly(dipropylene glycol)phenyl phosphite, tetraphenyldipropyl glycol diphosphite, trisnonylphenyl phosphite, tris(2,4-di-tert-butylphenyl)phosphite, tris(2,4-di-tert-butyl-5-methylphenyl) phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis (2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis(2,4-di-tert-butyl-6-methylphenyl)ethyl phosphite, tetra(tridecyl) isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene)-tris(2-1,1-dimethylethyl)-5-methyl-4,1-phenylene) hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl)phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-tert-butylphenyl-2-butyl-2-ethyl-1,3-propanediol phosphite, poly-4,4'-isopropylidene diphenol C12-15 alcohol phosphite, and phosphite of 2-ethyl-2-butylpropylene glycol and 2,4,6-tri-tert-butylphenol.

Examples of the above-described thioether-based antioxidant include tetrakis[methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol) and distearyl disulfide.

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxyl)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl(3,5-di-tert-butyl-4-hydroxy)benzoate; substituted oxanilides such as 2-ethyl-T-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and various metal salts and metal chelates, particularly salts and chelates of nickel and chromium.

Examples of the above-described flame retardant include aromatic phosphates such as triphenyl phosphate, tricresyl phosphate, trixylenyl phosphate, cresyldiphenyl phosphate, cresyl-2,6-xylenyl phosphate and resorcinol-bis(diphenylphosphate); phosphonates such as divinyl phenylphosphonate, diallyl phenylphosphonate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy) phosphazene and dicresylphosphazene; phosphorus-based flame retardants such as melamine phosphate, melamine pyrophosphate, melamine polyphosphate, melam polyphosphate, ammonium polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resin, brominated phenol novolac-type epoxy resin, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene.

Examples of the above-described metal aliphatic carboxylate include compounds represented by the following Formula (15):

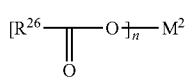

(15)

(wherein, $R^{26}$ represents an aliphatic group having 1 to 30 carbon atoms which is optionally branched and optionally has one or more substituents selected from a hydroxyl group and cycloalkyl groups; $M^2$ represents a metal atom; and n is an integer of 1 to 4, representing the valence of $M^2$).

In the above-described Formula (15), $R^{26}$ is an aliphatic group having 1 to 30 carbon atoms which optionally has a hydroxyl group(s) and/or cycloalkyl group(s) and is also optionally branched. Examples of the aliphatic group include hydrocarbon groups such as alkyl groups, alkenyl groups, and alkyl groups in which two or more unsaturated bonds are introduced. Specific examples of the aliphatic carboxylic acid represented by the above-described Formula (15) include acetic acid, propionic acid, lactic acid, butyric acid, valeric acid, caproic acid, 2-ethyl hexanoic acid, enanthic acid, pelargonic acid, caprylic acid, neodecylic acid, undecylic acid, lauric acid, tridecylic acid, myristic acid, pentadecylic acid, palmitic acid, margaric acid, stearic acid, nonadecylic acid, arachidic acid, behenic acid, lignoceric acid, cerotic acid, montanoic acid, melissic acid, obtusilic acid, linderic acid, tsuzuic acid, palmitoleic acid, myristoyleic acid, petroselinic acid, oleic acid, elaidic acid, vaccenic acid, linoleic acid, linoelaidic acid, γ-linolenic acid, linolenic acid, ricinoleic acid, naphthenic acid, abietic acid, hydroxyacetic acid, β-hydroxypropionic acid, 2-methyl-β-hydroxy propionic acid, α-hydroxybutyric acid, β-hydroxybutyric acid, γ-hydroxybutyric acid, monomethylol propionic acid, dimethylol propionic acid, and 12-hydroxystearic acid. Thereamong, an aliphatic carboxylic acid whose aliphatic group has 12 to 22 carbon atoms is preferred since high effect of improving the physical properties of the resulting olefin-based resin is attained, and myristic acid, stearic acid, 12-hydroxystearic acid and the like are particularly preferred.

Examples of the metal atom represented by $M^2$ in the Formula (15) include alkali metals, magnesium, calcium, strontium, barium, titanium, manganese, iron, zinc, silicon, zirconium, yttrium, barium and hafnium. Thereamong, alkali metals such as sodium, lithium and potassium are preferred, and sodium and lithium are particularly preferred since they allow the resulting olefin polymer to have a favorable crystallization temperature.

The above-described hydrotalcite is a complex salt compound which is known as a natural or synthetic product and composed of magnesium, aluminum, hydroxyl groups, a carbonate group and arbitrary crystal water. Specific examples thereof include hydrotalcites represented by the following Formula (16). Further, an Al—Li hydrotalcite represented by the following Formula (17) can also be used.

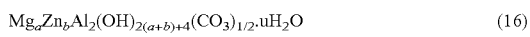

(16)

(wherein, a and b each represent a number that satisfies the conditions represented by the following equations; and u represent 0 or a positive number: $0 \leq b/a < 10$, $2 \leq a+b \leq 20$)

(17)

(wherein, $A^{q-}$ represents an anion having a valence of q; and u represents 0 or a positive number)

In the above-described hydrotalcites, the crystal water may be dehydrated, and the hydrotalcite may be coated by, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The above-described hydrotalcites may be a naturally-occurring or synthetic hydrotalcite. Examples of a method of synthesizing such a compound include known methods that are described in Japanese Patent Publication (Kokoku) No. S46-2280, Japanese Patent Publication (Kokoku) No. S50-30039, Japanese Patent Publication (Kokoku) No. S51-29129, Japanese Patent Publication (Kokoku) No. H3-36839, Japanese Unexamined Patent Application Publication No. S61-174270, Japanese Unexamined Patent Application Publication No. H5-179052 and the like. Further, the above-described hydrotalcites can be used without any restriction on its crystal structure, crystal particle and the like.

In cases where a metal salt of hydrotalcite is used, a lithium salt or a sodium salt is preferably used since a molded article having good transparency can be obtained As the above-described filler, for example, talc, mica, calcium carbonate, calcium oxide, calcium hydroxide, magnesium carbonate, magnesium hydroxide, magnesium oxide, magnesium sulfate, aluminum hydroxide, barium sulfate, glass powders, glass fibers, clays, dolomite, silica, alumina, potassium titanate whiskers, wollastonite and fibrous magnesium oxysulfate are preferred. Among these fillers, ones having an average particle size (in the case of a spherical or plate-form filler) or an average fiber diameter (in the case of a needle-form or fibrous filler) of 5 μm or less are preferred.

The above-described lubricant is added for the purposes of imparting the surface of the resulting molded article with lubricity and improving the damage-preventing effect. Examples of such lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

The above-described antistatic agent is added for the purposes of reducing the electrostatic property of the resulting molded article and preventing adhesion of dusts caused by electrostatic charge. Examples of such antistatic agent include cationic, anionic and non-ionic antistatic agents. Preferred examples thereof include polyoxyethylene alkylamines and polyoxyethylene alkylamides. These antistatic agents may be used individually, or two or more thereof may be used in combination.

The amount of the respective additives to be used in an olefin resin composition obtained by the production method of the present invention is preferably in the range of from an amount at which an effect of adding the additive is exerted to an amount at which an improvement in the effect of the addition is no longer observed. Preferred amounts of the respective additives to be used with respect to 100 parts by mass of the resulting olefin polymer are as follows: 0.1 to 20 parts by mass of plasticizer(s), 1 to 50 parts by mass of filler(s), 0.001 to 1 part by mass of surface treatment agent(s), 0.001 to 10 parts by mass of phenolic antioxidant(s), 0.001 to 10 parts by mass of phosphorus-based antioxidant(s), 0.001 to 10 parts by mass of thioether-based antioxidant(s), 0.001 to 5 parts by mass of ultraviolet absorber(s), 0.01 to 1 part by mass of hindered amine compound(s), 1 to 50 parts by mass of flame retardant(s), 0.001 to 10 parts by mass of metal aliphatic carboxylate, 0.001 to 5 parts by mass of hydrotalcite, 0.03 to 2 parts by mass of lubricant(s), and 0.03 to 2 parts by mass of antistatic agent(s). It is noted here that the above-described amounts of use indicate the amounts of the respective additives used in a molded article obtained using a masterbatch prepared by the production method of the present invention.

In cases where a nucleator masterbatch obtained by the production method of the present invention is applied to an olefin resin, the olefin resin and the masterbatch can be kneaded using a kneader, a roll mill, a uniaxial extruder, a biaxial extruder, a multiaxial extruder or the like. From the standpoint of the operability, a uniaxial extruder or a biaxial extruder is preferred. In cases where a biaxial extruder is used, it can be used regardless of whether the rotation directions of the screws are the same or different. Further, in order to improve the product quality and the working environment, it is preferred to perform replacement with an inert gas and/or degassing via single-stage and multi-stage vents.

Further, the above-described other additives can be blended into an olefin resin together with a masterbatch obtained by the production method of the present invention, and the resultant can be melt-kneaded.

The masterbatch obtained by the production method of the present invention can be mixed with an olefin resin and a molded article can be obtained by molding the resulting mixture by a variety of molding methods. The molding can be carried out by a known molding method such as extrusion molding, injection molding, hollow molding, blow molding or compression molding, and molded articles, for example, food containers; cosmetic and medical containers; bottles such as food bottles, beverage bottles, cooking oil bottles and seasoning bottles; packaging materials such as food packaging materials, wrapping materials and transport packaging materials; sheets and films; fibers; miscellaneous daily goods; toys; automobile materials; and home electric appliance materials, can be thereby easily obtained. Further, glass fibers, carbon fibers or the like can be incorporated to produce a fiber-reinforced plastic.

Mode for Carrying Out the Second Embodiment of the Present Invention

The nucleator component according to the second embodiment of the present invention comprises one or more compounds represented by the above-described Formula (1).

Examples of the nucleating component include the same ones as those exemplified above.

The amount of the above-described nucleator component to be used is in the range of from an amount at which an effect of adding the nucleator component is exerted to an amount at which an improvement in the effect of the addition is no longer observed. The nucleator component is used in the range of preferably 0.001 to 10 parts by mass, more preferably 0.005 to 1 part by mass, particularly preferably 0.01 to 0.5 parts by mass, with respect to 100 parts by mass of a polymer obtained by the production method of the present invention (hereinafter, also referred to as "the polymer").

In the production method of the present invention, the nucleator component dissolved in an organoaluminum compound or in an organoaluminum and an organic solvent is added before or during the polymerization of an olefin monomer. The site of the addition is not particularly restricted and the nucleator component can be added to any of, for example, a polymerization system, a catalyst system and a piping.

In cases where the nucleator component is added before or during the polymerization of an olefin monomer, the nucleator component may be mixed with an organoaluminum compound, or the nucleator component may be dispersed in an organic solvent and an organoaluminum compound is then added thereto to dissolve the nucleator component. It is believed that the nucleator component is thereby masked with the organoaluminum compound.

Examples of the above-described organoaluminum compound include the same ones as those exemplified above.

In the method of producing a polyolefin-based resin composition according to the present invention, such an organoaluminum compound that allows the nucleator component masked with the organoaluminum compound to be regenerated by a treatment with a hydrogen-donating compound such as water, an alcohol or an acid is preferably used.

The mixing ratio of the above-described nucleator component and organoaluminum compound is preferably 1/1,000 to 1/0.3 in terms of the molar ratio between the nucleator component and the aluminum content of the organoaluminum compound. When the ratio of the nucleator component is higher than 1/0.3, there is a problem that the excessive nucleator component adversely affects the olefin polymerization activity, while when the ratio of the nucleator component is less than 1/1,000, the organoaluminum compound may remain in the resulting polymer after the polymerization to cause a reduction in the physical properties of the polymer and adversely affect a catalyst metal component, so that the polymerization may not be performed desirably.

Examples of the above-described organic solvent include the same ones as those exemplified above. These organic solvents may be used individually, or two or more thereof may be used in combination.

Among the above-described organic solvents, n-hexane or n-heptane is preferably used. The concentration of the organoaluminum compound in the organic solvent is in the range of preferably 0.001 to 0.5 mol/L, particularly preferably 0.01 to 0.1 mol/L.

Examples of the olefin monomer used in the present invention include the same ones as those exemplified above.

Examples of the polymer in the present invention include the same ones as those exemplified above.

The polymerization of the olefin monomer is required to be performed in the presence of a polymerization catalyst in an inert gas atmosphere such as nitrogen; however, it may also be performed in the above-described inert solvent. Further, an active hydrogen compound, a particulate carrier, an organoaluminum compound, an ion-exchangeable layered compound and/or an inorganic silicate may be added in such an amount that does not inhibit the polymerization.

In the present invention, the above-described polymerization catalyst is not particularly restricted, and any known polymerization catalyst can be used. Examples thereof include the same ones as those exemplified above.

In the present invention, the method of polymerizing the olefin monomer is not particularly restricted, and any known method can be employed. Examples thereof include a slurry polymerization method in which polymerization is performed in an inert solvent such as an aliphatic hydrocarbon (e.g., butane, pentane, hexane, heptane or isooctane), an alicyclic hydrocarbon (e.g., cyclopentane, cyclohexane or methylcyclohexane), an aromatic hydrocarbon (e.g. toluene, xylene or ethylbenzene), a gasoline fraction or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; single-step or multi-step polymerization methods; and a polymerization method in which a copolymer is produced by copolymerizing propylene with at least one olefin (excluding propylene) unit selected from the group consisting of olefin units having 2 to 12 carbon atoms. Further, these production methods can be used regardless of being a batch type or a continuous type.

As a polymerization vessel to be used in the above-described polymerization method, a continuous reaction vessel provided in an existing polymerization equipment can be used as is, and the present invention is not particularly restricted by the size, shape, material and the like of the conventional polymerization equipment.

The metal aliphatic carboxylate used in the second step of the production method of the present invention is one or more compounds represented by the above-described Formula (15).

The amount of the above-described metal aliphatic carboxylate to be used is in the range of from an amount at which an effect of adding the metal aliphatic carboxylate is exerted to an amount at which an improvement in the effect of the addition is no longer observed. The metal aliphatic carboxylate is used in the range of preferably 0.001 to 10 parts by mass, more preferably 0.005 to 1 part by mass, particularly preferably 0.01 to 0.5 parts by mass, with respect to 100 parts by mass of the polymer.

The above-described alkali metal-containing hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum are substituted with other metal such as an alkali metal or zinc; and hydrotalcites in which the hydroxyl group(s) or carbonate group is/are substituted with other anionic group, more specifically, hydrotalcites represented by the above-described Formula (16) in which a metal is substituted with an alkali metal. In addition, as an Al—Li hydrotalcite, a compound represented by the above-described Formula (17) can be used.

Further, the carbonate anion in the above-described hydrotalcites may be partially substituted with other anion.

In the above-described hydrotalcites, the crystal water may be dehydrated, and the hydrotalcite may be coated by, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The above-described hydrotalcites may be a naturally-occurring or synthetic hydrotalcite. Examples of a method of synthesizing such a compound include known methods that are described in the above-described publications and the like. Further, the above-described hydrotalcites can be used without any restriction on its crystal structure, crystal particle and the like.

As the alkali metal of the alkali metal-containing hydrotalcite, lithium or sodium is preferably used since a molded article having good transparency and crystallization temperature can be obtained.

In the present invention, at the time of polymerizing the olefin monomer, as required, other additive(s) normally used in an olefin resin can be further added in such a range that does not adversely affect the polymerization. In cases where such other additive(s) is/are added at the time of polymerizing the olefin monomer, the additive(s) may be mixed and stirred with the nucleator component and organoaluminum compound. In the reaction by this method, in cases where a compound produced as a by-product does not affect the resulting polymerization product, the additive(s) may be used as is; however, in cases where the by-product compound adversely affects the polymerization product, it is preferred to remove the compound by vacuum distillation or the like before using the additive(s).

Further, even if a direct addition of other additive(s) adversely affects the polymerization, as long as the effect on the polymerization can be suppressed by masking with an organoaluminum compound, such additive(s) can be used in the method of producing a polyolefin-based resin composition according to the present invention.

Moreover, in addition to the metal aliphatic carboxylate represented by the Formula (15) or the alkali metal-containing hydrotalcite, other additive(s) may be blended into the polymer obtained by the first step, and the resultant can be melt-kneaded, granulated and molded using a molding machine such as an extruder.

Examples of the above-described other additives include a phenolic antioxidant, a phosphorus-based antioxidant, a thioether-based antioxidant, an ultraviolet absorber, a heavy metal inactivator, a flame retardant, a metallic soap, a hydrotalcite, a filler, a lubricant, an antistatic agent, a pigment, a dye, and a plasticizer.

Examples of the phenolic antioxidant include the same ones as those exemplified above.

Examples of the phosphorus-based antioxidant include the same ones as those exemplified above.

Examples of the thioether-based antioxidant include the same ones as those exemplified above.

Examples of the ultraviolet absorber include the same ones as those exemplified above.

Examples of the flame retardant include the same ones as those exemplified above.

Examples of the filler include the same ones as those exemplified above. Among these fillers, ones having an average particle size (in the case of a spherical or plate-form filler) or an average fiber diameter (in the case of a needle-form or fibrous filler) of 5 μm or less are preferred.

The above-described lubricant is added for the purposes of imparting the surface of the resulting molded article with lubricity and improving the damage-preventing effect. Examples of such lubricant include the same ones as those exemplified above. These lubricants may be used individually, or two or more thereof may be used in combination.

The above-described antistatic agent is added for the purposes of reducing the electrostatic property of the resulting molded article and preventing adhesion of dusts caused by electrostatic charge. Examples of such antistatic agent include the same ones as those exemplified above. These antistatic agents may be used individually, or two or more thereof may be used in combination.

The amount of the respective additives to be used in the resulting resin is preferably in the range of from an amount at which an effect of adding the additive is exerted to an amount at which an improvement in the effect of the addition is no longer observed. Preferred amounts of the respective additives to be used with respect to 100 parts by mass of the polymer are as follows: 0.1 to 20 parts by mass of plasticizer(s), 1 to 50 parts by mass of filler(s), 0.001 to 1 part by mass of surface treatment agent(s), 0.001 to 10 parts by mass of phenolic antioxidant(s), 0.001 to 10 parts by mass of phosphorus-based antioxidant(s), 0.001 to 10 parts by mass of thioether-based antioxidant(s), 0.001 to 5 parts by mass of ultraviolet absorber(s), 0.01 to 1 part by mass of hindered amine compound(s), 1 to 50 parts by mass of flame retardant(s), 0.03 to 2 parts by mass of lubricant(s), and 0.03 to 2 parts by mass of antistatic agent(s). It is noted here that the above-described amounts of use indicate the final amounts of the respective additives used in a molded article obtained using the polymer produced by the production method of the present invention.

The polymer obtained by the production method of the present invention can be molded by a known molding method such as extrusion molding, injection molding, hollow molding, blow molding or compression molding, and molded articles, for example, food containers; cosmetic and clothing containers; bottles such as food bottles, beverage bottles, cooking oil bottles and seasoning bottles; packaging materials such as food packaging materials, wrapping materials and transport packaging materials; sheets and films; fibers; miscellaneous daily goods; and toys, can be thereby easily obtained. Further, glass fibers, carbon fibers or the like can be incorporated to produce a fiber-reinforced plastic.

Mode for Carrying Out the Third Embodiment of the Present Invention

The method of producing an olefin resin composition according to the third embodiment of the present invention will now be described in detail.

In the method of producing an olefin resin composition according to the present invention, an olefin polymer obtained by polymerizing an olefin monomer with incorporation of a nucleator dissolved in an organoaluminum compound or in an organoaluminum compound and an organic solvent before or during the polymerization is used.

Examples of the nucleator component used in the present invention include nucleators that dissolve in an organoaluminum compound or in an organoaluminum compound and an organic solvent. Those non-dissolving nucleators show poor dispersion in a resin, so that the effects of the present invention may not be attained. It is thus necessary to check the solubility of the nucleator component before carrying out the production method of the present invention. Whether a nucleator dissolves or not can be judged by dissolving the nucleator in the organoaluminum compound or in the organoaluminum compound and the organic solvent and visually examining if a residual material is generated.

Specific examples of such a compound include compounds represented by the described Formula (1), metal phosphates such as lithium-2,2'-methylene-bis(4,6-di-tert-butylphenyl) phosphate, and amide compounds; however, since a nucleator decomposed by an organoaluminum compound may color the resulting polymer or inhibit the polymerization activity, such a nucleator cannot be used in the production method of the present invention.

In the present invention, as the above-described nucleator, a compound represented by the above-described Formula (1) is preferably used.

Examples of the nucleator component used in the present invention include the same ones as those exemplified above.

Examples of the above-described amide compounds in the present invention include the same ones as those exemplified above.

Further, examples of amide compounds other than the above-described ones include the same ones as those exemplified above.

The amount of the above-described nucleator component to be used is in the range of preferably 0.001 to 0.5 parts by mass, more preferably 0.005 to 0.3 parts by mass, with respect to 100 parts by mass of an olefin polymer obtained by the polymerization. When the amount of the nucleator component is less than 0.001 parts by mass, the actions and effects of the nucleator may not be attained, while when the amount is 0.5 parts by mass or greater, the effects of adding the nucleator may not be attained in a case where the olefin resin composition obtained by the production method of the present invention is solely molded, which is uneconomical.

Upon polymerizing the olefin polymer used in the production method of the present invention, the above-described nucleator component dissolved in an organoaluminum compound or in an organoaluminum and an organic solvent is added before or during the polymerization of an olefin monomer. The site of the addition is not particularly restricted and the nucleator component can be added to any of, for example, a polymerization system, a catalyst system and a piping.

In cases where the nucleator component is added before or during the polymerization of an olefin monomer, the nucleator component may be mixed with an organoaluminum compound, or the nucleator component may be dispersed in an organic solvent and an organoaluminum compound is then added thereto to dissolve the nucleator component. It is believed that the nucleator component is thereby masked with the organoaluminum compound.

As the organoaluminum compound, the same ones as those exemplified above can be used in the same manner.

When obtaining the above-described olefin polymer, it is preferred to use such an organoaluminum compound that allows the nucleator component masked with the organoaluminum compound to be regenerated by a treatment with a hydrogen-donating compound such as water, an alcohol or an acid.

The mixing ratio of the above-described nucleator component and organoaluminum compound is preferably 1/1,000 to 1/0.3 in terms of the molar ratio between the nucleator component and the aluminum content of the organoaluminum compound. When the ratio of the nucleator component is higher than 1/0.3, there is a problem that the excessive nucleator component adversely affects the polymerization activity of the olefin monomer, while when the ratio of the nucleator component is less than 1/1,000, the organoaluminum compound may remain in the resulting olefin polymer after the polymerization to cause a reduction in the physical properties of the olefin polymer and adversely affect a catalyst metal component, so that the polymerization may not be performed desirably.

Examples of the above-described organic solvent include the same ones as those exemplified above. These organic solvents may be used individually, or two or more thereof may be used in combination.

Among the above-described organic solvents, n-hexane or n-heptane is preferably used. The concentration of the organoaluminum compound in the organic solvent is in the range of preferably 0.001 to 0.5 mol/l, particularly preferably 0.01 to 0.1 mol/l.

Examples of the olefin monomer used for obtaining an olefin polymer include the same ones as those exemplified above.

In the present invention, an olefin polymer is obtained by homopolymerization of the above-described olefin monomer or by copolymerization including the olefin monomer, and examples thereof include the same ones as those exemplified above.

In the production method of the present invention, an olefin polymer obtained by polymerizing an olefin monomer with incorporation of a nucleator dissolved in an organoaluminum compound or in an organoaluminum compound and an organic solvent before or during the polymerization is used. The ratio of the olefin monomer and the nucleator component is adjusted such that the amount of the nucleator component becomes 0.001 to 0.5 parts by mass with respect to 100 parts by mass of an olefin polymer obtained by the polymerization of the olefin monomer.

As a method of adjusting the amount of the nucleator component with respect to the olefin polymer to be in the above-described range, a method in which the polymerization activity of a case where the polymerization is performed without adding the nucleator component is determined and the polymerization is performed under the same conditions as in the case where the nucleator component is not added, but with an addition of a nucleator dissolved in an organoaluminum compound or in an organoaluminum compound and an organic solvent such that the desired amount of the nucleator component is blended in the resulting polymer, can be employed. Alternatively, an instrument for adjusting the amount of each component to be added may be introduced to a polymerization equipment and the polymerization may be performed while adjusting the blended amount of the nucleator component to be in the above-described range.

The polymerization of the olefin monomer can be performed in the presence of a polymerization catalyst in an inert gas atmosphere such as nitrogen; however, it may also be performed in the above-described organic solvent. Further, an active hydrogen compound, a particulate carrier, an organoaluminum compound, an ion-exchangeable layered compound and/or an inorganic silicate may be added in such an amount that does not inhibit the polymerization.

The above-described polymerization catalyst is not particularly restricted, and any known polymerization catalyst can be used. Examples thereof include the same ones as those exemplified above.

Examples of a method of polymerizing the olefin monomer include a slurry polymerization method in which polymerization is performed in an inert solvent such as an aliphatic hydrocarbon (e.g., butane, pentane, hexane, heptane or isooctane), an alicyclic hydrocarbon (e.g., cyclopentane, cyclohexane or methylcyclohexane), an aromatic hydrocarbon (e.g. toluene, xylene or ethylbenzene), a gasoline fraction or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; a method of producing an olefin homopolymer by polymerizing the olefin monomer in a single step or multiple steps; and a polymerization method in which a copolymer is produced by copolymerizing propylene with at least one olefin (excluding propylene) unit selected from the group consisting of olefin units having 2 to 12 carbon atoms. Further, there are batch-type and continuous-type production methods.

In the present invention, since a conventional polymerization equipment for a bulk polymerization method, a gas-phase polymerization method or a combination of these methods can be applied as is, such a polymerization equipment is preferably used, and a continuous-type polymerization equipment is industrially advantageous and thus preferred. The present invention can also be applied to a slurry polymerization method, a solution polymerization method and the like; however, since these polymerization methods require a step of drying the resulting olefin polymer, they are not preferred from the standpoint of labor saving.

The production method of the present invention comprises the step of bringing a nitrogen gas containing water or a proton-donating substance, or steam into contact with an olefin polymer obtained in the above-described manner.

Further, other production method of the present invention comprises the step of melt-kneading an olefin polymer obtained in the above-described manner, with injection of a nitrogen gas containing water or a proton-donating substance, or steam into an extruder.

It is believed that the nucleator dissolved in an organoaluminum compound or in an organoaluminum compound and an organic solvent can be thereby regenerated.

In the production method of the present invention, in cases where a nitrogen gas containing water or a proton-donating substance is used, a nitrogen gas containing water at a volume ratio of preferably $1.0 \times 10^{-6}$ to $2.5 \times 10^{-2}$, more preferably $1.0 \times 10^{-3}$ to $1.5 \times 10^{-2}$, with respect to 1 volume of nitrogen, is preferably used. When the volume ratio is less than $1.0 \times 10^{-6}$ with respect to 1 volume of nitrogen, regeneration of the nucleator takes a long time, while when the ratio is higher than $2.5 \times 10^{-2}$, the water content of the resulting olefin polymer is high and bubbles may thus be formed during molding.

In cases where the step of bringing a nitrogen gas containing water or a proton-donating substance, or steam into contact with an olefin polymer obtained in the above-described manner is applied to a continuous-type production method, an equipment in which the nitrogen gas or steam can be brought into contact with the olefin polymer in a vessel where the olefin polymer is intermittently or continuously supplied can be employed. The equipment may be of any type as long as it is capable of discharging an olefin polymer containing regenerated nucleator, for example, a type in which the olefin polymer is supplied intermittently or continuously from an upper part of a cylindrical column and the nitrogen gas or steam is supplied from a lower part of the column, or a type in which the olefin polymer is supplied from an upper part of a vessel and the nitrogen gas is supplied from a lower part of the vessel. Specific examples of the vessel include purge columns and steamers.

Examples of the above-described proton-donating substance include alcohols such as methanol, ethanol, 1-propanol, 2-propanol, n-butanol, isobutanol, sec-butanol, tert-butanol, ethylene glycol and glycerin; phenolic substances; and mineral acids such as hydrochloric acid and sulfuric acid. In the present invention, methanol or ethanol is preferably used.

In the method of producing an olefin resin composition which comprises the step of injecting a nitrogen gas containing water or a proton-donating substance, or steam into an extruder at the time of melt-kneading an olefin polymer obtained in the above-described manner using the extruder, by bringing the nitrogen gas containing water or a proton-donating substance, or steam into contact with the olefin polymer at the time of the melt-kneading thereof, the nucleator component contained in the olefin polymer can be regenerated. It is particularly preferred to install an extruder for mixing the above-described olefin polymer with other additive(s) as required and melt-kneading the resultant and to introduce a nitrogen gas containing water or a proton-donating substance, or steam into the extruder, since this does not require any new investment in the equipment.

The above-described extruder can be used regardless of the extrusion method such as uniaxial, biaxial or multiaxial extrusion, and it may be any extruder as long as it is capable of melting and kneading an olefin polymer and steam can be introduced thereto.

In the method of producing an olefin resin composition according to the present invention, it is preferred that the water content of the resulting olefin resin composition be in the range of 0.1 to 5 parts by mass with respect to 100 parts by mass of the olefin polymer.

When the water content is less than 0.1 parts by mass with respect to 100 parts by mass of the olefin polymer, the nucleator may not be regenerated sufficiently, while when the water content is greater than 5 parts by mass, bubbles may be generated during molding of the olefin resin composition and the outer appearance of the resulting molded article may thus be deteriorated.

In the present invention, at the time of polymerizing the olefin monomer, as required, other additive(s) normally used in an olefin resin can be further added in such a range that does not adversely affect the polymerization. In cases where such other additive(s) is/are added at the time of polymerizing the olefin monomer, the additive(s) may be mixed and stirred with the nucleator and organoaluminum compound. Alternatively, the additive(s) may be mixed with a solvent to be made into a suspended state (slurrying) and then supplied. The solvent is not particularly restricted, and examples thereof include the same ones as those exemplified above. The additive(s) may also be blended after the polymerization.

In the reaction by this method, in cases where a compound produced as a by-product does not affect the resulting polymerization product, the additive(s) may be used as is; however, in cases where the by-product compound adversely affects the polymerization product, it is preferred to remove the compound by vacuum distillation or the like before using the additive(s).

Further, even if a direct addition of other additive(s) adversely affects the polymerization, as long as the effect on the polymerization can be suppressed by masking with an organoaluminum compound, such additive(s) can be used in the method of producing an olefin resin composition according to the present invention.

Examples of the above-described other additives include the same ones as those exemplified for the first embodiment of the present invention.

The preferred amounts of the above-described respective additives to be used can be set in the same ranges as described above. It is noted here that the amounts of use indicate the amounts of the respective additives used in a molded article obtained using an olefin resin composition prepared by the production method of the present invention.

In cases where the above-described other additive(s) is/are blended into an olefin resin composition obtained by the production method of the present invention, for example, a method in which the olefin polymer and the additive(s) are mixed and then melt-kneaded using a processing equipment such as a kneader, a roll mill, a uniaxial extruder, a biaxial extruder or a multiaxial extruder can be employed and, from the standpoint of the operability, a uniaxial extruder or a biaxial extruder is preferably used. In cases where a biaxial extruder is used, it can be used regardless of whether the rotation directions of the screws are the same or different. Further, in order to improve the product quality and the working environment, it is preferred to perform replacement with an inert gas and/or degassing via single-stage and multi-stage vents.

The olefin resin composition obtained by the production method of the present invention can be molded by a known molding method such as extrusion molding, injection molding, hollow molding, blow molding or compression molding, and molded articles, for example, food containers; cosmetic and clothing containers; bottles such as food bottles, beverage bottles, cooking oil bottles and seasoning bottles; packaging materials such as food packaging materials, wrapping materials and transport packaging materials; sheets and films; fibers; miscellaneous daily goods; and toys, can be thereby easily obtained. Further, glass fibers, carbon fibers or the like can be incorporated to produce a fiber-reinforced plastic.

First Mode for Carrying Out the Fourth Embodiment of the Present Invention

According to the first mode for carrying out the fourth embodiment of the present invention, a method of producing an olefin resin composition for a film material and a method of producing an olefin resin composition for a fiber material (which may be hereinafter collectively referred to as "the production method of the present invention) will now be described in detail.

Examples of the nucleator component used in the present invention include nucleators that dissolve in an organoaluminum compound or in an organoaluminum compound and an organic solvent. Those non-dissolving nucleators show poor dispersion in a resin, so that the effects of the present invention may not be attained. It is thus necessary to check the solubility of the nucleator component before carrying out the production method of the present invention. Whether a nucleator dissolves or not can be judged by dissolving the nucleator in the organoaluminum compound or in the organoaluminum compound and the organic solvent and visually examining if a residual material is generated.

Specific examples of such a compound include compounds represented by the described Formula (1), metal phosphates such as lithium-2,2'-methylene-bis(4,6-di-tert-butylphenyl) phosphate, and amide compounds; however, since a nucleator decomposed by an organoaluminum compound may color the resulting polymer or inhibit the polymerization activity, such a nucleator cannot be used in the production method of the present invention.

In the present invention, as the above-described nucleator, a compound represented by the above-described Formula (1) is preferably used.

Examples of the nucleator component used in the present invention include the same ones as those exemplified above.

Examples of the above-described amide compounds in the present invention include the same ones as those exemplified above.

Further, examples of amide compounds other than the above-described ones include the same ones as those exemplified above.

The amount of the above-described nucleator component to be used is in the range of preferably 0.001 to 0.5 parts by mass, more preferably 0.005 to 0.3 parts by mass, with respect to 100 parts by mass of an olefin polymer obtained by the polymerization. When the amount of the nucleator component is less than 0.001 parts by mass, the actions and effects of the nucleator may not be attained, while when the amount is 0.5 parts by mass or greater, the effects of adding the nucleator may not be attained in a case where the olefin polymer obtained by the production method of the present invention is solely molded, which is uneconomical.

In the production method of the present invention, the nucleator component dissolved in an organoaluminum compound or in an organoaluminum and an organic solvent is added before or during the polymerization of an olefin monomer. The site of the addition is not particularly restricted and the nucleator component can be added to any of, for example, a polymerization system, a catalyst system and a piping.

In cases where the nucleator component is added before or during the polymerization of an olefin monomer, the nucleator component may be mixed with an organoaluminum compound, or the nucleator component may be dispersed in an organic solvent and an organoaluminum compound is then added thereto to dissolve the nucleator component. It is believed that the nucleator component is thereby masked with the organoaluminum compound.

As the organoaluminum compound, the same ones as those exemplified above can be used in the same manner.

In the production method of the present invention, such an organoaluminum compound that allows the nucleator component masked with the organoaluminum compound to be regenerated by a treatment with a hydrogen-donating compound such as water, an alcohol or an acid is preferably used.

The mixing ratio of the above-described nucleator component and organoaluminum compound is preferably 1/1,000 to 1/0.3 in terms of the molar ratio between the nucleator component and the aluminum content of the organoaluminum compound. When the ratio of the nucleator component is higher than 1/0.3, excessive nucleator component may adversely affect the olefin polymerization activity, while when the ratio of the nucleator component is less than 1/1, 000, the organoaluminum compound may remain in the resulting polymer after the polymerization to cause a reduction in the physical properties of the polymer and adversely affect a catalyst metal component, so that the polymerization may not be performed desirably.

Examples of the above-described organic solvent include the same ones as those exemplified above. These organic solvents may be used individually, or two or more thereof may be used in combination.

Among the above-described organic solvents, n-hexane or n-heptane is preferably used. The concentration of the organoaluminum compound in the organic solvent is in the range of preferably 0.001 to 0.5 mol/l, particularly preferably 0.01 to 0.1 mol/l.

Examples of the olefin monomer used in the present invention include the same ones as those exemplified above.

The production method of the present invention comprises the step of polymerizing the above-described olefin monomer with a supply of a nucleator dissolved in an organoaluminum compound or in an organoaluminum compound and an organic solvent before or during the polymerization of the olefin monomer. The ratio of the olefin monomer and the nucleator component is adjusted such that the amount of the nucleator component becomes 0.001 to 0.5 parts by mass with respect to 100 parts by mass of an olefin polymer obtained by the polymerization of the olefin monomer.

As a method of adjusting the amount of the nucleator component with respect to the olefin polymer to be in the above-described range, a method in which, in the present invention, the polymerization activity of a case where the polymerization is performed without adding the nucleator component is determined and the polymerization is performed under the same conditions as in the case where the nucleator component is not added, but with an addition of a solution in which the amount of the nucleator component is adjusted to be a desired amount with respect to the resulting polymer, can be employed. Alternatively, an instrument for adjusting the amount of each component to be added may be introduced to a polymerization equipment and the polymerization may be performed while adjusting the blended amount of the nucleator component to be in the above-described range.

In the present invention, a polymer is obtained by homopolymerization of the above-described olefin monomer or by copolymerization including the olefin monomer, and examples of the polymer include the same ones as those exemplified above.

The polymerization of the olefin monomer can be performed in the presence of a polymerization catalyst in an inert gas atmosphere such as nitrogen; however, it may also be performed in the above-described organic solvent. Further, an active hydrogen compound, a particulate carrier, an organoaluminum compound, an ion-exchangeable layered compound and/or an inorganic silicate may be added in such an amount that does not inhibit the polymerization.

In the present invention, the above-described polymerization catalyst is not particularly restricted, and any known polymerization catalyst can be used. Examples thereof include the same ones as those exemplified above.

In the present invention, the method of polymerizing the olefin monomer is not particularly restricted, and any known method can be employed. Examples thereof include a slurry polymerization method in which polymerization is performed in an inert solvent such as an aliphatic hydrocarbon (e.g., butane, pentane, hexane, heptane or isooctane), an alicyclic hydrocarbon (e.g., cyclopentane, cyclohexane or methylcyclohexane), an aromatic hydrocarbon (e.g. toluene, xylene or ethylbenzene), a gasoline fraction or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; a method of producing an olefin homopolymer by polymerizing the olefin monomer in a single step or multiple steps; and a polymerization method in which a copolymer is produced by copolymerizing propylene with at least one olefin (excluding propylene) unit selected from the group consisting of olefin units having 2 to 12 carbon atoms. Further, these production methods can be used regardless of being a batch type or a continuous type.

As a polymerization vessel to be used in the above-described polymerization method, a continuous reaction vessel provided in an existing polymerization equipment can be used as is, and the present invention is not particularly restricted by the size, shape, material and the like of the conventional polymerization equipment.

In the present invention, at the time of polymerizing the olefin monomer, as required, other additive(s) normally used in an olefin resin can be further added in such a range that does not adversely affect the polymerization. In cases where such other additive(s) is/are added at the time of polymerizing the olefin monomer, the additive(s) may be mixed and stirred with the nucleator and organoaluminum compound. In the reaction by this method, in cases where a compound produced as a by-product does not affect the resulting polymerization product, the additive(s) may be used as is; however, in cases where the by-product compound adversely affects the polymerization product, it is preferred to remove the compound by vacuum distillation or the like before using the additive(s). Alternatively, other additive(s) may be blended after the olefin polymerization.

Further, even if a direct addition of other additive(s) adversely affects the polymerization, as long as the effect on the polymerization can be suppressed by masking with an organoaluminum compound, such additive(s) can be used in the production method of the present invention.

Examples of the above-described other additives include the same ones as those exemplified for the first embodiment of the present invention.

The preferred amounts of the above-described respective additives to be used in an olefin resin composition obtained by the production method of the present invention can be set in the same ranges as described above. It is noted here that the amounts of use indicate the amounts of the respective additives used in a molded article obtained using an olefin resin composition prepared by the production method of the present invention.

In cases where the above-described other additive(s) is/are blended into an olefin resin composition obtained by the production method of the present invention, for example, a method in which the olefin polymer and the additive(s) are mixed and then melt-kneaded using a processing equipment such as a kneader, a roll mill, a uniaxial extruder, a biaxial extruder or a multiaxial extruder can be employed and, from the standpoint of the operability, a uniaxial extruder or a biaxial extruder is preferably used. In cases where a biaxial extruder is used, it can be used regardless of whether the rotation directions of the screws are the same or different. Further, in order to improve the product quality and the working environment, it is preferred to perform replacement with an inert gas and/or degassing via single-stage and multi-stage vents.

The olefin resin composition obtained by the production method of the present invention can be molded by a known molding method such as extrusion molding, injection molding, hollow molding, blow molding, compression molding or melt-blow molding. Its film application is not particularly restricted, and the production method of the present invention can be generally utilized in conventional olefin film applications. Examples thereof include food packaging materials such as wraps, laminate films comprising an olefin film as an outer layer, and laminates of a low-density polyethylene, medium-density polyethylene, ethylene-vinyl acetate copolymer or the like, and examples of cases where the olefin resin composition is utilized as a bag-form packaging material for boiling or retorting include those in which an oxygen-impermeable film such as an aluminum foil is laminated as an inner layer. Examples of fiber material applications include molded articles including seat covers of automobiles, trains, airplanes, theaters and the like; cushion materials such as tires; medical nonwoven fabrics for infection prevention; disinfectant wipes; sanitary products; diapers; top sheets of hygienic articles such as diaper covers; socks; underwears; white coats; covers; sheets; curtains; table cloths; mats; pillow cases; toiletry products; wall-covering materials such as wall papers; wiping clothes such as wipers, dish towels and wet tissues; tea bag-type food packaging materials for coffee, tea and the like; and filtration filters. Further, glass fibers, carbon fibers or the like can be incorporated to produce a fiber-reinforced plastic.

Second Mode for Carrying Out the Fourth Embodiment of the Present Invention

The method of producing an olefin resin composition for a sanitary material according to the second mode for carrying out the fourth embodiment of the present invention (hereinafter, also referred to as "the production method of the present invention") will now be described in detail.

Examples of the nucleator component used in the present invention include nucleators that dissolve in an organoaluminum compound or in an organoaluminum compound and an organic solvent. Those non-dissolving nucleators show poor dispersion in a resin, so that the effects of the present invention may not be attained. It is thus necessary to check the solubility of the nucleator component before carrying out the production method of the present invention. Whether a nucleator dissolves or not can be judged by dissolving the nucleator in the organoaluminum compound or in the organoaluminum compound and the organic solvent and visually examining if a residual material is generated.

Specific examples of such a compound include compounds represented by the described Formula (1), metal phosphates such as lithium-2,2'-methylene-bis(4,6-di-tert-butylphenyl) phosphate, and amide compounds; however, since a nucleator decomposed by an organoaluminum compound may color the resulting polymer or inhibit the polymerization activity, such a nucleator cannot be used in the production method of the present invention.

In the present invention, as the above-described nucleator, a compound represented by the above-described Formula (1) is preferably used.

Examples of the nucleator component used in the present invention include the same ones as those exemplified above.

Examples of the above-described amide compounds in the present invention include the same ones as those exemplified above.

Further, examples of amide compounds other than the above-described ones include the same ones as those exemplified above.

The amount of the above-described nucleator component to be used is in the range of preferably 0.001 to 0.5 parts by mass, more preferably 0.005 to 0.3 parts by mass, with respect to 100 parts by mass of an olefin polymer obtained by the polymerization. When the amount of the nucleator component is less than 0.001 parts by mass, the actions and effects of the nucleator may not be attained, while when the amount is 0.5 parts by mass or greater, the effects of adding the nucleator may not be attained in a case where the olefin polymer obtained by the production method of the present invention is solely molded, which is uneconomical.

In the production method of the present invention, the nucleator component dissolved in an organoaluminum compound or in an organoaluminum and an organic solvent is added before or during the polymerization of an olefin monomer. The site of the addition is not particularly restricted and the nucleator component can be added to any of, for example, a polymerization system, a catalyst system and a piping.

In cases where the nucleator component is added before or during the polymerization of an olefin monomer, the nucleator component may be mixed with an organoaluminum compound, or the nucleator component may be dispersed in an organic solvent and an organoaluminum compound is then added thereto to dissolve the nucleator component. It is believed that the nucleator component is thereby masked with the organoaluminum compound.

As the organoaluminum compound, the same ones as those exemplified above can be used in the same manner.

In the production method of the present invention, such an organoaluminum compound that allows the nucleator component masked with the organoaluminum compound to be regenerated by a treatment with a hydrogen-donating compound such as water, an alcohol or an acid is preferably used.

The mixing ratio of the above-described nucleator component and organoaluminum compound is preferably 1/1,000 to 1/0.3 in terms of the molar ratio between the nucleator component and the aluminum content of the organoaluminum compound. When the ratio of the nucleator component is higher than 1/0.3, excessive nucleator component may adversely affect the polymerization activity of the olefin monomer, while when the ratio of the nucleator component is less than 1/1,000, the organoaluminum compound may remain in the resulting olefin polymer after the polymerization to cause a reduction in the physical properties of the olefin polymer and adversely affect a catalyst metal component, so that the polymerization may not be performed desirably.

Examples of the above-described organic solvent include the same ones as those exemplified above. These organic solvents may be used individually, or two or more thereof may be used in combination.

Among the above-described organic solvents, n-hexane or n-heptane is preferably used. The concentration of the organoaluminum compound in the organic solvent is in the range of preferably 0.001 to 0.5 mol/l, particularly preferably 0.01 to 0.1 mol/l.

Examples of the olefin monomer used in the present invention include the same ones as those exemplified above.

The method of producing an olefin resin composition for a sanitary material according to the present invention comprises the step of polymerizing the above-described olefin monomer with a supply of a nucleator dissolved in an organoaluminum compound or in an organoaluminum compound and an organic solvent before or during the polymerization of the olefin monomer. The ratio of the olefin monomer and the nucleator component is adjusted such that the amount of the nucleator component becomes 0.001 to 0.5 parts by mass with respect to 100 parts by mass of an olefin polymer obtained by the polymerization of the olefin monomer.

As a method of adjusting the amount of the nucleator component with respect to the olefin polymer to be in the above-described range, a method in which the polymerization activity of a case where the polymerization is performed without adding the nucleator component is determined and the polymerization is performed under the same conditions as in the case where the nucleator component is not added, but with an addition of a nucleator dissolved in an organoaluminum compound or in an organoaluminum compound and an organic solvent such that the desired amount of the nucleator component is blended in the resulting polymer, can be employed. Alternatively, an instrument for adjusting the amount of each component to be added may be introduced to a polymerization equipment and the polymerization may be performed while adjusting the blended amount of the nucleator component to be in the above-described range.

In the present invention, a polymer is obtained by homopolymerization of the above-described olefin monomer or by copolymerization including the olefin monomer, and examples of the polymer include the same ones as those exemplified above.

The polymerization of the olefin monomer can be performed in the presence of a polymerization catalyst in an inert gas atmosphere such as nitrogen; however, it may also be performed in the above-described organic solvent. Further, an active hydrogen compound, a particulate carrier, an organoaluminum compound, an ion-exchangeable layered compound and/or an inorganic silicate may be added in such an amount that does not inhibit the polymerization.

In the present invention, the above-described polymerization catalyst is not particularly restricted, and any known polymerization catalyst can be used. Examples thereof include the same ones as those exemplified above.

In the present invention, the method of polymerizing the olefin monomer is not particularly restricted, and any known method can be employed. Examples thereof include a slurry polymerization method in which polymerization is performed in an inert solvent such as an aliphatic hydrocarbon (e.g., butane, pentane, hexane, heptane or isooctane), an alicyclic hydrocarbon (e.g., cyclopentane, cyclohexane or methylcyclohexane), an aromatic hydrocarbon (e.g. toluene, xylene or ethylbenzene), a gasoline fraction or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; a method of producing an olefin homopolymer by polymerizing the olefin monomer in a single step or multiple steps; and a polymerization method in which a copolymer is produced by copolymerizing propylene with at least one olefin (excluding propylene) unit selected from the group consisting of olefin units having 2 to 12 carbon atoms. Further, these production methods can be used regardless of being a batch type or a continuous type.

As a polymerization vessel to be used in the above-described polymerization method, a continuous reaction vessel provided in an existing polymerization equipment can be used as is, and the present invention is not particularly restricted by the size, shape, material and the like of the conventional polymerization equipment.

In the present invention, at the time of polymerizing the olefin monomer, as required, other additive(s) normally used in an olefin resin can be further added in such a range that does not adversely affect the polymerization. In cases where such other additive(s) is/are added at the time of polymerizing the olefin monomer, the additive(s) may be mixed and stirred with the nucleator and organoaluminum compound. In the reaction by this method, in cases where a compound produced as a by-product does not affect the resulting polymerization product, the additive(s) may be used as is; however, in cases where the by-product compound adversely affects the polymerization product, it is preferred to remove the compound by vacuum distillation or the like before using the additive(s). Alternatively, other additive(s) may be blended after the olefin polymerization.

Further, even if a direct addition of other additive(s) adversely affects the polymerization, as long as the effect on the polymerization can be suppressed by masking with an organoaluminum compound, such additive(s) can be used in the method of producing an olefin resin composition for a sanitary material according to the present invention.

Examples of the above-described other additives include the same ones as those exemplified for the first embodiment of the present invention.

The preferred amounts of the respective additives to be used in an olefin polymer obtained by the production method of the present invention can be set in the same ranges as described above. It is noted here that the amounts of use indicate the final amounts of the respective additives used in a molded article obtained using an olefin resin composition produced by the production method of the present invention.

The olefin resin composition for a sanitary material according to the present invention can be molded in the same manner as ordinary plastics by extrusion molding, injection molding, hollow molding, blow molding, vacuum molding, compression molding or the like, and a variety of molded articles such as films, sheets, rods, bottles, containers, fibers and hollow-molded articles can be thereby easily obtained. The olefin resin composition can be used in food containers, food packages, medical equipments such as syringe barrels, hygienic products such as disposable diaper, sanitary napkins, water pipes and the like.

The olefin resin composition obtained by the production method of the present invention has improved physical properties because of the nucleator blended therein and the migration of the blended nucleator to the surface or outside is inhibited; therefore, the olefin resin composition is suitable for sanitary materials that are expected to come into contact with a variety of things. Particularly the production method of the present invention can yield an olefin resin composition which shows no fogging, preferably in a fogging test prescribed in ISO-6452 (international standard established by the International Organization for Standard) under conditions where the heating temperature is 100° C., the heating time is 5 hours and the cooling temperature is 50° C.

Third Mode for Carrying Out the Fourth Embodiment of the Present Invention

The method of producing an olefin resin composition according to the third mode for carrying out the fourth embodiment of the present invention (hereinafter, also referred to as "the production method of the present invention") will now be described in detail.

The production method of the present invention is a method of producing an olefin resin composition capable of yielding a molded article having a flexural modulus, which is measured in accordance with ISO178 (international standard established by the International Organization for Standard), of not less than 1,600 MPa. The ISO178 prescribes a measurement method in which, using a test piece, after measuring the stress associated with displacement of an indenter placed in the center of a test piece of 4 mm in thickness, 10 mm in width and 80 mm in length, the elastic modulus thereof is determined in a region where a linear relationship is established between the displacement and the stress, and the flexural strength is determined based on the stress at the yield point. Preferably, an olefin resin composition capable of yielding a molded article having a flexural modulus, which is measured in accordance with ISO178, of not less than 2,000 MPa can be produced.

While an olefin resin composition obtained by the method of producing an olefin resin composition according to the present invention is capable of yielding a molded article having excellent rigidity as described above, the method can also produce an olefin resin composition that yields a molded article in which occurrence of a defect in the outer appearance is inhibited.

Examples of the nucleator component used in the present invention include nucleators that dissolve in an organoaluminum compound or in an organoaluminum compound and an organic solvent. Those non-dissolving nucleators show poor dispersion in a resin, so that the effects of the present invention may not be attained. It is thus necessary to check the solubility of the nucleator component before carrying out the production method of the present invention. Whether a nucleator dissolves or not can be judged by dissolving the nucleator in the organoaluminum compound or in the organoaluminum compound and the organic solvent and visually examining if a residual material is generated.

Specific examples of such a compound include compounds represented by the described Formula (1), metal phosphates such as lithium-2,2'-methylene-bis(4,6-di-tert-butylphenyl) phosphate, and amide compounds; however, since a nucleator decomposed by an organoaluminum compound may color the resulting polymer or inhibit the polymerization activity, such a nucleator cannot be used in the production method of the present invention.

In the present invention, as the above-described nucleator, a compound represented by the above-described Formula (1) is preferably used.

Examples of the nucleator component used in the present invention include the same ones as those exemplified above.

Examples of the above-described amide compounds in the present invention include the same ones as those exemplified above.

Further, examples of amide compounds other than the above-described ones include the same ones as those exemplified above.

The amount of the above-described nucleator component to be used is in the range of preferably 0.001 to 0.5 parts by mass, more preferably 0.005 to 0.3 parts by mass, with respect to 100 parts by mass of an olefin polymer obtained by the polymerization. When the amount of the nucleator component is less than 0.001 parts by mass, the actions and effects of the nucleator may not be attained, while when the amount is 0.5 parts by mass or greater, the effects of adding the nucleator may not be attained in a case where the olefin polymer obtained by the production method of the present invention is solely molded, which is uneconomical.

In the production method of the present invention, the nucleator component dissolved in an organoaluminum compound or in an organoaluminum and an organic solvent is added before or during the polymerization of an olefin monomer. The site of the addition is not particularly restricted and the nucleator component can be added to any of, for example, a polymerization system, a catalyst system and a piping.

In cases where the nucleator component is added before or during the polymerization of an olefin monomer, the nucleator component may be mixed with an organoaluminum compound, or the nucleator component may be dispersed in an organic solvent and an organoaluminum compound is then added thereto to dissolve the nucleator component. It is believed that the nucleator component is thereby masked with the organoaluminum compound.

As the organoaluminum compound, the same ones as those exemplified above can be used in the same manner.

In the production method of the present invention, such an organoaluminum compound that allows the nucleator component masked with the organoaluminum compound to be regenerated by a treatment with a hydrogen-donating compound such as water, an alcohol or an acid is preferably used.

The mixing ratio of the above-described nucleator component and organoaluminum compound is preferably 1/1,000 to 1/0.3 in terms of the molar ratio between the nucleator component and the aluminum content of the organoaluminum compound. When the ratio of the nucleator component is higher than 1/0.3, there is a problem that the excessive nucleator component adversely affects the polymerization activity of the olefin monomer, while when the ratio of the nucleator component is less than 1/1,000, the organoaluminum compound may remain in the resulting olefin polymer after the polymerization to cause a reduction in the physical properties of the olefin polymer and adversely affect a catalyst metal component, so that the polymerization may not be performed desirably.

Examples of the above-described organic solvent include the same ones as those exemplified above. These organic solvents may be used individually, or two or more thereof may be used in combination.

Among the above-described organic solvents, n-hexane or n-heptane is preferably used. The concentration of the organoaluminum compound in the organic solvent is in the range of preferably 0.001 to 0.5 mol/l, particularly preferably 0.01 to 0.1 mol/l.

Examples of the olefin monomer used in the present invention include the same ones as those exemplified above.

The method of producing a nucleator masterbatch according to the present invention comprises the step of polymerizing the above-described olefin monomer with a supply of a nucleator dissolved in an organoaluminum compound or in an organoaluminum compound and an organic solvent before or during the polymerization of the olefin monomer. The ratio of the olefin monomer and the nucleator component is adjusted such that the amount of the nucleator component becomes 0.001 to 0.5 parts by mass with respect to 100 parts by mass of an olefin polymer obtained by the polymerization of the olefin monomer.

As a method of adjusting the amount of the nucleator component with respect to the olefin polymer to be in the above-described range, a method in which the polymerization activity of a case where the polymerization is performed without adding the nucleator component is determined and the polymerization is performed under the same conditions as in the case where the nucleator component is not added, but with an addition of a nucleator dissolved in an organoaluminum compound or in an organoaluminum compound and an organic solvent such that the desired amount of the nucleator component is blended in the resulting polymer, can be employed. Alternatively, an instrument for adjusting the amount of each component to be added may be introduced to a polymerization equipment and the polymerization may be performed while adjusting the blended amount of the nucleator component to be in the above-described range.

In the present invention, an olefin polymer is obtained by homopolymerization of the above-described olefin monomer or by copolymerization including the olefin monomer, and examples thereof include the same ones as those exemplified above.

The polymerization of the olefin monomer can be performed in the presence of a polymerization catalyst in an inert gas atmosphere such as nitrogen; however, it may also be performed in the above-described inert solvent. Further, an active hydrogen compound, a particulate carrier, an organoaluminum compound, an ion-exchangeable layered compound and/or an inorganic silicate may be added in such an amount that does not inhibit the polymerization.

In the present invention, the above-described polymerization catalyst is not particularly restricted, and any known polymerization catalyst can be used. Examples thereof include the same ones as those exemplified above.

In the present invention, the method of polymerizing the olefin monomer is not particularly restricted, and any known method can be employed. Examples thereof include a slurry polymerization method in which polymerization is performed in an inert solvent such as an aliphatic hydrocarbon (e.g., butane, pentane, hexane, heptane or isooctane), an alicyclic hydrocarbon (e.g., cyclopentane, cyclohexane or methylcyclohexane), an aromatic hydrocarbon (e.g. toluene, xylene or ethylbenzene), a gasoline fraction or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; a method of producing an olefin homopolymer by polymerizing the olefin monomer in a single step or multiple steps; and a polymerization method in which a copolymer is produced by copolymerizing propylene with at least one olefin (excluding propylene) unit selected from the group consisting of olefin units having 2 to 12 carbon atoms. Further, these production methods can be used regardless of being a batch type or a continuous type.

As a polymerization vessel to be used in the above-described polymerization method, a continuous reaction vessel provided in an existing polymerization equipment can be used as is, and the present invention is not particularly restricted by the size, shape, material and the like of the conventional polymerization equipment.

In the present invention, at the time of polymerizing the olefin monomer, as required, other additive(s) normally used in an olefin resin can be further added in such a range that does not adversely affect the polymerization. In cases where such other additive(s) is/are added at the time of polymerizing the olefin monomer, the additive(s) may be mixed and stirred with the nucleator and organoaluminum compound. In the reaction by this method, in cases where a compound produced as a by-product does not affect the resulting polymerization product, the additive(s) may be used as is; however, in cases where the by-product compound adversely affects the polymerization product, it is preferred to remove the compound by vacuum distillation or the like before using the additive(s). Alternatively, other additive(s) may be blended after the olefin polymerization.

Further, even if a direct addition of other additive(s) adversely affects the polymerization, as long as the effect on the polymerization can be suppressed by masking with an organoaluminum compound, such additive(s) can be used in the method of producing a nucleator masterbatch according to the present invention.

Examples of the above-described other additives include the same ones as those exemplified for the first embodiment of the present invention.

The preferred amounts of the respective additives to be used in an olefin resin composition obtained by the production method of the present invention can be set in the same ranges as described above. It is noted here that the amounts of use indicate the final amounts of the respective additives used in a molded article obtained by molding an olefin resin composition produced by the production method of the present invention.

A molded article obtained by molding an olefin resin composition produced by the method of producing an olefin resin composition according to the present invention shows excellent rigidity and thus has practical performance as a molded material for various daily life materials as well as for various industrial parts such as automobile parts and home electric appliance parts. Thereamong, the molded article is suitable as a molded material for automobile interior and exterior members, particularly interior parts such as trims, pillars, door trims, instrument panels and consoles. That is, the method of producing an olefin resin composition according to the present invention is suitable as a method of producing an olefin resin composition for daily life materials, a method of producing an olefin resin composition for automobile interior and exterior members, and a method of producing an olefin resin composition for interior parts.

EXAMPLES

The present invention will now be described more concretely by way of production examples, examples and comparative examples thereof. However, the present invention is not restricted thereto by any means.

First Example

Production Examples 1-1-1 to 1-1-3

Preparation of Solid Catalyst Component

After preparing a homogeneous solution by adding and allowing 4.76 g (50 mmol) of anhydrous magnesium chloride, 25 ml of decane and 23.4 ml (150 mmol) of 2-ethylhexyl alcohol to react under heating at 130° C. for 2 hours, 1.11 g (7.5 mmol) of phthalic anhydride was added to the thus obtained homogeneous solution and the resulting mixture was maintained with stirring at 130° C. for 1 hour, thereby dissolving phthalic anhydride in the homogeneous solution. Then, this homogeneous solution was cooled to room temperature and the entire amount thereof was charged dropwise to 200 ml (1.8 mol) of titanium tetrachloride, which had been kept at −20° C., over a period of 1 hour. Thereafter, the resultant was heated to 110° C. over a period of 4 hours. Once the temperature reached 110° C., 2.68 ml (12.5 mmol) of dibutyl phthalate was added and the resulting mixture was allowed to react for 2 hours with stirring while maintaining the temperature at 110° C. After the completion of the reaction, the resulting residue was recovered by hot filtration and re-suspended in 200 ml of titanium tetrachloride, and the suspension was allowed to react under heating at 110° C. for 2 hours. Thereafter, the resulting residue was recovered again by hot filtration and thoroughly washed with 110° C. decane and hexane until no free titanium compound was detected in the washings, thereby obtaining a solid catalyst component. When a portion of this solid catalyst component was sampled and dried to analyze the composition of the catalyst, it was found that the solid catalyst component contained 3.1% by mass of titanium, 56.0% by mass of chlorine, 17.0% by mass of magnesium and 20.9% by mass of dibutyl phthalate.
(Pre-Polymerization)

For adjustment of the amount of nucleator to be blended in the resulting olefin polymer, the polymerization activity was determined in a case where the nucleator solution was not added. Polymerization was performed under the below-described conditions.
(Polymerization Conditions)

To an autoclave whose atmosphere had been replaced with nitrogen, 600 ml of heptane, 303 mg of triethylaluminum, 0.26 mmol of dicyclopentyldimethoxysilane and a heptane slurry of the solid catalyst component produced by the above-described method (0.013 mmol in terms of Ti) were sequentially added and stirred. The atmosphere in the autoclave was replaced with propylene and pre-polymerization was performed at 50° C. for 5 minutes under a propylene pressure of 1 kgf/cm² G. After purging propylene, 340 ml of hydrogen (23° C.) was blown into the autoclave and the temperature was raised to 70° C. to perform polymerization reaction at 70° C. for 1 hour under a propylene pressure of 6 kgf/cm² G. Thereafter, the atmosphere in the system was replaced with nitrogen gas and the polymerization reaction was quenched by adding 5 ml of ethanol at 40° C. The solvent was removed under reduced pressure at 50° C., and the polymerization product was dried in vacuum at 40° C. for 5 hours to obtain a polymer. The polymerization activity of the thus obtained polymer was determined to be 8.0 kg per 1 g of the catalyst.
(Preparation of Nucleator Component Solution)

In a flask whose atmosphere had been replaced with nitrogen, heptane was added to each nucleator component in accordance with the formulation shown in Table 1. While stirring the resulting mixture, triethylaluminum was added thereto dropwise to prepare a nucleator component solution containing 20 mg/ml of the nucleator component. P-2 is one of the nucleator components specifically exemplified in the above. In Table 1, an evaluation of "○" was given when the nucleator component dissolved in the solution, and an evaluation of "x" was given when the nucleator component did not dissolve in the solution.

TABLE 1

| | Nucleator component | | Organic solvent | | Organoaluminum compound | | |
|---|---|---|---|---|---|---|---|
| | Compound name | Amount [g] | Compound name | Volume [ml] | Compound name | Volume [ml] | Solubility |
| Production Example 1-1-1 | P-2 | 3.3 | heptane | 160 | triethylaluminum | 6.9 | ○ |
| Production Example 1-1-2 | Compound 1 | 3.3 | heptane | 154 | triethylaluminum | 11.5 | ○ |
| Production Example 1-1-3 | Na-Bz | 0.6 | heptane | 38 | triethylaluminum | 12.0 | x |

(1) Compound 1: compound having the following structure

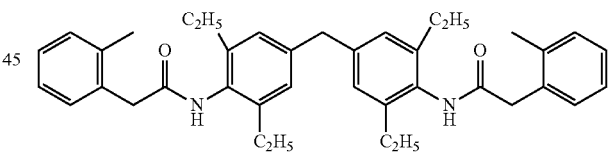

(2) Na-Bz: sodium benzoate

Production Examples 1-2-1 to 1-2-5

Polymerization Method

A masterbatch was obtained by performing polymerization under the same conditions as the above-described pre-polymerization conditions, except that each nucleator component solution was added in the amount shown in Table 2 with respect to 100 parts by mass of the olefin polymer obtained by polymerization, immediately before the addition of the heptane slurry of the solid catalyst component; and that heptane was added in such an amount that the total amount of the resulting solution in the autoclave became 600 ml.

| Production Example | Nucleator component | | | Polymerization activity [g/lg catalyst] |
|---|---|---|---|---|
| | Compound name | Amount of nucleator component solution [ml] | Amount of nucleator component with respect to 100 parts by mass of polymer [parts by mass] | |
| Pre-polymerization | — | 0 | 0 | $8.0 \times 10^3$ |
| Production Example 1-2-1 | P-2 | 150 | 1.81 | $8.2 \times 10^3$ |
| Production Example 1-2-2 | Compound 1 | 150 | 1.72 | $8.2 \times 10^3$ |
| Production Example 1-2-3 | P-2 | 1.5 | 0.022 | $8.0 \times 10^3$ |
| Production Example 1-2-4 | Compound 1 | 7.5 | 0.092 | $8.1 \times 10^3$ |
| Production Example 1-2-5 | Na—Bz | 10 | — | $2.5 \times 10^2$ |

From the results of Production Examples 1-2-1 to 1-2-4 shown in Table 2, it was confirmed that the supply of a nucleator dissolved in an organoaluminum compound or in an organoaluminum compound and an organic solvent had no effect on the polymerization activity; however, from Production Example 1-2-5, it was confirmed that the polymerization activity was markedly reduced when an organoaluminum compound and sodium benzoate that does not dissolve in an organic solvent were used.

(Molding)

In accordance with the amounts shown in Table 3 or 4 with respect to 100 parts by mass of each olefin polymer produced in the respective Production Examples, the masterbatch and/or various additives were added and mixed. Then, using a small injection molding machine for laboratory (manufactured by Xplore Instruments; Compounder 15, Injection Molder 12), the resulting mixture was melt-kneaded at 230° C. to obtain a strand. This strand was pelletized and subsequently injection-molded using the above-described small injection molding machine for laboratory at an injection temperature of 230° C. and a die temperature of 40° C., thereby obtaining a 50 mm×50 mm×2 mm plate-form test piece.

In Examples 1-1-1 and 1-2-1, the masterbatch obtained in the respective Production Example shown in each table was blended with the olefin polymer and various additives were further blended at the time of granulation.

In Comparative Examples 1-1-1, 1-1-2, 1-2-1 and 1-2-2, the olefin polymer obtained by the pre-polymerization was blended with the olefin polymer in place of the masterbatch and various additives were further blended at the time of granulation.

In Comparative Examples 1-1-3 and 1-2-3, the nucleator shown in each table (adjusted to have a concentration of 20 mg/ml) was blended at the time of the polymerization of the olefin polymer and various additives were further blended at the time of granulation.

(Evaluations)

The strands and plate-form test pieces obtained by the above-described production method were subjected to the following evaluations. The results thereof are shown in Table 3 or 4.

In Table 3, the "blended amount" of the masterbatch represents the blended amount of the olefin polymer (masterbatch) obtained in each Production Example when, as resin components, the total amount of the olefin polymer (masterbatch) obtained in the Production Example and the olefin polymer obtained by the pre-polymerization is taken as 100 parts by mass. The "blended amount" of an additive added at the time of polymerization and that of an additive added at the time of granulation each represent the blended amount of the respective additive with respect to 100 parts by mass of the resin components. It is noted here that, in Comparative Examples 1-1-1 and 1-1-2, only the olefin polymer obtained by the pre-polymerization was used and the olefin polymer (masterbatch) obtained in Production Example was not blended.

Further, in Table 4, the "blended amount" of the masterbatch represents the blended amount of the olefin polymer (masterbatch) obtained in each Production Example when the total amount of the olefin polymer (masterbatch) obtained in the Production Example and the olefin polymer obtained by the pre-polymerization is taken as 100 parts by mass. It is noted here that, in Comparative Examples 1-2-1 and 1-2-2, only the olefin polymer obtained by the pre-polymerization was used and the olefin polymer (masterbatch) obtained in Production Example was not blended.

(Crystallization Temperature)

A small amount of each strand obtained above was cut out and its crystallization temperature was measured using a differential scanning calorimeter (Diamond, manufactured by PerkinElmer Inc.). As for the measurement method, in a chart obtained by heating the strand from room temperature to 230° C. at a rate of 50° C./min, maintaining the strand for 10 minutes and then cooling the strand to 50° C. at a rate of −10° C./min, the temperature at which endothermic reaction formed a peak top was defined as the crystallization temperature. The measurement results are shown in Table 3 or 4 below.

(Haze)

Each plate-form test piece obtained above was, after being injection-molded, left to stand for at least 48 hours in a 23° C. thermostat chamber, and its haze was measured using HAZE GUARD II (manufactured by Toyo Seiki Seisaku-sho Ltd.). The results thereof are shown in Table 3 or 4 below.

TABLE 3

| | Production Example | Masterbatch Blended amount [parts by mass] | Additive added at the time of polymerization Compound | Blended amount [parts by mass] | Additives added at the time of granulation Compound | Blended amount [parts by mass] | Evaluation results Crystallization temperature [° C.] | Haze [%] |
|---|---|---|---|---|---|---|---|---|
| Example 1-1-1 | Production Example 1-2-1 | 1.21 | P-2 | 0.022 | AO-1<br>AO-2<br>DHT-4A<br>Na-St | 0.05<br>0.05<br>0.05<br>0.08 | 133 | 69.4 |
| Comparative Example 1-1-1 | Pre-polymerization | 100 | — | — | AO-1<br>AO-2<br>DHT-4A<br>Na-St | 0.05<br>0.05<br>0.05<br>0.08 | 118 | 90.3 |
| Comparative Example 1-1-2 | Pre-polymerization | 100 | — | — | P-2<br>AO-1<br>AO-2<br>DHT-4A<br>Na-St | 0.022<br>0.05<br>0.05<br>0.05<br>0.08 | 128 | 87.8 |
| Comparative Example 1-1-3 | Production Example 1-2-3 | 100 | P-2 | 0.022 | AO-1<br>AO-2<br>DHT-4A<br>Na-St | 0.05<br>0.05<br>0.05<br>0.08 | 132 | 75.7 |

(3) AO-1: tetrakis[methylene-3-(3',5'-di-tert-butyl-4'-hydroxyphenyl)propionate]methane
(4) AO-2: tris(2,4-di-tert-butylphenyl)phosphite
(5) DHT-4A: trade name, hydrotalcite manufactured by Kyowa Chemical Industry Co., Ltd.
(6) Na-St: sodium stearate

TABLE 4

| | Production Example | Masterbatch Added amount [parts by mass] | Additive added at the time of polymerization Compound | Blended amount [parts by mass] | Additives added at the time of granulation Compound | Blended amount [parts by mass] | Evaluation results Crystallization temperature [° C.] | Haze [%] |
|---|---|---|---|---|---|---|---|---|
| Example 1-2-1 | Production Example 1-2-2 | 5.34 | Compound 1 | 0.092 | AO-1<br>AO-2<br>DHT-4A | 0.05<br>0.05<br>0.05 | 126 | 86.9 |
| Comparative Example 1-2-1 | Pre-polymerization | 100 | — | — | AO-1<br>AO-2<br>DHT-4A | 0.05<br>0.05<br>0.05 | 117 | 90.0 |
| Comparative Example 1-2-2 | Pre-polymerization | 100 | — | — | Compound 1<br>AO-1<br>AO-2<br>DHT-4A | 0.092<br>0.05<br>0.05<br>0.05 | 118 | 89.3 |
| Comparative Example 1-2-3 | Production Example 1-2-4 | 100 | Compound 1 | 0.092 | AO-1<br>AO-2<br>DHT-4A | 0.05<br>0.05<br>0.05 | 119 | 88.1 |

As compared to the propylene resin compositions of Comparative Examples 1-1-1 and 1-2-1 in which no nucleator was blended, the resin compositions of Comparative Examples 1-1-2 and 1-2-2 in which the nucleator and propylene polymer were melt-kneaded showed slightly improved crystallization temperature and transparency.

In addition, according to the results of Comparative Examples 1-1-3 and 1-2-3, although the resin compositions in which the nucleator was added at the time of the polymerization showed superior crystallization temperature and transparency as compared to the resin composition in which the nucleator was added at the time of the granulation, the improving effects were limited.

In contrast, from the results of Examples 1-1-1 and 1-2-1, it was confirmed that the crystallization temperature and transparency can be further improved by using a masterbatch obtained by the production method of the present invention. Particularly, in Example 1-2-1 where an amide compound was added to the masterbatch, the crystallization temperature was markedly increased.

From the above, it was confirmed that an olefin resin composition having excellent actions and effects of a nucleator can be obtained by using a nucleator masterbatch obtained by the method of producing a nucleator masterbatch according to the present invention.

Second Example

Production Example 2-1

Examples 2-1 and 2-2, Comparative Examples 2-1 to 2-5

Preparation of Solid Catalyst Component

After preparing a homogeneous solution by adding and allowing 4.76 g (50 mmol) of anhydrous magnesium chloride, 25 mL of decane and 23.4 mL (150 mmol) of 2-ethylhexyl alcohol to react under heating at 130° C. for 2 hours, 1.11 g (7.5 mmol) of phthalic anhydride was added to the thus obtained homogeneous solution and the resulting mixture was maintained with stirring at 130° C. for 1 hour, thereby dissolving phthalic anhydride in the homogeneous solution. Then, this homogeneous solution was cooled to room temperature and the entire amount thereof was charged dropwise to 200 mL (1.8 mol) of titanium tetrachloride, which had been kept at −20° C., over a period of 1 hour. Thereafter, the resultant was heated to 110° C. over a period of 4 hours. Once the temperature reached 110° C., 2.68 mL (12.5 mmol) of diisobutyl phthalate was added and the resulting mixture was allowed to react for 2 hours with stirring while maintaining the temperature at 110° C. After the completion of the reaction, the resulting residue was recovered by hot filtration and re-suspended in 200 ml of titanium tetrachloride, and the suspension was allowed to react under heating at 110° C. for 2 hours. Thereafter, the resulting residue was recovered again by hot filtration and thoroughly washed with 110° C. decane and hexane until no free titanium compound was detected in the washings, thereby obtaining a solid catalyst component. When a portion of this solid titanium catalyst component was sampled and dried to analyze the composition of the catalyst, it was found that the solid catalyst component contained 3.1% by mass of titanium, 56.0% by mass of chlorine, 17.0% by mass of magnesium and 20.9% by mass of isobutyl phthalate.

(Preparation of Nucleator Component Solution)

In a flask whose atmosphere had been replaced with nitrogen, 10 mg of heptane, 22 mg of triethylaluminum and the compound shown in Table 5 were added and mixed with stirring to prepare a nucleator component solution containing 16 mg/ml of the compound shown in Table 5. P-2 is one of the nucleator components specifically exemplified in the above.

For the cases where no compound is listed in the column "Additive(s) added at the time of polymerization" of Table 5, a mixed solution of 10 mg of heptane and 22 mg of triethylaluminum was used.

(Polymerization)

To an autoclave whose atmosphere had been replaced with nitrogen, 600 mL of heptane, 303 mg of triethylaluminum, and the thus obtained nucleator solution in the amount shown in Table 5 with respect to 100 parts by mass of the resulting polymer were added. Then, 0.26 mmol of dicyclopentyldimethoxysilane and a heptane slurry of the above solid catalyst component (0.013 mmol in terms of Ti) were sequentially added and stirred. The atmosphere in the autoclave was replaced with propylene and pre-polymerization was performed at 50° C. for 5 minutes under a propylene pressure of 1 kgf/cm² G. After purging propylene, 340 ml of hydrogen (23° C.) was blown into the autoclave and the temperature was raised to 70° C. to perform polymerization reaction at 70° C. for 1 hour under a propylene pressure of 6 kgf/cm² G. Thereafter, the atmosphere in the system was replaced with nitrogen gas and the polymerization reaction was quenched by adding 5 ml of ethanol at 40° C. The solvent was then removed under reduced pressure at 50° C., and the polymerization product was dried in vacuum at 40° C. for 5 hours to obtain a polymer.

Production Example 2-2

Example 2-3

Preparation of Nucleator Component Solution

A solution containing P-2 as a nucleator component was prepared in the same manner as in Production Example 2-1.

(Preparation of Phenoxide Solution)

In a flask whose atmosphere had been replaced with nitrogen, 10 ml of heptane, 54 mg of triethylaluminum and 161 mg of a phenolic antioxidant, stearyl-3-(3,5-di-tert-butyl-4-hydroxyphenyl)propionic acid amide, were mixed with stirring to mask the phenolic antioxidant and to thereby prepare a stabilizer solution having a phenolic antioxidant concentration of 16 mg/ml.

(Preparation of Phosphite Solution)

To a flask whose atmosphere had been replaced with nitrogen, 144 mg of a phosphorus-based antioxidant, tris(2,4-di-t-butylphenyl)phosphite, was added, and 6 mL of heptane was further admixed thereto with stirring to prepare a phosphite solution having a phosphorus-based antioxidant concentration of 24 mg/mL.

(Polymerization)

To an autoclave whose atmosphere had been replaced with nitrogen, 600 ml of heptane and 303 mg of triethylaluminum, as well as the above-described nucleator solution, phenoxide solution and phosphite solution in the respective amounts shown in Table 5 with respect to 100 parts by mass of the resulting polymer were added. Then, 0.26 mmol of dicyclopentyldimethoxysilane and a heptane slurry of a solid catalyst component (0.013 mmol in terms of Ti) were sequentially added and stirred. The solid catalyst component used here was the same as the one prepared in Example 2-1. The atmosphere in the autoclave was replaced with propylene and pre-polymerization was performed at 50° C. for 5 minutes under a propylene pressure of 1 kgf/cm² G. After purging propylene, 340 ml of hydrogen (23° C.) was blown into the autoclave and the temperature was raised to 70° C. to perform polymerization reaction at 70° C. for 1 hour under a propylene pressure of 6 kgf/cm² G. Thereafter, the atmosphere in the system was replaced with nitrogen gas and the polymerization reaction was quenched by adding 5 ml of ethanol at 40° C. The solvent was then removed under reduced pressure at 50° C., and the polymerization product was dried in vacuum at 40° C. for 5 hours to obtain a polymer.

(Molding)

In accordance with the amounts shown in Table 5 with respect to 100 parts by mass of each polymer produced in the above-described Production Examples 2-1 and 2-2, the respective additives were added and mixed. Then, using a small injection molding machine for laboratory (manufactured by Xplore Instruments; Compounder 15, Injection Molder 12), the resulting mixture was melt-kneaded at 230° C. to obtain a strand. Further, this strand was injection-molded using the above-described small injection molding machine for laboratory at an injection temperature of 230° C. and a die temperature of 40° C., thereby obtaining a 50 mm×90 mm×2 mm plate-form test piece.

(Evaluations)

The strands and plate-form test pieces obtained by the above-described production method were subjected to the following evaluations. The results thereof are shown in Table 5.

(Crystallization Temperature)

A small amount of each strand obtained above was cut out and its crystallization temperature was measured using a differential scanning calorimeter (Diamond, manufactured by PerkinElmer Inc.). As for the measurement method, in a chart obtained by heating the strand from room temperature to 230° C. at a rate of 50° C./min, maintaining the strand for 10 minutes and then cooling the strand to 50° C. at a rate of −10° C./min, the temperature at which endothermic reaction formed a peak top was defined as the crystallization temperature. The measurement results are shown in Table 5 below.

(Haze)

Each plate-form test piece obtained above was, after being injection-molded, left to stand for at least 48 hours in a 23° C. thermostat chamber, and its haze was measured using HAZE GUARD II (manufactured by Toyo Seiki Seisaku-sho Ltd.). The results thereof are shown in Table 5 below.

From the results of Comparative Example 2-2, it was confirmed that the crystallization-promoting effect was small when no metal aliphatic carboxylate was blended in the second step.

In addition, according to the results of Comparative Examples 2-3 and 2-4, the crystallization-promoting effect was not satisfactory when no nucleator component was added at the time of performing the polymerization in the first step.

In contrast, from the results of Examples 2-1 and 2-2, the polymers produced by the method of the present invention showed excellent crystallization-promoting effect as well as excellent transparency-improving effect. From the above, it is seen that a molded article showing excellent crystallization-promoting effect and excellent transparency can be obtained by molding a polymer obtained by the production method of the present invention.

Moreover, from the results of Example 2-3, it was confirmed that the addition of the nucleator component represented by the Formula (1) and other additives to the polymerization system had little effect on the physical properties of the resulting molded article.

TABLE 5

|  | Additive(s) added at the time of polymerization (First step) | | Additives added at the time of granulation (Second step) | | Crystallization temperature [° C.] | Haze [%] |
|---|---|---|---|---|---|---|
|  | Compound | Blended amount [parts by mass] | Compound | Blended amount [parts by mass] |  |  |
| Example 2-1 | P-2 | 0.02 | Na-St | 0.08 | 131.8 | 75.6 |
|  |  |  | AO-1 | 0.05 |  |  |
|  |  |  | AO-2 | 0.05 |  |  |
|  |  |  | DHT-4A | 0.05 |  |  |
| Example 2-2 | P-2 | 0.02 | Li-St | 0.08 | 128.4 | 75.1 |
|  |  |  | AO-1 | 0.05 |  |  |
|  |  |  | AO-2 | 0.05 |  |  |
|  |  |  | DHT-4A | 0.05 |  |  |
| Example 2-3 | P-2 | 0.02 | Li-St | 0.08 | 128.3 | 75.0 |
|  | AO-2 | 0.075 | DHT-4A | 0.05 |  |  |
|  | AO-3 | 0.025 |  |  |  |  |
| Comparative Example 2-1 | — | — | AO-1 | 0.05 | 117.9 | >90 |
|  |  |  | AO-2 | 0.05 |  |  |
|  |  |  | DHT-4A | 0.05 |  |  |
| Comparative Example 2-2 | P-2 | 0.02 | AO-1 | 0.05 | 118.0 | 89.4 |
|  |  |  | AO-2 | 0.05 |  |  |
|  |  |  | DHT-4A | 0.05 |  |  |
| Comparative Example 2-3 | — | — | P-2 | 0.02 | 127.6 | 87.8 |
|  |  |  | Na-St | 0.08 |  |  |
|  |  |  | AO-1 | 0.05 |  |  |
|  |  |  | AO-2 | 0.05 |  |  |
|  |  |  | DHT-4A | 0.05 |  |  |
| Comparative Example 2-4 | — | — | P-2 | 0.02 | 127.8 | 75.3 |
|  |  |  | Li-St | 0.08 |  |  |
|  |  |  | AO-1 | 0.05 |  |  |
|  |  |  | AO-2 | 0.05 |  |  |
|  |  |  | DHT-4A | 0.05 |  |  |
| Comparative Example 2-5 | — | — | Na-St | 0.08 | 118.0 | >90 |
|  |  |  | AO-1 | 0.05 |  |  |
|  |  |  | AO-2 | 0.05 |  |  |
|  |  |  | DHT-4A | 0.05 |  |  |

1) Na-St: sodium stearate
2) Li-St: lithium stearate
3) AO-1: tetrakis[methylene-3-(3'-5'-di-t-butyl-4'-hydroxyphenyl)propionate]methane
4) AO-2: tris(2,4-di-tert-butylphenyl)phosphite
5) AO-3: stearyl-3-(3,5-di-tert-butyl-4-hydroxyphenyl) propionic acid amide
6) DHT-4A: hydrotalcite (manufactured by Kyowa Chemical Industry Co., Ltd.)

Furthermore, in cases where a polymer obtained by the first step is used as a masterbatch in the method of producing a polyolefin-based resin composition according to the present invention, the masterbatch can also be produced by incorporating a nucleator represented by the Formula (1) in an amount of not less than 10 parts by mass with respect to 100 parts by mass of the polymer.

Third Example

Preparation of Solid Catalyst Component

After preparing a homogeneous solution by adding and allowing 4.76 g (50 mmol) of anhydrous magnesium chloride, 25 ml of decane and 23.4 ml (150 mmol) of 2-ethylhexyl alcohol to react under heating at 130° C. for 2 hours, 1.11 g (7.5 mmol) of phthalic anhydride was added to the thus obtained homogeneous solution and the resulting mixture was maintained with stirring at 130° C. for 1 hour, thereby dissolving phthalic anhydride in the homogeneous solution. Then, this homogeneous solution was cooled to room temperature and the entire amount thereof was charged dropwise to 200 ml (1.8 mol) of titanium tetrachloride, which had been kept at −20° C., over a period of 1 hour. Thereafter, the resultant was heated to 110° C. over a period of 4 hours. Once the temperature reached 110° C., 2.68 ml (12.5 mmol) of dibutyl phthalate was added and the resulting mixture was allowed to react for 2 hours with stirring while maintaining the temperature at 110° C. After the completion of the reaction, the resulting residue was recovered by hot filtration and re-suspended in 200 ml of titanium tetrachloride, and the suspension was allowed to react under heating at 110° C. for 2 hours. Thereafter, the resulting residue was recovered again by hot filtration and thoroughly washed with 110° C. decane and hexane until no free titanium compound was detected in the washings, thereby obtaining a solid catalyst component. When a portion of this solid catalyst component was sampled and dried to analyze the composition of the catalyst, it was found that the solid catalyst component contained 3.1% by mass of titanium, 56.0% by mass of chlorine, 17.0% by mass of magnesium and 20.9% by mass of dibutyl phthalate.

(Pre-Polymerization)

For adjustment of the amount of nucleator to be blended in the resulting olefin polymer, the polymerization activity was determined in a case where the nucleator solution was not added. Polymerization was performed under the below-described conditions.

(Polymerization Conditions)

To an autoclave whose atmosphere had been replaced with nitrogen, 600 ml of heptane, 303 mg of triethylaluminum, 0.26 mmol of dicyclopentyldimethoxysilane and a heptane slurry of the solid catalyst component produced by the above-described method (0.013 mmol in terms of Ti) were sequentially added and stirred. The atmosphere in the autoclave was replaced with propylene and pre-polymerization was performed at 50° C. for 5 minutes under a propylene pressure of 1 kgf/cm² G. After purging propylene, 340 ml of hydrogen (23° C.) was blown into the autoclave and the temperature was raised to 70° C. to perform polymerization reaction at 70° C. for 1 hour under a propylene pressure of 6 kgf/cm² G. Thereafter, the atmosphere in the system was replaced with nitrogen gas and the polymerization reaction was quenched by adding 5 ml of ethanol at 40° C. The solvent was removed under reduced pressure at 50° C., and the polymerization product was dried in vacuum at 40° C. for 5 hours to obtain a polymer. The polymerization activity of the thus obtained polymer was determined to be 8.0 kg per 1 g of the catalyst.

(Preparation of Nucleator Component Solution)

In a flask whose atmosphere had been replaced with nitrogen, heptane was added to each nucleator component in accordance with the formulation shown in Table 6. While stirring the resulting mixture, triethylaluminum was added thereto dropwise to prepare a nucleator component solution containing 20 mg/ml of the nucleator component. P-2 is one of the nucleator components specifically exemplified in the above.

TABLE 6

| | Nucleator component | | | | | |
|---|---|---|---|---|---|---|
| | | Added amount [g] | Organic solvent | | Organoaluminum compound | |
| | Compound name | | Compound name | Volume [ml] | Compound name | Volume [ml] | Solubility |
| Solution A | P-2 | 3.3 | heptane | 160 | triethylaluminuin | 6.9 | o |
| Solution B | Compound 1 | 3.3 | heptane | 154 | triethylaluminum | 11.5 | o |
| Mixture C | Na-Bz | 0.6 | heptane | 38 | triethylaluminum | 12.0 | x |

(1) Compound 1: compound having the following structure

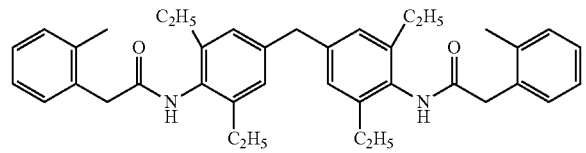

(2) Na-Bz: sodium benzoate (Polymerization)

Polymerization was performed under the same conditions as the above-described pre-polymerization conditions, except that the nucleator component solution was added in the amount shown in Table 7 with respect to 100 parts by mass of the olefin polymer obtained by polymerization, immediately before the addition of the heptane slurry of the solid catalyst component; and that heptane was added in such an amount that the total amount of the resulting solution in the autoclave became 600 ml. Ethanol was not added.

It is noted here that, when the Mixture C was supplied during the polymerization of olefin monomer, since the polymerization activity was low, the resulting olefin monomer was not obtained in an amount required for molding.

Example 3-1-1

A commercially available high-purity nitrogen gas was passed through water to obtain a nitrogen gas having a water content of 1.2×10⁻³ in terms of the volume ratio with respect to 1 volume of nitrogen. Then, each olefin polymer obtained by the above-described production method was transferred to a purge column with the olefin polymer containing the solvent, and the solvent was transferred to a flare line under nitrogen atmosphere for removal. After the solvent removal, a flow of the above-described nitrogen gas was introduced to the resulting olefin polymer at a flow rate of 100 ml/min for 2 hours so as to perform regeneration treatment of the nucleator component contained in the olefin polymer.

Example 3-1-2

Example 3-1-2 was carried out in the same manner as the above-described Example 3-1-1, except that a nitrogen gas having a water content of $1.0 \times 10^{-2}$ in terms of the volume ratio with respect to 1 volume of nitrogen was used in place of the nitrogen gas having a water content of $1.2 \times 10^{-3}$ in terms of the volume ratio with respect to 1 volume of nitrogen.

Example 3-1-3

Example 3-1-3 was carried out in the same manner as the above-described Example 3-1-1, except that methanol was used in place of water.

Example 3-1-4

Example 3-1-4 was carried out in the same manner as the above-described Example 3-1-1, except that ethanol was used in place of water.

Example 3-1-5

The olefin polymer obtained in Production Example 3-1-1 was transferred to a purge column with the olefin polymer containing the solvent, and the solvent was transferred to a flare line under nitrogen atmosphere for removal. Then, from a lower part of a cylindrical purge column, a flow of steam having a pressure of 5 kPa was introduced at a rate of 100 ml/min for 2 hours and brought into contact with the olefin polymer.

Comparative Example 3-1-1

Comparative Example 3-1-1 was carried out in the same manner as the above-described Example 3-1-1, except that the nitrogen gas was used as it was without being passed through water.

Comparative Example 3-1-2

Comparative Example 3-1-2 was carried out in the same manner as the above-described Example 3-1-1, except that water (not steam) was used in place of the water-containing nitrogen gas.

(Evaluations)

To 100 parts by mass of each of the thus obtained olefin polymers, as a phenolic antioxidant, phosphorus-based antioxidant, hydrotalcite and metal aliphatic carboxylate, 0.05 parts by mass of tetrakis[methylene-3-(3',5'-di-tert-butyl-4'-hydroxyphenyl)propionate]methane, 0.05 parts by mass of tris(2,4-di-tert-butylphenyl)phosphite, 0.05 parts by mass of DHT-4A (trade name; manufactured by Kyowa Chemical Industry Co., Ltd.) and 0.08 parts by mass of sodium stearate were blended, respectively, and additives were also added and mixed. Using a small injection molding machine for laboratory (manufactured by Xplore Instruments; Compounder 15, Injection Molder 12), the resulting mixture was melt-kneaded at 230° C. to obtain a strand. This strand was pelletized and subsequently injection-molded using the above-described small injection molding machine for laboratory at an injection temperature of 230° C. and a die temperature of 40° C., thereby obtaining a 50 mm×50 mm×2 mm plate-form test piece.

(Cloudiness)

The condition of each of the thus obtained plate-form test pieces was visually observed. The results thereof are shown in Table 7 below.

(Amount of Volatilization)

Each strand obtained above was cut out and 5 mg thereof was weighed to prepare a measurement sample. As for the amount of volatilization, using Thermo Plus 2/(TG-DTA Series) manufactured by Rigaku Corporation, the amount of weight reduction was measured when the temperature of the measurement sample (5 mg) heated under a nitrogen atmosphere (flow rate: 200 ml/min) at a heating rate of 50° C./min reached 150° C. from room temperature, and the amount of volatilization (%) was calculated by the following equation.

Amount of volatilization (%)=(Amount of weight reduction)/(Weight of measurement sample− Amount of weight reduction)×100

The results thereof are shown in Table 7 below.

TABLE 7

| | Nucleator added at the time of polymerization | | Fluid | Proton-donating substance [volume ratio with respect to nitrogen] | Cloudiness | Amount of volatilization [%] |
|---|---|---|---|---|---|---|
| | Compound | Blended amount [parts by mass] | | | | |
| Example 3-1-1 | P-2 | 0.022 | nitrogen gas | water, $1.2 \times 10^{-3}$ | not observed | 1.6 |
| Example 3-1-2 | P-2 | 0.022 | nitrogen gas | water, $1.0 \times 10^{-2}$ | not observed | 3.3 |
| Example 3-1-3 | P-2 | 0.022 | nitrogen gas | methanol | not observed | 1.7 |
| Example 3-1-4 | P-2 | 0.022 | nitrogen gas | ethanol | not observed | 2.0 |
| Example 3-1-5 | P-2 | 0.022 | steam | — | not observed | 3.2 |
| Comparative Example 3-1-1 | P-2 | 0.022 | — | — | Cloudiness was observed. | — |
| Comparative Example 3-1-2 | P-2 | 0.022 | water | no nitrogen | not observed | 5< |

According to the results of Comparative Example 3-1-1 shown in Table 7, when neither of a nitrogen gas containing water or a proton-donating substance nor steam was introduced, the nucleator was not sufficiently regenerated and the molded article did not have sufficient transparency. In addition, according to the results of Comparative Example 3-1-2, when the olefin polymer was treated with non-steam water, although the transparency of the molded article was improved, since the olefin polymer had a high water content, a foaming phenomenon occurred during the molding, making this process unstable.

In contrast, according to the results of Examples 3-1-1 and 3-1-2, the molded articles having excellent transparency were obtained from the olefin resin compositions produced by the method of the present invention where a water-containing nitrogen gas is brought into contact with an olefin polymer, and no foaming phenomenon was observed during the molding. In addition, from the results of Examples 3-1-3 and 3-1-4, it was confirmed that the effects of the present invention can be attained even when a proton-donating substance such as methanol or ethanol is used in place of water. Moreover, from the results of Example 3-1-5, it was confirmed that the effects of the present invention can be attained also when steam is brought into contact with the olefin polymer.

Example 3-2-1

P-2 dissolved with an organoaluminum compound was supplied in the amount shown in Table 8 and, as a phenolic antioxidant, phosphorus-based antioxidant, hydrotalcite and metal aliphatic carboxylate, 0.05 parts by mass of tetrakis[methylene-3-(3',5'-di-tert-butyl-4'-hydroxyphenyl)propionate]methane, 0.05 parts by mass of tris(2,4-di-tert-butylphenyl)phosphite, 0.05 parts by mass of DHT-4A (trade name; manufactured by Kyowa Chemical Industry Co., Ltd.) and 0.08 parts by mass of sodium stearate, respectively, were blended with respect to 100 parts by mass of an olefin polymer obtained by polymerization of an olefin monomer. Then, additives were further added and mixed, and the resulting mixture was granulated using a biaxial extruder (PCM-30 manufactured by Ikegai Corp., extrusion temperature: 230° C., screw speed: 50 rpm). In this granulation, the process up to supplying of the olefin polymer to the biaxial extruder was performed under a nitrogen atmosphere and, while performing suction through vents arranged in the head part of the biaxial extruder and in the vicinity of the center of the screw, steam was injected into the barrel between the feed port of the olefin polymer and the vents at a pressure of 15 kPa and a flow rate of 100 ml/min, thereby obtaining a pellet.

Example 3-2-2

A pellet was obtained in the same manner as in the above-described Example 3-2-1, except that a nitrogen gas having a water content of $1.0 \times 10^{-3}$ in terms of the volume ratio with respect to 1 volume of nitrogen was introduced at a flow rate of 100 ml/min in place of steam.

Example 3-2-3

A pellet was obtained in the same manner as in the above-described Example 3-2-1, except that the nucleator was changed from P-2 to an olefin polymer, Compound 1.

Example 3-2-4

Example 3-2-4 was carried out in the same manner as the above-described Example 3-2-2, except that the nucleator was changed from P-2 to an olefin polymer, Compound 1.

Comparative Example 3-2-1

A pellet was obtained in the same manner as in the above-described Example 3-2-1, except that neither the introduction of steam nor the suction through the vents was performed in the granulation of the olefin polymer.

Comparative Example 3-2-2

A pellet was obtained in the same manner as in the above-described Example 3-2-3, except that neither the introduction of steam nor the suction through the vents was performed in the granulation of the olefin polymer.

[Evaluation]

The pellets obtained in the above-described Examples and Comparative Examples were each injection-molded using a small injection molding machine for laboratory (manufactured by Xplore Instruments; Compounder 15, Injection Molder 12) at an injection temperature of 230° C. and a die temperature of 40° C., thereby obtaining a 50 mm×50 mm×2 mm plate-form test piece.

For each of the thus obtained plate-form test pieces, the presence or absence of cloudiness was examined. The results thereof are shown in Table 8.

TABLE 8

| | Nucleator added at the time of polymerization | | Post-treatment and processing | | |
|---|---|---|---|---|---|
| | Compound | Blended amount [parts by mass] | Injection of steam in granulation | Contact with water-containing nitrogen in granulation | Cloudiness |
| Example 3-2-1 | P-2 | 0.022 | ○ | — | not observed |
| Example 3-2-2 | P-2 | 0.022 | — | ○ | not observed |
| Example 3-2-3 | Compound 1 | 0.092 | ○ | — | not observed |
| Example 3-2-4 | Compound 1 | 0.092 | — | ○ | not observed |
| Comparative Example 3-2-1 | P-2 | 0.022 | — | — | Cloudiness was observed. |
| Comparative Example 3-2-2 | Compound 1 | 0.092 | — | — | Cloudiness was observed. |

According to the results of Comparative Examples 3-2-1 and 3-2-2 shown in Table 8, the molded articles of the olefin polymers produced by a method other than the production method of the present invention did not have sufficient transparency. In contrast, from the results of Examples 3-2-1 to 3-2-4, it was confirmed that the molded articles obtained from the olefin polymers produced by the production method of the present invention had good transparency.

From the above, it was confirmed that, in the present invention, a molded article showing excellent transparency can be obtained by injecting a nitrogen gas containing water or a proton-donating substance, or steam, into an extruder when granulating the olefin polymer.

Fourth Example

In Examples and Comparative Examples, the physical property values were measured by the following methods.
(Preparation of Solid Catalyst Component)

After preparing a homogeneous solution by adding and allowing 4.76 g (50 mmol) of anhydrous magnesium chloride, 25 ml of decane and 23.4 ml (150 mmol) of 2-ethylhexyl alcohol to react under heating at 130° C. for 2 hours, 1.11 g (7.5 mmol) of phthalic anhydride was added to the thus obtained homogeneous solution and the resulting mixture was maintained with stirring at 130° C. for 1 hour, thereby dissolving phthalic anhydride in the homogeneous solution. Then, this homogeneous solution was cooled to room temperature and the entire amount thereof was charged dropwise to 200 ml (1.8 mol) of titanium tetrachloride, which had been kept at −20° C., over a period of 1 hour. Thereafter, the resultant was heated to 110° C. over a period of 4 hours. Once the temperature reached 110° C., 2.68 ml (12.5 mmol) of dibutyl phthalate was added and the resulting mixture was allowed to react for 2 hours with stirring while maintaining the temperature at 110° C. After the completion of the reaction, the resulting residue was recovered by hot filtration and re-suspended in 200 ml of titanium tetrachloride, and the suspension was allowed to react under heating at 110° C. for 2 hours. Thereafter, the resulting residue was recovered again by hot filtration and thoroughly washed with 110° C. decane and hexane until no free titanium compound was detected in the washings, thereby obtaining a solid catalyst component. When a portion of this solid catalyst component was sampled and dried to analyze the composition of the catalyst, it was found that the solid catalyst component contained 3.1% by mass of titanium, 56.0% by mass of chlorine, 17.0% by mass of magnesium and 20.9% by mass of dibutyl phthalate.
(Pre-Polymerization)

For adjustment of the amount of nucleator to be blended in the resulting olefin polymer, the polymerization activity was determined in a case where the nucleator solution was not added. Polymerization was performed under the below-described conditions.
(Polymerization Conditions)

To an autoclave whose atmosphere had been replaced with nitrogen, 600 ml of heptane, 303 mg of triethylaluminum, 0.26 mmol of dicyclopentyldimethoxysilane and a heptane slurry of the solid catalyst component produced by the above-described method (0.013 mmol in terms of Ti) were sequentially added and stirred. The atmosphere in the autoclave was replaced with propylene and pre-polymerization was performed at 50° C. for 5 minutes under a propylene pressure of 1 kgf/cm$^2$ G. After purging propylene, 340 ml of hydrogen (23° C.) was blown into the autoclave and the temperature was raised to 70° C. to perform polymerization reaction at 70° C. for 1 hour under a propylene pressure of 6 kgf/cm$^2$ G. Thereafter, the atmosphere in the system was replaced with nitrogen gas and the polymerization reaction was quenched by adding 5 ml of ethanol at 40° C. The solvent was removed under reduced pressure at 50° C., and the polymerization product was dried in vacuum at 40° C. for 5 hours to obtain a polymer. The polymerization activity of the thus obtained polymer was determined to be 8.0 kg per 1 g of the catalyst.
(Preparation of Nucleator Component Solution)

In a flask whose atmosphere had been replaced with nitrogen, heptane was added to each nucleator component in accordance with the formulation shown in Table 9. While stirring the resulting mixture, triethylaluminum was added thereto dropwise to prepare a nucleator component solution containing 20 mg/ml of the nucleator component. P-2 is one of the nucleator components specifically exemplified in the above. In Table 9, an evaluation of "○" was given when the nucleator component dissolved in the solution, and an evaluation of "x" was given when the nucleator component did not dissolve in the solution.

TABLE 9

| | Nucleator component | | Organic solvent | | Organoaluminum compound | | |
|---|---|---|---|---|---|---|---|
| | Compound name | Added amount [g] | Compound name | Volume [ml] | Compound name | Volume [ml] | Solubility |
| Production Example 4-1-1 | P-2 | 3.3 | heptane | 160 | triethylaluminum | 6.9 | ○ |
| Production Example 4-1-2 | Compound 1 | 3.3 | heptane | 154 | triethylaluminum | 11.5 | ○ |
| Production Example 4-1-3 | Na-Bz | 0.6 | heptane | 38 | triethylaluminum | 12.0 | x |

(1) Compound 1: compound having the following structure

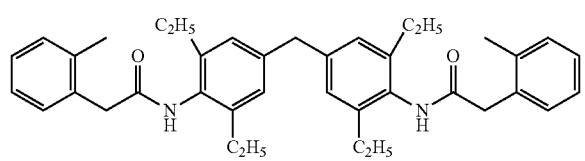 [SMILES: CCc1cc(Cc2cc(CC)c(NC(=O)Cc3ccccc3C)c(CC)c2)cc(CC)c1NC(=O)Cc1ccccc1C]

(2) Na—Bz: sodium benzoate
(Polymerization)

Polymerization was performed under the same conditions as the above-described pre-polymerization conditions, except that the nucleator component solution was added in the amount shown in Table 10 with respect to 100 parts by mass of the olefin polymer obtained by polymerization, immediately before the addition of the heptane slurry of the solid catalyst component; and that heptane was added in such an amount that the total amount of the resulting solution in the autoclave became 600 ml. It is noted here that, when the mixture of the nucleator component, organic solvent, and organoaluminum compound of Production Example 4-1-3 was supplied, since the polymerization activity was low, the resulting olefin monomer was not obtained in an amount required for molding.

(Molding of Film Material)

To 100 parts by mass of each polymer produced in the above-described Production Examples, the respective additives were added and mixed in the amounts shown in Table 10. Then, the resulting mixture was extrusion-molded using a T-die at an extrusion temperature of 250° C. to obtain a film sheet of 60 μm in thickness and 300 mm in width. It is noted here that, in Comparative Examples 4-1 to 4-3, evaluations were performed using the olefin polymer obtained by the above-described pre-polymerization.

(Molding of Fiber Material)

To 100 parts by mass of each polymer obtained by the above-described production method, the respective additives were added and mixed in the amounts shown in Table 10. Then, the resulting mixture was kneaded using a uniaxial extruder (apparatus: LABO PLASTOMILL Micro, manufactured by Toyo Seiki Scisaku-sho, Ltd.; extrusion temperature: 250° C.; screw speed: 50 rpm) and subsequently spun by a melt-blow method using a spinning machine (nozzle: 0.45 mm ϕ, 30-hole nozzle; discharge rate: 1.0 g/min; air supply pressure: 0.7 kg/cm$^2$) to obtain a fiber. It is noted here that, in Comparative Examples 4-1 to 4-3, evaluations were performed using the olefin polymer obtained by the above-described pre-polymerization.

(Evaluations)

The films and fibers obtained by the above-described production methods were subjected to the following evaluations. The results thereof are shown in Table 10.

<Evaluation of Film Material>

(Outer Appearance)

In the sheets obtained by the described method, an evaluation of "○" was given when no abnormality was found as a result of visually examining the presence of a flow mark, foreign substance or the like, and an evaluation of "x" was given when a flow mark or a foreign substance was observed. The evaluation results are shown in Table 10.

(Tensile Elastic Modulus)

The tensile elastic modulus was determined in accordance with the film test method prescribed in ISO527-3. From each sheet-form molded article, a rectangular test piece of 10 mm×150 mm in size was cut out, and this test piece was stretched at a chuck distance of 10 cm and a tensile rate of 10 cm/min to measure the tensile elastic modulus. The results thereof are shown in Table 10.

<Evaluation of Fiber Material Application>

(Thread Breakage During Spinning)

During the spinning process, the vicinity of the spinning nozzle was illuminated with light from behind to visually observe the condition of thread breakage (presence or absence of thread breakage). An evaluation of "○" was given when no thread breakage was observed after 1 hour of processing, and an evaluation of "x" was given when thread breakage occurred. The evaluation results are shown in Table 10.

TABLE 10

| | Additive added at the time of polymerization | | Additives added at the time of granulation | | Evaluation results | | |
|---|---|---|---|---|---|---|---|
| | | | | | | Film Material | |
| | Compound | Blended amount [parts by mass] | Compound | Blended amount [parts by mass] | Outer appearance | Tensile elastic modulus [MPa] | Fiber Material Thread breakage |
| Example 4-1 | P-2 | 0.022 | AO-1 | 0.05 | ○ | 2,140 | ○ |
| | | | AO-2 | 0.05 | | | |
| | | | DHT-4A | 0.05 | | | |
| | | | Na-St | 0.08 | | | |
| Example 4-2 | Compound 1 | 0.092 | AO-1 | 0.05 | ○ | 1,930 | ○ |
| | | | AO-2 | 0.05 | | | |
| | | | DHT-4A | 0.05 | | | |
| | | | Na-St | 0.08 | | | |
| Comparative Example 4-1 | — | — | AO-1 | 0.05 | x | 1,690 | ○ |
| | | | AO-2 | 0.05 | | | |
| | | | DHT-4A | 0.05 | | | |
| | | | Na-St | 0.08 | | | |
| Comparative Example 4-2 | — | — | P-2 | 0.022 | x | 2,010 | x |
| | | | AO-1 | 0.05 | | | |
| | | | AO-2 | 0.05 | | | |
| | | | DHT-4A | 0.05 | | | |
| | | | Na-St | 0.08 | | | |
| Comparative Example 4-3 | — | — | Compound 1 | 0.092 | x | 1,850 | x |
| | | | AO-1 | 0.05 | | | |
| | | | AO-2 | 0.05 | | | |
| | | | DHT-4A | 0.05 | | | |
| | | | Na-St | 0.08 | | | |

(3) AO-1: tetrakis[methylene-3-(3',5'-di-tert-butyl-4'-hydroxyphenyl)propionate]methane
(4) AO-2: tris(2,4-di-tert-butylphenyl)phosphite
(5) DHT-4A: trade name, hydrotalcite manufactured by Kyowa Chemical Industry Co., Ltd.
(6) Na-St: sodium stearate According to the results of Comparative Examples 4-2 and 4-3, when each nucleator was mixed and melt-kneaded with the respective olefin polymer, the resulting film materials were observed with defective outer appearance and thread breakage occurred during the molding of the fiber materials.

In contrast, from the results of Examples 4-1 and 4-2, it was confirmed that the olefin polymers obtained by the production method of the present invention did not have any of the above-described problems and their physical properties were further improved.

From the above, it is seen that the olefin resin composition obtained by the production method of the present invention is suitable for film and fiber materials and can be produced stably.

Fifth Example

Preparation of Solid Catalyst Component

After preparing a homogeneous solution by adding and allowing 4.76 g (50 mmol) of anhydrous magnesium chloride, 25 ml of decane and 23.4 ml (150 mmol) of 2-ethylhexyl alcohol to react under heating at 130° C. for 2 hours, 1.11 g (7.5 mmol) of phthalic anhydride was added to the thus obtained homogeneous solution and the resulting mixture was maintained with stirring at 130° C. for 1 hour, thereby dissolving phthalic anhydride in the homogeneous solution. Then, this homogeneous solution was cooled to room temperature and the entire amount thereof was charged dropwise to 200 ml (1.8 mol) of titanium tetrachloride, which had been kept at −20° C., over a period of 1 hour. Thereafter, the resultant was heated to 110° C. over a period of 4 hours. Once the temperature reached 110° C., 2.68 ml (12.5 mmol) of dibutyl phthalate was added and the resulting mixture was allowed to react for 2 hours with stirring while maintaining the temperature at 110° C. After the completion of the reaction, the resulting residue was recovered by hot filtration and re-suspended in 200 ml of titanium tetrachloride, and the suspension was allowed to react under heating at 110° C. for 2 hours. Thereafter, the resulting residue was recovered again by hot filtration and thoroughly washed with 110° C. decane and hexane until no free titanium compound was detected in the washings, thereby obtaining a solid catalyst component. When a portion of this solid catalyst component was sampled and dried to analyze the composition of the catalyst, it was found that the solid catalyst component contained 3.1% by mass of titanium, 56.0% by mass of chlorine, 17.0% by mass of magnesium and 20.9% by mass of dibutyl phthalate.

(Pre-Polymerization)

For adjustment of the amount of nucleator to be blended in the resulting olefin polymer, the polymerization activity was determined in a case where the nucleator solution was not added. Polymerization was performed under the below-described conditions.

(Polymerization Conditions)

To an autoclave whose atmosphere had been replaced with nitrogen, 600 ml of heptane, 303 mg of triethylaluminum, 0.26 mmol of dicyclopentyldimethoxysilane and a heptane slurry of the solid catalyst component produced by the above-described method (0.013 mmol in terms of Ti) were sequentially added and stirred. The atmosphere in the autoclave was replaced with propylene and pre-polymerization was performed at 50° C. for 5 minutes under a propylene pressure of 1 kgf/cm² G. After purging propylene, 340 ml of hydrogen (23° C.) was blown into the autoclave and the temperature was raised to 70° C. to perform polymerization reaction at 70° C. for 1 hour under a propylene pressure of 6 kgf/cm² G. Thereafter, the atmosphere in the system was replaced with nitrogen gas and the polymerization reaction was quenched by adding 5 ml of ethanol at 40° C. The solvent was removed under reduced pressure at 50° C., and the polymerization product was dried in vacuum at 40° C. for 5 hours to obtain a polymer. The polymerization activity of the thus obtained polymer was determined to be 8.0 kg per 1 g of the catalyst.

(Preparation of Nucleator Component Solution)

In a flask whose atmosphere had been replaced with nitrogen, heptane was added to each nucleator component in accordance with the formulation shown in Table 11. While stirring the resulting mixture, triethylaluminum was added thereto dropwise to prepare a nucleator component solution containing 20 mg/ml of the nucleator component. P-2 is one of the nucleator components specifically exemplified in the above. In Table 11, an evaluation of "○" was given when the nucleator component dissolved in the solution, and an evaluation of "x" was given when the nucleator component did not dissolve in the solution.

TABLE 11

| | Nucleator component | | Organic solvent | | Organoaluminum compound | | |
|---|---|---|---|---|---|---|---|
| | Compound name | Blended amount [g] | Compound name | Volume [ml] | Compound name | Volume [ml] | Solubility |
| Production Example 5-1-1 | P-2 | 3.3 | heptane | 160 | triethylaluminum | 6.9 | ○ |
| Production Example 5-1-2 | Compound 1 | 3.3 | heptane | 154 | triethylaluminum | 11.5 | ○ |
| Production Example 5-1-3 | Na-Bz | 0.6 | heptane | 38 | triethylaluminum | 12.0 | x |

(1) Compound 1: compound having the following structure

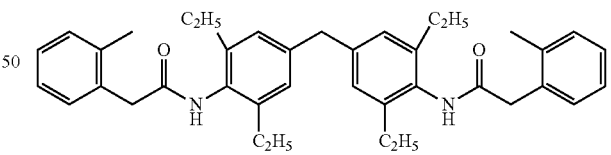

(2) Na—Bz: sodium benzoate (Polymerization)

Polymerization was performed under the same conditions as the above-described pre-polymerization conditions, except that the nucleator component solution was added in the amount shown in Table 12 with respect to 100 parts by mass of the olefin polymer obtained by polymerization, immediately before the addition of the heptane slurry of the solid catalyst component; and that heptane was added in such an amount that the total amount of the resulting solution in the autoclave became 600 ml.

It is noted here that, when the mixture of the nucleator component, organic solvent, and organoaluminum compound of Production Example 5-1-3 was supplied, since the polymerization activity was low, the resulting olefin monomer was not obtained in an amount required for molding.

(Molding)

To the thus obtained olefin polymer, the respective additives were added and mixed in the amounts shown in Table 12. Then, using a small injection molding machine for laboratory (manufactured by Xplore Instruments; Compounder 15, Injection Molder 12), the resulting mixture was melt-kneaded at 230° C. to obtain a strand, which was subsequently pelletized. Further, the thus obtained pellet was injection-molded using the above-described small injection molding machine for laboratory at an injection temperature of 230° C. and a die temperature of 40° C., thereby obtaining a 50 mm×50 mm×2 mm plate-form test piece as well as a 80 mm×10 mm×4 mm bending test piece. It is noted here that, in Comparative Examples 5-1 to 5-4, evaluations were performed using the olefin polymer obtained by the above-described pre-polymerization.

(Fogging Resistance)

The thus obtained plate-form test piece was set in a fogging tester conforming to ISO-6452 and treated under the following test conditions: heating temperature=100° C., heating time=5 hours, and cooling plate temperature=20° C. After the treatment, the surface of the test piece was observed under a microscope at a magnification of ×40. An evaluation of "○" was given when the surface showed no abnormality, and an evaluation of "x" was given when the surface was rough or an additive component appeared on the surface. The results thereof are shown in Table 12 below.

(Flexural Modulus)

The thus obtained bending test piece was, immediately after being injection-molded, left to stand for at least 48 hours in a thermostat chamber having an inner temperature of 23° C. Then, using a bending tester (AG-IS, manufactured by Shimadzu Corporation), the flexural modulus (MPa) was measured in accordance with the method prescribed in ISO178. These results thereof are shown in Table 12 below.

TABLE 12

| | Additive added at the time of polymerization | | Additives added at the time of granulation | | Evaluation results | |
|---|---|---|---|---|---|---|
| | Compound | Blended amount [parts by mass] | Compound | Blended amount [parts by mass] | Fogging resistance | Flexural modulus [MPa] |
| Example 5-1 | P-2 | 0.022 | AO-1 | 0.05 | ○ | 2,250 |
| | | | AO-2 | 0.05 | | |
| | | | DHT-4A | 0.05 | | |
| | | | Na-St | 0.08 | | |
| Example 5-2 | Compound 1 | 0.092 | AO-1 | 0.05 | ○ | 2,100 |
| | | | AO-2 | 0.05 | | |
| | | | DHT-4A | 0.05 | | |
| | | | Na-St | 0.08 | | |
| Comparative Example 5-1 | — | — | AO-1 | 0.05 | ○ | 1,470 |
| | | | AO-2 | 0.05 | | |
| | | | DHT-4A | 0.05 | | |
| | | | Na-St | 0.08 | | |
| Comparative Example 5-2 | — | — | P-2 | 0.022 | ○ | 2,080 |
| | | | AO-1 | 0.05 | | |
| | | | AO-2 | 0.05 | | |
| | | | DHT-4A | 0.05 | | |
| | | | Na-St | 0.08 | | |
| Comparative Example 5-3 | — | — | Compound 1 | 0.092 | ○ | 1,960 |
| | | | AO-1 | 0.05 | | |
| | | | AO-2 | 0.05 | | |
| | | | DHT-4A | 0.05 | | |
| | | | Na-St | 0.08 | | |
| Comparative Example 5-4 | — | — | Compound 2 | 0.092 | x | 1,720 |
| | | | AO-1 | 0.05 | | |
| | | | AO-2 | 0.05 | | |
| | | | DHT-4A | 0.05 | | |
| | | | Na-St | 0.08 | | |

(3) Compound 2: sorbitol nucleator (Millad 3988, trade name; manufactured by Milliken & Company)

(4) AO-1: tetrakis[methylene-3-(3',5'-di-tert-butyl-4'-hydroxyphenyl)propionate]methane (5) AO-2: tris(2,4-di-tert-butylphenyl)phosphite (6) DHT-4A: trade name, hydrotalcite manufactured by Kyowa Chemical Industry Co., Ltd.

(7) Na-St: sodium stearate

From Production Example 5-1-3, it was confirmed that the supply of a nucleator that does not dissolve in an organoaluminum compound or in an organoaluminum compound and an organic solvent had an adverse effect on the polymerization activity. In addition, according to the result of Comparative Example 5-4 shown in Table 12, fogging was observed in the olefin resin composition in which the sorbitol-based nucleator was blended at the time of granulation.

On the other hand, by comparing the results of Examples 5-1 and 5-2 with those of Comparative Examples 5-2 and 5-3, respectively, it was confirmed that the olefin resin compositions obtained by the production method of the present invention showed no migration of the nucleators to the surface of the respective molded articles and exhibited rigidity-improving effect. In these olefin resin compositions obtained by the production method of the present invention, since the physical properties can be improved with an addition of a nucleator in a small amount and the nucleator does not migrate to the surface of the molded articles, the olefin resin compositions can be suitably used in sanitary material applications.

Sixth Example

Preparation of Solid Catalyst Component

After preparing a homogeneous solution by adding and allowing 4.76 g (50 mmol) of anhydrous magnesium chloride, 25 ml of decane and 23.4 ml (150 mmol) of 2-ethylhexyl alcohol to react under heating at 130° C. for 2 hours, 1.11 g (7.5 mmol) of phthalic anhydride was added to the thus obtained homogeneous solution and the resulting mixture was maintained with stirring at 130° C. for 1 hour, thereby dissolving phthalic anhydride in the homogeneous solution. Then, this homogeneous solution was cooled to room temperature and the entire amount thereof was charged dropwise to 200 ml (1.8 mol) of titanium tetrachloride, which had been kept at −20° C., over a period of 1 hour. Thereafter, the resultant was heated to 110° C. over a period of 4 hours. Once the temperature reached 110° C., 2.68 ml (12.5 mmol) of dibutyl phthalate was added and the resulting mixture was allowed to react for 2 hours with stirring while maintaining the temperature at 110° C. After the completion of the reaction, the resulting residue was recovered by hot filtration and re-suspended in 200 ml of titanium tetrachloride, and the suspension was allowed to react under heating at 110° C. for 2 hours. Thereafter, the resulting residue was recovered again by hot filtration and thoroughly washed with 110° C. decane and hexane until no free titanium compound was detected in the washings, thereby obtaining a solid catalyst component. When a portion of this solid catalyst component was sampled and dried to analyze the composition of the catalyst, it was found that the solid catalyst component contained 3.1% by mass of titanium, 56.0% by mass of chlorine, 17.0% by mass of magnesium and 20.9% by mass of dibutyl phthalate.
(Pre-Polymerization)

For adjustment of the amount of nucleator to be blended in the resulting olefin polymer, the polymerization activity was determined in a case where the nucleator solution was not added. Polymerization was performed under the below-described conditions.
(Polymerization Conditions)

To an autoclave whose atmosphere had been replaced with nitrogen, 600 ml of heptane, 303 mg of triethylaluminum, 0.26 mmol of dicyclopentyldimethoxysilane and a heptane slurry of the solid catalyst component produced by the above-described method (0.013 mmol in terms of Ti) were sequentially added and stirred. The atmosphere in the autoclave was replaced with propylene and pre-polymerization was performed at 50° C. for 5 minutes under a propylene pressure of 1 kgf/cm² G. After purging propylene, 340 ml of hydrogen (23° C.) was blown into the autoclave and the temperature was raised to 70° C. to perform polymerization reaction at 70° C. for 1 hour under a propylene pressure of 6 kgf/cm² G. Thereafter, the atmosphere in the system was replaced with nitrogen gas and the polymerization reaction was quenched by adding 5 ml of ethanol at 40° C. The solvent was removed under reduced pressure at 50° C., and the polymerization product was dried in vacuum at 40° C. for 5 hours to obtain a polymer. The polymerization activity of the thus obtained polymer was determined to be 8.0 kg per 1 g of the catalyst.
(Preparation of Nucleator Component Solution)

In a flask whose atmosphere had been replaced with nitrogen, heptane was added to each nucleator component in accordance with the formulation shown in Table 13. While stirring the resulting mixture, triethylaluminum was added thereto dropwise to prepare a nucleator component solution containing 20 mg/ml of the nucleator component. P-2 is one of the nucleator components specifically exemplified in the above.

TABLE 13

| | Nucleator component | | Organic solvent | | Organoaluminum compound | | |
|---|---|---|---|---|---|---|---|
| | Compound name | Added amount [g] | Compound name | Volume [ml] | Compound name | Volume [ml] | Solubility |
| Production Example 6-1-1 | P-2 | 3.3 | heptane | 160 | triethylaluminum | 6.9 | o |
| Production Example 6-1-2 | Compound 1 | 3.3 | heptane | 154 | triethylaluminum | 11.5 | o |
| Production Example 6-1-3 | Na-Bz | 0.6 | heptane | 150 | triethylaluminum | 12.0 | x |

(1) Compound 1: compound having the following structure

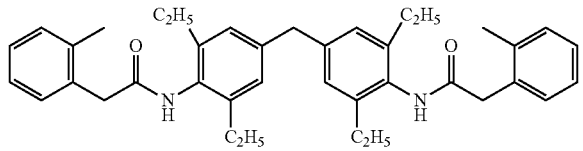 [SMILES: CCc1cc(Cc2cc(CC)c(NC(=O)Cc3ccccc3C)c(CC)c2)cc(CC)c1NC(=O)Cc1ccccc1C]

(2) Na—Bz: sodium benzoate
(Polymerization)

Polymerization was performed under the same conditions as the above-described pre-polymerization conditions, except that the nucleator component solution was added in the amount shown in Table 14 with respect to 100 parts by mass of the olefin polymer obtained by polymerization, immediately before the addition of the heptane slurry of the solid catalyst component; and that heptane was added in such an amount that the total amount of the resulting solution in the autoclave became 600 ml.

It is noted here that, when the mixture of the nucleator component, organic solvent, and organoaluminum compound of Production Example 6-1-3 was supplied, since the polymerization activity was low, the resulting olefin monomer was not obtained in an amount required for molding.

(Molding)

In accordance with the amounts shown in Table 14 with respect to 100 parts by mass of each of the thus obtained olefin polymers, the respective additives were added and mixed. Then, using a small injection molding machine for laboratory (manufactured by Xplore Instruments; Compounder 15, Injection Molder 12), the resulting mixture was melt-kneaded at 230° C. to obtain a strand, which was subsequently pelletized. Further, the thus obtained pellet was injection-molded using the above-described small injection molding machine for laboratory at an injection temperature of 230° C. and a die temperature of 40° C., thereby obtaining a 80 mm×10 mm×4 mm bending test piece as well as a 50 mm×50 mm×2 mm plate-form test piece.

It is noted here that, in Comparative Examples 6-1 to 6-4, evaluations were performed using the olefin polymer obtained by the above-described pre-polymerization.

(Evaluation)

The bending test piece and plate-form test piece obtained by the above-described molding were subjected to the following evaluations. The results thereof are shown in Table 14.

(Flexural Modulus)

The thus obtained bending test piece was, immediately after being injection-molded, left to stand for at least 48 hours in a thermostat chamber having an inner temperature of 23° C. Then, using a bending tester (AG-IS, manufactured by Shimadzu Corporation), the flexural modulus (MPa) was measured in accordance with the method prescribed in ISO178. The results thereof are shown in Table 14.

(Outer Appearance)

The thus obtained plate-form test piece was, immediately after being injection-molded, left to stand for at least 48 hours in a thermostat chamber having an inner temperature of 23° C. Then, the surface of the test piece was visually examined. An evaluation of "○" was given when no abnormality was observed, and an evaluation of "x" was given when a flow mark, a foreign substance or the like was observed. The evaluation results are shown in Table 14.

TABLE 14

| | Additive added at the time of polymerization | | Additives added at the time of granulation | | Evaluation results | |
|---|---|---|---|---|---|---|
| | Compound | Blended amount [parts by mass] | Compound | Blended amount [parts by mass] | Outer appearance | Flexural modulus [MPa] |
| Example 6-1 | P-2 | 0.022 | AO-1 | 0.05 | ○ | 2,250 |
| | | | AO-2 | 0.05 | | |
| | | | DHT-4A | 0.05 | | |
| | | | Na-St | 0.08 | | |
| Example 6-2 | Compound 1 | 0.092 | AO-1 | 0.05 | ○ | 2,100 |
| | | | AO-2 | 0.05 | | |
| | | | DHT-4A | 0.05 | | |
| | | | Na-St | 0.08 | | |
| Comparative Example 6-1 | — | — | AO-1 | 0.05 | x | 1,470 |
| | | | AO-2 | 0.05 | | |
| | | | DHT-4A | 0.05 | | |
| | | | Na-St | 0.08 | | |
| Comparative Example 6-2 | — | — | P-2 | 0.022 | x | 2,080 |
| | | | AO-1 | 0.05 | | |
| | | | AO-2 | 0.05 | | |
| | | | DHT-4A | 0.05 | | |
| | | | Na-St | 0.08 | | |
| Comparative Example 6-3 | — | — | Compound 1 | 0.092 | x | 1,960 |
| | | | AO-1 | 0.05 | | |
| | | | AO-2 | 0.05 | | |
| | | | DHT-4A | 0.05 | | |
| | | | Na-St | 0.08 | | |
| Comparative Example 6-4 | — | — | Compound 2 | 0.092 | x | 1,720 |
| | | | AO-1 | 0.05 | | |
| | | | AO-2 | 0.05 | | |
| | | | DHT-4A | 0.05 | | |
| | | | Na-St | 0.08 | | |

(3) Compound 2: sorbitol nucleator (Millad 3988, trade name; manufactured by Milliken & Company)

(4) AO-1: tetrakis[methylene-3-(3',5'-di-tert-butyl-4'-hydroxyphenyl)propionate]methane (5) AO-2: tris(2,4-di-tert-butylphenyl)phosphite (6) DHT-4A: trade name, hydrotalcite manufactured by Kyowa Chemical Industry Co., Ltd.

(7) Na-St: sodium stearate

According to the results of Comparative Examples 6-2 and 6-3 shown in Table 14, when no nucleator component was supplied at the time of polymerizing the respective olefin polymers, the rigidity-improving effect was poor and abnormality was observed in the outer appearance of the molded articles.

In contrast, as compared to the olefin resin composition of Comparative Example 6-1 in which no nucleator was blended, those olefin resin compositions that were produced in Examples 6-1 and 6-2 according to the production method of the present invention showed superior rigidity-improving effect and their molded articles had better outer appearances. From the above, it is seen that, by molding an olefin polymer obtained by the production method of the present invention, a molded article showing excellent rigidity with reduced weight and thickness can be obtained.

The invention claimed is:

1. A method of producing a nucleator masterbatch in which a nucleator is blended in an olefin polymer, said method being characterized by comprising the step of polymerizing an olefin monomer with incorporation of a nucleator component, which is dissolved in an organoaluminum compound or in an organoaluminum compound and an organic solvent, before or during polymerization of said olefin monomer such that said nucleator component is blended in an amount of 0.05 to 20 parts by mass with respect to 100 parts by mass of said olefin polymer obtained by said polymerization of said olefin monomer.

2. The method of producing a nucleator masterbatch according to claim 1, wherein said nucleator is a compound represented by the following Formula (1):

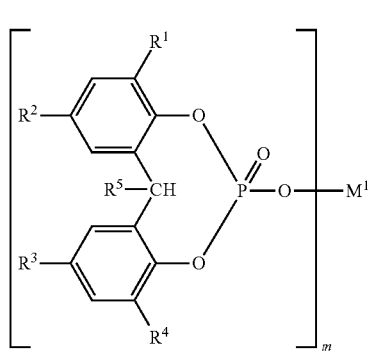

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn).

3. The method of producing a nucleator masterbatch according to claim 1, wherein said nucleator is an amide compound.

4. The method of producing a nucleator masterbatch according to claim 1, wherein said organoaluminum compound is a trialkylaluminum.

5. The method of producing a nucleator masterbatch according to claim 1, wherein said organic solvent is selected from aliphatic hydrocarbon compounds and aromatic hydrocarbon compounds.

6. A molded article, characterized by being obtained by blending an olefin resin with a nucleator masterbatch obtained by the method of producing a nucleator masterbatch according to claim 1 and subsequently molding the resultant.

7. A method of producing an olefin-based resin composition, said method being characterized by comprising:
a first step of blending a nucleator component, which comprises one or more compounds represented by the following Formula (1) and is dissolved in an organoaluminum compound or in an organoaluminum compound and an organic solvent, before or during polymerization of an olefin monomer such that said nucleator component is incorporated in an amount of 0.001 to 10 parts by mass with respect to 100 parts by mass of an olefin polymer obtained by said polymerization; and
a second step of adding at least one metal aliphatic carboxylate represented by the following Formula (15) or an alkali metal-containing hydrotalcite in an amount of 0.001 to 10 parts by mass with respect to 100 parts by mass of said polymer obtained by said polymerization of said olefin monomer and subsequently melt-kneading the resulting mixture:

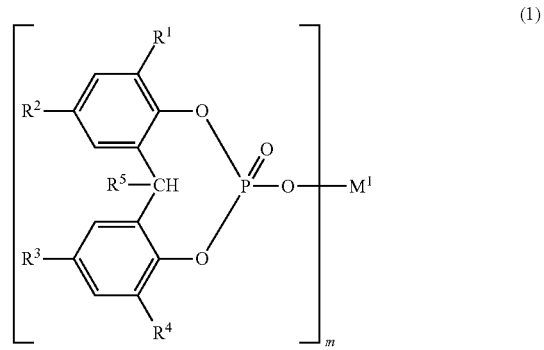

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn)

(wherein, $R^{26}$ represents an aliphatic group having 1 to 30 carbon atoms which is optionally branched and optionally has one or more substituents selected from a hydroxyl group and cycloalkyl groups; $M^2$ represents a metal atom; and n is an integer of 1 to 4, representing the valence of said $M^2$).

8. The method of producing an olefin-based resin composition according to claim 7, wherein, in said nucleator component which comprises one or more compounds represented by said Formula (1) and is dissolved in said organoaluminum compound or in said organoaluminum compound and said organic solvent, the ratio of said nucleator component and said organoaluminum compound is in a range of 1/1,000 to 1/0.3 in terms of the molar ratio of said nucleator component and the aluminum content of said organoaluminum compound.

9. The method of producing an olefin-based resin composition according to claim 7, wherein said metal aliphatic carboxylate represented by said Formula (15) is selected from the group consisting of lithium stearate, lithium myristate, sodium stearate, sodium myristate and hydroxy-substituted compounds thereof.

10. The method of producing an olefin-based resin composition according to claim 7, wherein the alkali metal in said alkali metal-containing hydrotalcite is lithium or sodium.

11. The method of producing an olefin-based resin composition according to claim 7, wherein said organoaluminum compound is a trialkylaluminum.

12. A molded article, obtained by molding an olefin-based resin composition produced by the method of producing an olefin-based resin composition according to claim 7.

13. A method of producing an olefin-based resin composition, said method being characterized by comprising the step of bringing a nitrogen gas containing water or a proton-donating substance, or steam, into contact with an olefin polymer obtained by polymerizing an olefin monomer with incorporation of a nucleator dissolved in an organoaluminum compound or in an organoaluminum compound and an organic solvent before or during said polymerization.

14. A method of producing an olefin-based resin composition, said method being characterized by comprising the step of melt-kneading an olefin polymer, which is obtained by polymerization of an olefin monomer with a supply of a nucleator dissolved in an organoaluminum compound or in an organoaluminum compound and an organic solvent before or during said polymerization, with injection of a nitrogen gas containing water or a proton-donating substance, or steam, into an extruder.

15. The method of producing an olefin-based resin composition according to claim 13, wherein said nucleator is a compound represented by the following Formula (1):

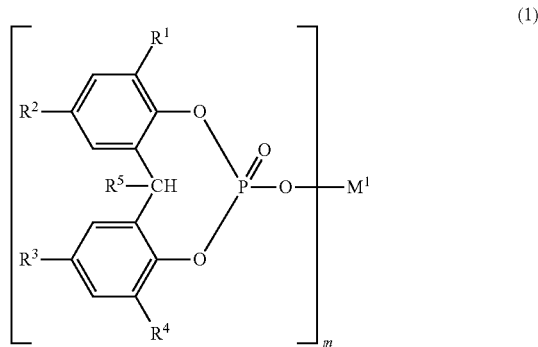

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn).

16. The method of producing an olefin-based resin composition according to claim 13, wherein said nucleator is an amide compound.

17. The method of producing an olefin-based resin composition according to claim 13, wherein said organoaluminum compound is a trialkylaluminum.

18. The method of producing an olefin-based resin composition according to claim 13, wherein said organic solvent is selected from aliphatic hydrocarbon compounds and aromatic hydrocarbon compounds.

19. The method of producing an olefin-based resin composition according to claim 13, wherein said proton-donating substance is selected from methanol and ethanol.

20. The method of producing an olefin-based resin composition according to claim 13, wherein said olefin polymer is polypropylene.

21. An olefin-based resin composition obtained by the method of producing an olefin-based resin composition according to claim 13, said olefin-based resin composition being characterized by having a water content in a range of 0.1 to 5 parts by mass with respect to 100 parts by mass of said olefin polymer.

22. A molded article, characterized by being obtained by molding an olefin-based resin composition produced by the method of producing an olefin-based resin composition according to claim 13.

23. A method of producing an olefin-based resin composition, said method being characterized by comprising the step of polymerizing an olefin monomer with incorporation of a nucleator component, which is dissolved in an organoaluminum compound or in an organoaluminum compound and an organic solvent, before or during polymerization of said olefin monomer such that said nucleator component is blended in an amount of 0.001 to 0.5 parts by mass with respect to 100 parts by mass of an olefin polymer obtained by said polymerization of said olefin monomer.

24. The method of producing an olefin-based resin composition according to claim 23, said method being capable of producing an olefin-based resin composition that does not show fogging in a fogging test prescribed in ISO-6452 under conditions where the heating temperature is 100° C., the heating time is 5 hours and the cooling temperature is 50° C.

25. The method of producing an olefin-based resin composition according to claim 23, which produces an olefin-based resin composition capable of yielding a molded article having a flexural modulus, which is measured in accordance with ISO178, of not less than 1,600 MPa, said method comprising the step of polymerizing an olefin monomer with incorporation of a nucleator component, which is dissolved in an organoaluminum compound or in an organoaluminum compound and an organic solvent, before or during polymerization of said olefin monomer such that said nucleator component is blended in an amount of 0.001 to 0.5 parts by mass with respect to 100 parts by mass of an olefin polymer obtained by said polymerization of said olefin monomer.

26. The method of producing an olefin-based resin composition according to claim 23, wherein said nucleator is a compound represented by the following Formula (1):

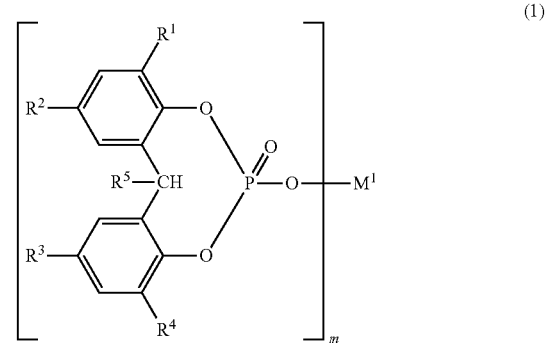

(wherein, $R^1$ to $R^4$ each independently represent a hydrogen atom or an alkyl group having 1 to 9 carbon atoms which is optionally branched; $R^5$ represents a hydrogen atom or a methyl group; m represents 1 or 2; when m is 1, $M^1$ represents a hydrogen atom; and, when m is 2, $M^1$ represents a Group II element, Al(OH) or Zn).

27. The method of producing an olefin-based resin composition according to claim 23, wherein said nucleator is an amide compound.

28. The method of producing an olefin-based resin composition according to claim 23, wherein said organoaluminum compound is a trialkylaluminum.

29. The method of producing an olefin-based resin composition according to claim 23, wherein said organic solvent is selected from aliphatic hydrocarbon compounds and aromatic hydrocarbon compounds.

30. A molded article, characterized by being obtained by molding an olefin-based resin composition produced by the method of producing an olefin-based resin composition according to claim 23.

31. A sanitary material, characterized by being obtained by molding an olefin-based resin composition produced by the method of producing an olefin-based resin composition according to claim 23.

32. A film, characterized by being obtained by molding an olefin-based resin composition produced by the method of producing an olefin-based resin composition according to claim 23.

33. A fiber material, characterized by being obtained by molding an olefin-based resin composition produced by the method of producing an olefin-based resin composition according to claim 23.

* * * * *